(12) United States Patent
Nakajima

(10) Patent No.: US 9,400,612 B2
(45) Date of Patent: *Jul. 26, 2016

(54) COMPUTER SYSTEM AND COMPUTER SYSTEM MANAGEMENT METHOD

(71) Applicant: Hitachi, Ltd., Tokyo (JP)

(72) Inventor: Akio Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 14/327,079

(22) Filed: Jul. 9, 2014

(65) Prior Publication Data

US 2014/0372721 A1 Dec. 18, 2014

Related U.S. Application Data

(63) Continuation of application No. 13/124,340, filed as application No. PCT/JP2011/001813 on Mar. 28, 2011, now Pat. No. 8,806,150.

(51) Int. Cl.
*G06F 12/00* (2006.01)
*G06F 3/06* (2006.01)
*H04L 12/713* (2013.01)
*H04L 12/931* (2013.01)
*H04L 29/08* (2006.01)

(52) U.S. Cl.
CPC ............ *G06F 3/0647* (2013.01); *G06F 3/061* (2013.01); *G06F 3/0607* (2013.01); *G06F 3/067* (2013.01); *G06F 3/0664* (2013.01); *H04L 45/586* (2013.01); *H04L 49/357* (2013.01); *H04L 49/45* (2013.01); *H04L 67/1097* (2013.01)

(58) Field of Classification Search
CPC ... G06F 3/0647; G06F 3/0607; G06F 3/0664; G06F 3/067
See application file for complete search history.

(56) References Cited

U.S. PATENT DOCUMENTS

| | | | |
|---|---|---|---|
| 6,779,083 | B2 | 8/2004 | Ito et al. |
| 7,697,515 | B2 | 4/2010 | Ofer et al. |
| 7,697,554 | B1 | 4/2010 | Ofer et al. |
| 7,856,022 | B1 | 12/2010 | Wigmore |
| 2006/0107010 | A1 | 5/2006 | Hirezaki et al. |
| 2007/0263637 | A1 | 11/2007 | Madnani et al. |
| 2008/0162754 | A1 | 7/2008 | Ogawa et al. |

(Continued)

FOREIGN PATENT DOCUMENTS

| | | |
|---|---|---|
| EP | 2 017 711 A2 | 1/2009 |
| JP | 2008-250631 | 10/2008 |

OTHER PUBLICATIONS

DeSanti, Claudio; FDF Routing; T11/10-465v0; Oct. 2010; pp. 1-34; http://www.t11.org/ftp/t11/pub/fc/bb-6/10-465v0.pdf.
DeSanti, Claudio; VA_Ports: FDF/Controlling FCF Protocols; T11/10-271v3, Oct. 2010; pp. 1-35; http://www.t11.org/ftp/t11/pub/fc/bb-6/10-271v3.pdf.
Fibre Channel—Backbone—5; T11/Project 1871-D/Rev 2.00; Jun. 4, 2009; pp. i-xv and 1-165; http://www.t11.org/ftp/t11/pub/fc/bb-5/09-056v5.pdf.

(Continued)

*Primary Examiner* — Gurtej Bansal
(74) *Attorney, Agent, or Firm* — Foley & Lardner LLP

(57) ABSTRACT

A computer system in which one or more host computers 30 having a FC (Fibre Channel) node port and one or more storage apparatuses 40 having a FC node port are coupled via a FC fabric. The storage apparatus acquires first information related to access control for controlling access to a relevant storage apparatus by the host computer. The storage apparatus, based on the first information, creates second information for defining the host computer that is able to access the relevant storage apparatus, and registers this second information in the fabric.

16 Claims, 44 Drawing Sheets

(56) References Cited

U.S. PATENT DOCUMENTS

| | | |
|---|---|---|
| 2008/0244139 A1 | 10/2008 | Nakajima |
| 2009/0025007 A1 | 1/2009 | Hara et al. |
| 2009/0296726 A1 | 12/2009 | Snively et al. |
| 2010/0007022 A1 | 1/2010 | Tarumi et al. |
| 2010/0198972 A1 | 8/2010 | Umbehocker |
| 2010/0235592 A1 | 9/2010 | Kaneda et al. |
| 2011/0022693 A1 | 1/2011 | Cheethirala et al. |

OTHER PUBLICATIONS

NPIV Functionality Profile; T11/02-338v1; Aug. 1, 2002; pp. 1-10; http://www.t11.org/ftp/t11/member/fc/da/02-338v1.pdf.

PCT International Search Report and Written Opinion on application No. PCT/JP2011/001813 dated Nov. 22, 2011; 11 pages.

Smith, Erik, et al.; Register Peer Names; T11/10-265v1; Oct. 2010; pp. 1-18; http://www.t11.org/ftp/t11/pub/fc/scm/10-265v1.pdf.

Weber, Ralph O.; Principal/Peers Zoning in FC-GS-7; T11/11-001v0; Jan. 3, 2011; pp. 1-14 and 173-258; http://www.t11.org/ftp/t11/pub/fc/gs-7/11-001v0.pdf.

FIG. 8

(a) FC Frame Format

| byte DW | Byte3 | Byte2 | Byte1 | Byte0 |
|---|---|---|---|---|
| 0 | RCTL | DID 81 | | |
| 1 | CSCTL | SID 82 | | |
| 2 | TYPE | FCTL | | |
| 3 | SEQID | DFCTL | SEQCTL | |
| 4 | OXID | | RXID | |
| 5 | Parameter | | | |
| 6 | FC Data Field (n-5Dwords) | | | |
| n | | | | |
| n+1 | FC CRC | | | |

(b) FCoE Frame Format

| byte DW | Byte3 | Byte2 | Byte1 | Byte0 |
|---|---|---|---|---|
| 0 | Destination MAC Address (DA) 83 | | | |
| 1 | | | | |
| 2 | Source MAC Address(SA) 84 | | | |
| 3 | IEEE8021Q Tag | | | |
| 4 | TYPE (FCoE=8914 h) | | Version | Reserved |
| 5 | Reserved | | | |
| 6 | Reserved | | | |
| 7 | Reserved | | | FC SOF |
| 8 | Encapsulated FC Frame( n +1D words ) | | | |
| n+9 | | | | |
| n+10 | FC EOF | | Reserved | |
| n+11 | FCS (Frame Check Sequence) | | | |

FIG. 9

(a) 8 Bytes LUN Field

| bit byte | 7 | 6 | 5 | 4 | 3 | 2 | 1 | 0 |
|---|---|---|---|---|---|---|---|---|
| 0 | Address Method (00b, 01b, 10b, 11b) | | | First Level Addressing | | | | |
| 1 | | | | | | | | |
| 2 | Second Level Addressing | | | | | | | |
| 3 | | | | | | | | |
| 4 | Third Level Addressing | | | | | | | |
| 5 | | | | | | | | |
| 6 | Forth Level Addressing | | | | | | | |
| 7 | | | | | | | | |

(b) Single level LUN (device addressing)

| bit byte | 7 | 6 | 5 | 4 | 3 | 2 | 1 | 0 |
|---|---|---|---|---|---|---|---|---|
| 0 | Address Method (00b) | | BUS Identifier (0x00) | | | | | |
| 1 | Target or LUN | | | | | | | |
| 2 | NULL 2nd/3rd/4th Level Addressing (0x0000 0000 0000) | | | | | | | |
| 7 | | | | | | | | |

(c) Single level LUN (flat space)

| bit byte | 7 | 6 | 5 | 4 | 3 | 2 | 1 | 0 |
|---|---|---|---|---|---|---|---|---|
| 0 | Address Method (01b) | | Flat Space LUN | | | | | |
| 1 | | | | | | | | |
| 2 | NULL 2nd/3rd/4th Level Addressing (0x 0000 0000 0000) | | | | | | | |
| 7 | | | | | | | | |

(d) Single level LUN (Logical Unit Addressing)

| bit byte | 7 | 6 | 5 | 4 | 3 | 2 | 1 | 0 |
|---|---|---|---|---|---|---|---|---|
| 0 | Address Method (10b) | | BUS Number | | Target | | | |
| 1 | | | | | LUN | | | |
| 2 | NULL 2nd/3rd/4th Level Addressing (0x0000 0000 0000) | | | | | | | |
| 7 | | | | | | | | |

FIG. 10

(e) Extended Flat Space LUN

| bit byte | 7 | 6 | 5 | 4 | 3 | 2 | 1 | 0 |
|---|---|---|---|---|---|---|---|---|
| 0 | Address Method (11b) | | Length n (2n+1) | | Extended address method | | | |
| 1 | depend on Extended address method field (Length = 1Bytes: 00b, 3Bytes: 01b, 5Bytes: 10b 7Bytes: 11b) | | | | | | | |
| 7 | NULL Addressing (Length = 6 Bytes: 00b, 4 Bytes: 01b, 2Bytes: 10b, 0Bytes: 11b) | | | | | | | |

(f) Extended Flat Space LUN

| bit byte | 7 | 6 | 5 | 4 | 3 | 2 | 1 | 0 |
|---|---|---|---|---|---|---|---|---|
| 0 | Address Method (11b) | | Length (3Bytes: 01b) | | Extended address method (Extended 0x2) — 85 | | | |
| 1 | Extended Flat Space LUN (StorageID /TargetPort /LUN pair) | | | | | | | |
| 3 | | | | | | | | |
| 4 | NULL 3rd/4 th Level Addressing (0x 0000 0000) | | | | | | | |
| 7 | | | | | | | | |

(g) Well Known LUN

| bit byte | 7 | 6 | 5 | 4 | 3 | 2 | 1 | 0 |
|---|---|---|---|---|---|---|---|---|
| 0 | Address Method (11b) | | Length (1Bytes: 00b) | | Extended address method (W-LUN: 0x1) | | | |
| 1 | W-LUN code( h ) | | | | | | | |
| 2 | NULL 2nd/ 3rd/4 th Level Addressing (0x 0000 0000 0000) | | | | | | | |
| 7 | | | | | | | | |

(h) W-LUN code

| Code | Type |
|---|---|
| 0x01 | REPORT LUNS W-LUN |
| 0x02 | ACCESS CONTROLS W-LUN |
| 0x03 | TARGET LOG PAGES W-LUN |
| 0x04 | SECURITY PROTOCOLS W-LUN |
| 0x05 | MANAGEMENT Protocols W-LUN |
| new code | Target Port Zoning management W-LUN |

| a | C10<br>Storage System ID | C11<br>total Logical Unit | C12 | T10<br>C13<br>List of LUNS<br>(unique in a storage system) |
|---|---|---|---|---|
| Storage System A | 0x0A | 3entry | | 00 00(single level LUN)<br>00 01(single level LUN) — L10<br>00 02(single level LUN) |
| Storage System B | 0x0B | 3entries | | C1 01(Rep LUN W-LUN)<br>00 00(single level LUN)<br>00 01(single level LUN) |
| Storage System C | 0x0C | 100entries | | 00 00(single level LUN)<br>00 01(single level LUN)<br>... |

| a | Storage System ID | total Logical Unit | List of LUNS (unique in a storage system) |
|---|---|---|---|
| Storage System A | 0x0A | 0 entry | no entry ～L20 |
| Storage System B | 0x0B | 5 entries | C1 01(Rep LUN W-LUN)<br>00 00(single level LUN)<br>00 01(single level LUN)<br>D2 0A 00 00(Ext LUN) ～L21<br>D2 0A 00 01(Ext LUN) ～L22 |
| Storage System C | 0x0C | 101 entries | 00 00(single level LUN)<br>00 01(single level LUN)<br>...<br>D2 0A 00 02(Ext LUN) ～L23 |

(column headers labeled C12)

FIG. 13

(a) Device Identification VPD page

| bit<br>byte | 7 | 6 | 5 | 4 | 3 | 2 | 1 | 0 |
|---|---|---|---|---|---|---|---|---|
| 0 | Peripheral Qualifier | | | | Peripheral Device Type | | | |
| 1 | Page Code (Device Identification : 0x83) | | | | | | | |
| 2 | Page Length (n-3) | | | | | | | |
| 3 | | | | | | | | |
| 4 | Designator Descriptors List<br>(List of "Fig11b" descriptors) | | | | | | | |
| n | | | | | | | | |

(b) Designator Descriptor

| bit<br>byte | 7 | 6 | 5 | 4 | 3 | 2 | 1 | 0 |
|---|---|---|---|---|---|---|---|---|
| 0 | Protocol Identifier | | | | Code Set | | | |
| 1 | PIV | Reser-ved | Association | | Designator type (Fig(c)) | | | |
| 2 | Reserved | | | | | | | |
| 3 | Designator Length (n-3) | | | | | | | |
| 4 | Designator<br>(n-3 bytes) | | | | | | | |
| n | | | | | | | | |

(c) Designator type code

| Code | Type |
|---|---|
| 0x0 | Vender Specific |
| 0x1 | T10Vender ID based |
| 0x2 | EUI-64based |
| 0x3 | NAA |
| 0x4 | Relative target port identifier |
| 0x5 | Target port group |
| 0x6 | Logical Unit group |
| 0x7 | MD5 logical unit identifier |
| 0x8 | SCSI mane string |

(d) Unit Serial Number VPD page

| bit<br>byte | 7 | 6 | 5 | 4 | 3 | 2 | 1 | 0 |
|---|---|---|---|---|---|---|---|---|
| 0 | Peripheral Qualifier | | | | Peripheral Device Type | | | |
| 1 | Page Code (Unit Serial Number : 0x80) | | | | | | | |
| 2 | Reserved | | | | | | | |
| 3 | Page Length (n-3) | | | | | | | |
| 4 | Product Serial Number<br>(n-3 bytes) | | | | | | | |
| n | | | | | | | | |

| Host Group | WWPN List | Allow Host List | internal LUN | Host LUN | Target Zone Group |
|---|---|---|---|---|---|
| 1 | Storage WWPN X<br>Storage WWPN Y | Host WWPN A<br>Host WWPN B | V-VOL 100 LUN | 0 | A<br>B |
| | | | V-VOL 101 LUN | 1 | |
| | | | ... | ... | |
| 2 | Storage WWPN C | Host WWPN C | V-VOL 102 LUN | 0 | C |
| | | | V-VOL 101 LUN | 1 | |
| | | | ... | ... | |
| ... | ... | ... | ... | ... | ... |

C30, C31, C32, T30/C33, C34, C35

(b) T40

| Target Zone Group | Storage Port WWPN | Peer List |
|---|---|---|
| A | Storage WWPN X | Host WWPN A<br>Host WWPN B |
| B | Storage WWPN Y | Host WWPN A<br>Host WWPN B |
| C | Storage WWPN C | Host WWPN C |
| ... | ... | ... |

| byte DW | Byte3 | Byte2 | Byte1 | Byte0 |
|---|---|---|---|---|
| 0 | Revision | | IN_ID | |
| 1 | GSType (0xFC) | GS_SubType | Options | Reserved |
| 2 | Command Code (RPDPN:0x0XXX new code) | | Maximum Size | |
| 3 | Reserved | | | |
| 4 | Reserved | | Number of Peer device Entry | T |
| 5 | Peer device list 87 (list of "Figure(b)" descriptors) | | | |
| N | | | | |

(b)

| byte DW | Byte3 | Byte2 | Byte1 | Byte0 |
|---|---|---|---|---|
| 0 | Peer device Port_Name(WWPN) | | | |
| 1 | | | | |

(c)

| byte DW | Byte3 | Byte2 | Byte1 | Byte0 |
|---|---|---|---|---|
| 0 | Revision | | IN_ID | |
| 1 | GSType (0xFC) | GS_SubType | Options | Reserved |
| 2 | Response Code (0x8001 or 0x8002) | | Residual Size | |
| 3 | Fragment ID | Reason Code | Reason Code Explanation | Vender Specific |
| 4 | Reserved | | Number of Peer device Entry | |
| 5 | Returned Peer device list 88 (list of "Figure(d)" descriptors) | | | |
| n | | | | |

(d)

| byte DW | Byte3 | Byte2 | Byte1 | Byte0 |
|---|---|---|---|---|
| 0 | Flags(PortID field Valid) | | | |
| 1 | Peer device Port_ID | | | |
| 2 | Reserved | | | |
| 3 | Peer device Port_Name (WWPN) | | | |

| DW \ byte | Byte 3 | Byte 2 | Byte 1 | Byte 0 |
|---|---|---|---|---|
| 0 | Revision | IN_ID | | |
| 1 | GS_Type (0xFC) | GS_SubType | Options | Reserved |
| 2 | Command Code (GPD_PN : 0x0XXX new code) | | Maximum Size | |
| 3 | Reserved | | | |
| 4 | Query originator Port _Name (WWPN) 89 | | | |
| 5 | | | | |

(b)

| DW \ byte | Byte 3 | Byte 2 | Byte 1 | Byte 0 |
|---|---|---|---|---|
| 0 | Revision | IN_ID | | |
| 1 | GS_Type (0xFC) | GS_SubType | Options | Reserved |
| 2 | Response Code (0x8001 or 0x8002) | | Residual Size | |
| 3 | Fragment ID | Reason Code | Reason Code Explanation | Vender Specific |
| 4 | Reserved | | Number of Peer device Entry | |
| 5 ... n | Peer device list 90 (list of "Figure 39 (b)" descriptors) | | | |

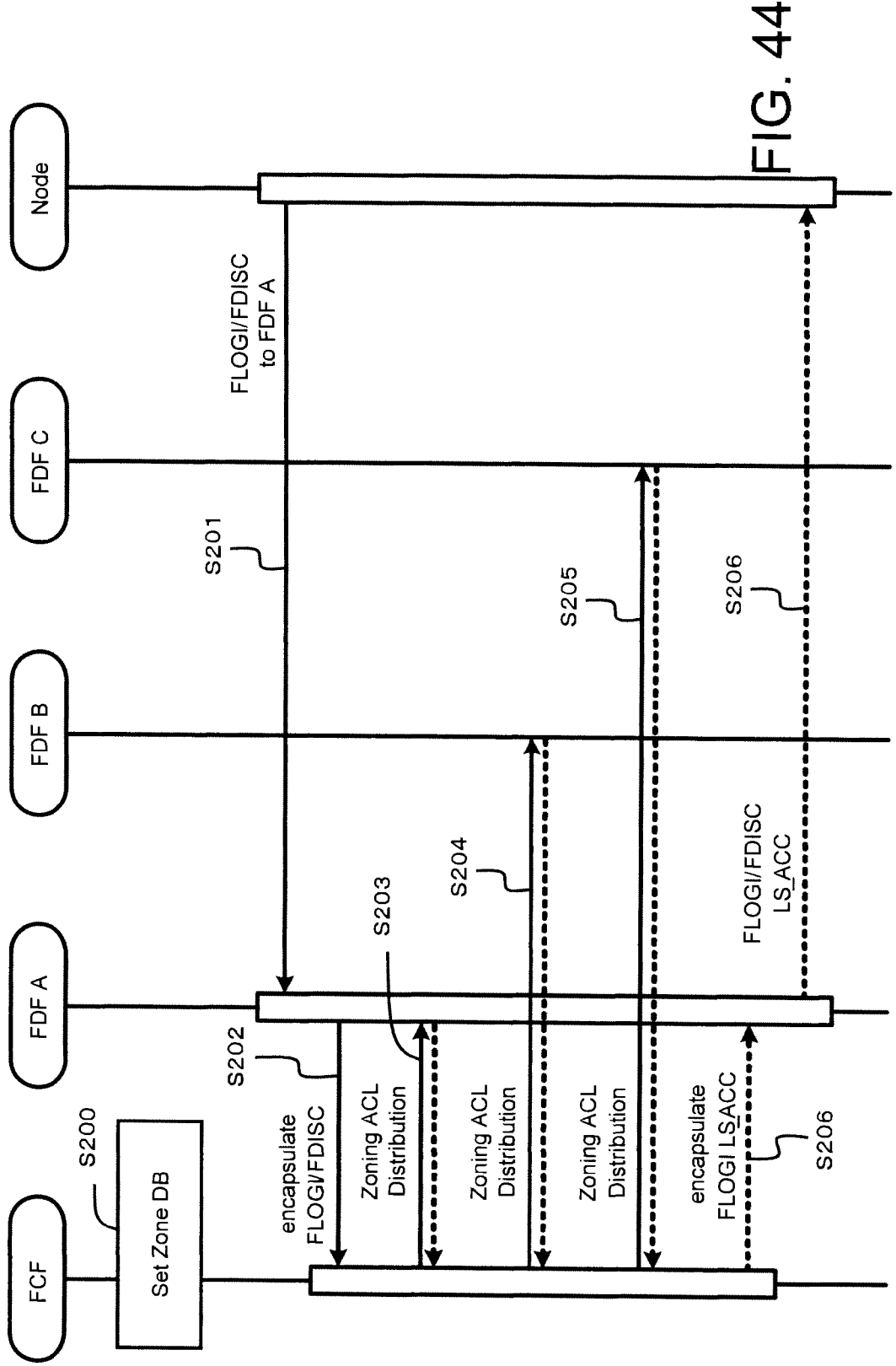

COMPUTER SYSTEM AND COMPUTER SYSTEM MANAGEMENT METHOD

CROSS-REFERENCE TO RELATED PATENT APPLICATIONS

This application is a Continuation of U.S. application Ser. No. 13/124,340 (National Stage of PCT/JP2011/001813), filed Apr. 14, 2011, incorporated herein by reference in its entirety.

TECHNICAL FIELD

The present invention relates to a computer system and a computer system management method.

BACKGROUND ART

A data center couples together large numbers of servers and multiple storage apparatuses using a Fibre Channel (FC) interface. For example, drops in apparatus performance, the end of an apparatus' service life, insufficient apparatus capacity, a dearth of network bandwidth, and system expansion will result in a data center replacing a server, network apparatus or storage apparatus with a new apparatus, adding a new apparatus, or removing an old apparatus from the computer system.

With conventional server virtualization technology, multiple virtual machines can be operated in accordance with running virtualization software on a physical server. This server virtualization technology makes it possible to temporarily suspend a virtual machine that is running on one physical server and migrate this virtual machine to the virtualization software running on another physical server. Management tasks related to the addition, replacement and removal of a server are carried out using this technology.

As described above, in the prior art, it is possible to run multiple virtual machines on a physical server. To operate a virtual machine that is running on one physical server on another physical server, it is preferable that is also be possible to virtualize Fibre Channel ports and to migrate these FC ports in virtual machine units.

Accordingly, technology (NPIV: N_Port Identifier Virtualization) for virtualizing the name of an FC node port (N_Port), which is an FC protocol expansion technique, is used. FC ports can be migrated in virtual machine units in accordance with using switches and host bus adapters (HEA) that support NPIV.

In NPIV, it is preferable that a name identifier (WWPN: World Wide Port Name), which is given to a virtual node port (VN_Port), not be changed between the pre-migration server WWPN and the post-migration server WWPN. The reason for this will be explained. A zoning function, which is an FC switch security function, provides access control by using either the WWPN, which is the N_Port name identifier, or a N_Port ID. The N_Port ID is computed from a FC switch domain number or a physical port number.

A SAN (Storage Area Network) administrator, who differs from a server administrator, is the one who configures zoning. Therefore, changing the SAN zoning configuration in synch with server migration is a big job because different administrators must exchange information with one another.

In addition, there are two types of FC zoning. One is zoning based on the port identifier (N_Port ID). The other is zoning based on the name identifier (WWPN). In the case of the zoning based on the port identifier (N_Port ID), migrating a virtual machine always requires a zoning change. The reason for this is because the N_Port ID changes when the virtual machine is migrated to another physical server. Therefore, the transfer of frames related to the post-migration virtual machine is nullified by the zoning function based on the FC switch port identifier.

Therefore, in a case where a virtual machine is migrated between physical servers, it is generally necessary for the user, who administers the computer system, to configure the FC port zoning function on the basis of the name identifier (WWPN). The user has the VN_Port (the virtual N_Port of the NPIV) take over a WWPN that is the same as the pre-migration WWPN before and after the migration of the virtual machine. In accordance with this, the user is able to migrate a virtual machine to a different physical server without changing the FC switch WWPN-based zoning configuration at all (Non Patent Literature 1).

Most network equipment is configured redundantly. In a redundantly configured network, after replacing a piece of network equipment (a FC switch or the like) in the one system with a new piece of network equipment, the piece of network equipment in the other system can also be replaced with the new piece of network equipment. This makes it possible to achieve a higher performance and/or higher bandwidth network.

The addition of a storage apparatus or a migration operation in a storage apparatus will be considered. In a case where there is a function for the N_Port of a migration-destination storage apparatus to take over the WWPN of the migration-source storage apparatus, the user may be able to carry out a migration from the migration-source storage apparatus to the migration-destination storage apparatus without changing the zoning configuration of the FC switch.

However, in a first prior art, only control for migrating all of the volumes that belong to the virtual N-Port of the migration source is disclosed (Patent Literature 1 and Patent Literature 2). In the first prior art, no method is disclosed for migrating only a portion of the multiple volumes belonging to either a single physical or virtual N_Port to either an arbitrary physical or virtual N_Port of the migration-destination storage apparatus. Similarly, in a third prior art, only control for migrating one volume belonging to the migration-source virtual N_Port is disclosed (Patent Literature 3).

However, in a conventional FC, all the domain switches belonging to a fabric must provide distributed services possessing the routing information and the zoning information of the entire FC Fabric. In accordance with this, when there is an increase in the number of domains belonging to the fabric, the distributed services must communicate and exchange information with each other. Therefore, there is a limit on the number of domain switches that can be disposed in a single fabric.

Accordingly, expanded standards for the FCoE (Fibre Channel over Ethernet, Non Patent Literature 2) have been proposed (Non Patent Literature 3 and Non Patent Literature 4). In an extended protocol, only one Primary FCF (FCoE Forwarder) is disposed inside a virtual domain (Virtual Domain), and distributed services are handled by the FCF. In addition, in an extended protocol, multiple FDF (FCoE Data Forwarder) are arranged inside the virtual domain. Each FDF is equipped with only a FC routing data transfer mechanism. The scalability of the number of ports of a single domain switch increases virtually in accordance with using a single FCF and multiple FDFs.

The number of virtual domain ports can be increased in accordance with the FDFs. The number of domain switches constitutes only one Control FCF, which controls the FDFs. The number of domains belonging to the fabric does not increase. The Control FCF distributes routing information to each FDF. Therefore, each FDF is able to carry out routing inside the FDF, and to communicate directly with the other FDFs that belong to the same virtual domain.

The FC fabric zoning configuration is granular access control to the FC port. The FC zoning configuration is also necessary for curbing the propagation range of the RSCN (Register State Change Notification), which is an FC topology change notification. The reason for this will be explained below. When the FC port receives the RSCN from the fabric, the FC port must query the state of the fabric once again. For this reason, server I/O is temporarily interrupted. When expanding the propagation range of the RSCN, the range of suspended server I/Os will expand, making it necessary to curb the propagation range using zoning.

LU granular access control is not possible with zoning since access control is in FC port units. Generally speaking, in a case where multiple LUs are associated with a single FC port in a storage apparatus, an LU that is accessed by a certain server can also be accessed by another server. Accordingly, an LU granular security configuration is required. A host group configuration is a task for mapping a logical volume number (LUN: Logical Unit Number) inside a storage apparatus to a host logical volume number (H-LUN: Host LUN) that can only be seen by an identified host (Patent Literature 4).

Accordingly, a TDZ (Target Driven Zoning) protocol has been proposed in recent years (Non Patent Literature 5 and Non Patent Literature 6). In the TDZ protocol, the storage apparatus port configures zoning in the fabric. Since this enables the user to carry out the zoning configuration when configuring the storage apparatus as well, the number of FC fabric management processes is reduced.

CITATION LIST

Patent Literature

[PTL 1]
U.S. Pat. No. 7,697,515
[PTL 2]
U.S. Pat. No. 7,697,554
[PTL 3]
US Patent Application No. 2010/0070722
[PTL 4]
U.S. Pat. No. 6,779,083

Non Patent Literature

[NPL 1]
T11/02-338v1: NPIV Functionality Profile http://www.t11.org/ftp/t11/member/fc/da/02-338v1.pdf
[NPL 2]
Fibre Channel—Backbone—5—Revision 2.00 (page 81-124) http://www.t11.org/ftp/t11/pub/fc/bb-5/09-056v5.pdf
NPL 3: T11/10-271v3: VA_Port FDF/Controlling FCF Protocols_http://www.t11.org/ftp/t11/pub/fc/bb-6/10-271v3.pdf
NPL 4: T11/10-465v0: FDF Routing http://www.t11.org/ftp/t11/pub/fc/bb-6/10-465v0.pdf
NPL 5: T11/10-265v1: Register Peer Names http://www.t11.org/ftp/t11/pub/fc/scm/10-265v1
[NPL 6]
T11/11-001v0: Principal/Peers Zoning in FC-GS-7 (page 1-13) http://www.t11.org/ftp/t11/pub/fc/gs-7/11-001v0.pdf

SUMMARY OF INVENTION

Technical Problem

It is difficult to apply the prior art in a case where a large number of servers, storage apparatuses, FC switches (FC Domain Switch, FCF, FDF) are coupled together in a single huge FC fabric. The reasons for this will be described below.

When migrating a FC port (N_Port) from one storage apparatus to another storage apparatus, server I/O (Input/Output) is interrupted. Therefore, the user must stop server I/O prior to FC port migration. Multiple LUs are associated with one port of the storage apparatus. Furthermore, a certain server accesses an identified LU. For this reason, at a large-scale data center, the interruption of I/O for a FC port of one storage apparatus interrupts the I/O of all the servers that access the storage apparatus through this FC port.

Alternatively, in a case where a virtual machine is to be migrated, after temporarily suspending I/O, the virtual machine resumes I/O at the migration destination. Therefore, the problem described in the above-mentioned FC port migration only occurs in the virtual machine during migration, and does not occur in another virtual machine or a physical server other than the migration-in-progress virtual machine.

The storage apparatus associates a large number of logical units (LU: Logical Unit) with one port. In a case where a port is to be migrated using NPIV, it is difficult to separately migrate each logical unit associated with this port to the migration-destination storage apparatus. As in the first, second and third prior arts, all of the logical units belonging to an FC port must be migrated in line with the migration of this FC port.

Therefore, in the prior art, it is not possible to partially migrate a portion of a logical unit group belonging to either one physical or logical FC port of a certain storage apparatus to another storage apparatus, resulting in low user usability.

It is supposed that different FC ports exist in the migration-destination storage apparatus, and that it was possible to carry out a migration in volume units to the migration-destination storage apparatus. The port name identifier of the FC port of the migration-destination storage apparatus differs from the port name identifier of the FC port of the migration-source storage apparatus. Therefore, the user must add a new rule to the zoning configuration to make it possible for the host and the FC port name identifier of the migration-destination storage apparatus to communicate. Since the FC fabric configuration must be changed in line with the volume migration between storage apparatuses, management is made cumbersome. Furthermore, in the TDZ-related prior art (Non Patent Literature 4), neither means for managing zoning associated with a logical unit, nor means for managing zoning associated with host group information (a group of logical unit groups that can only be seen from an identified host) are disclosed.

However, when migrating large numbers of either storage apparatus ports or server ports, the load is concentrated on the one control FCF. This will be explained more specifically. The FC standard has a restriction that makes it impossible for two FC ports having duplicate port identifiers (WWPN) to be logged in to the FC fabric at the same time. Therefore, in order to manage the state of the fabric consistently, the login-in-progress WWPN must be managed centrally, and the duplicate of the login-in-progress WWPN must be detected in accordance with the one control FCF.

In a case where a server port is to be migrated, after logging the virtual port (VN_Port) out, this virtual port must be logged in to the migration-destination physical server as the virtual port. Since this traffic is transferred from the FDF to the one primary control FCF, the control load is concentrated in the primary control FCF.

A port migration between storage apparatuses will be explained. There may be a case in which multiple logical units associated with a single storage port each communicate with different virtual servers. In this case, it is necessary to change the zoning configuration inside the virtual domain and throughout the fabric. In the prior art (Non Patent Literature 2 and Non Patent Literature 3), which extends the FCoE protocol, the primary control FCF distributes the zone information to each FDF. Therefore, the control load on the primary control FCF increases.

With the foregoing in mind, an object of the present invention is to provide a computer system and a computer system management method that is able to reduce the management load.

Solution to Problem

A computer system of the present invention is coupled via a FC fabric to one or more host computers having a FC node port and one or more storage apparatuses having a FC node port, wherein the storage apparatus acquires first information related to an access control for controlling access to a relevant storage apparatus by the host computer, and, based on the first information, creates second information for defining the host computer that is able to access the relevant storage apparatus, and registers the created second information in the fabric.

The first information constitutes a communication pair of the FC node port (storage port) of the storage apparatus and the FC node port (host port) of the host computer. The second information is zoning information related to a relevant target port capable of being sent from a target port of the storage apparatus to the FC fabric. Furthermore, FCoE is also included in the FC. The host port is the FC port of the host computer. The storage port is the FC port of the storage apparatus.

The storage apparatus may comprise a migration-source storage apparatus, which constitutes the migration source of a migration-target resource, and a migration-destination storage apparatus, which constitutes the migration destination of the migration-target resource. The migration-destination storage apparatus is able to acquire, either directly or indirectly, the first information from the migration-source storage apparatus, create the second information based on the acquired first information, and register the created second information in the fabric.

The first information may be first basic zoning information for defining, from among the host computers, the host computer that is able to access the migration-source storage apparatus, and the second information may be second basic zoning information for defining, from among the host computers, the host computer that is able to access the migration-destination storage apparatus. The migration-destination storage apparatus can create the second basic zoning information by changing information denoting the migration-source storage port of the migration-source storage apparatus within the information included in the first basic zoning information to information denoting the migration-destination storage port of the migration-destination storage apparatus. The basic zoning information is information that becomes the basis for creating zoning information for zoning control.

The first information may be created as host group information, which associates a host computer WWPN with a storage apparatus internal LU.

The second information may be zoning information related to a target port that can be sent from a storage apparatus target port to the FC fabric. It is zoning information related to a target port, and is not the zone information of the entire FC fabric.

The second information may be the second basic zoning information for defining, from among the host computers, the host computer that is able to access the migration-destination storage apparatus. The migration-destination storage apparatus can create the second basic zoning information based on the host group information and information denoting the migration-destination storage port of the relevant migration-destination storage apparatus.

In addition, the first information may be information related to a FC security authentication protocol.

Furthermore, in a case where the migration-destination storage apparatus reads the first information from the migration-source storage apparatus, the first information may be host group information that is in the migration-source storage apparatus. Or, the first information may be PLOGI (port login) information from the host port. Or, the first information may be FC security authentication information related to the FC port of the migration-source storage apparatus. Or, the first information may be zoning information. This zoning information is a zone set comprising the WWPN of a target port associated with the migration-target volume of the migration-source storage apparatus.

In a case where the migration-destination storage apparatus reads the first information from the migration-source storage apparatus, the second information may be created in the migration-source storage apparatus. That is, the configuration may be such that the second information is not created by the migration-destination storage apparatus.

The present invention can also be understood as a management method of the computer system. In addition, the present invention can also be understood as a control program of the computer system. The control program can be distributed via either a communication medium or a storage medium. In addition, the present invention can also be understood as a computer system switch.

BRIEF DESCRIPTION OF DRAWINGS

FIG. 8 (a) shows the configuration of a FC frame, and FIG. 8 (b) shows the configuration of a FCoE frame.

FIG. 9(a) shows the configuration of a LUN field in a FCP_CMND, FIG. 9(b) shows a LUN device address format, FIG. 9(c) shows a LUN flat space format, and FIG. 9(d) shows a logical unit addressing format.

FIG. 10(e) shows an extended LUN address format, FIG. 10(f) shows a 3-byte extended flat space format, FIG. 10(g) shows a Well Known LUN format, and FIG. 10(h) shows a W-LUN type code.

FIG. 11 shows a table for a management server to manage the internal LUNs of multiple storage apparatuses.

FIG. 12 shows the changes in the internal LUNs of each storage apparatus in a case where a volume has been migrated between storage apparatuses.

FIG. 13 is a VPD (Vital Product Data) format of SCSI showing a LUN name identifier, FIG. 13(a) shows a Device ID VPD information format, FIG. 13(b) shows designator information stored in Device ID information, FIG. 13(c) shows a table classifying types of designator information, and FIG. 13(d) shows the format of a logical unit manufacturing number (Unit Serial Number VPD).

FIG. 26 is control information for associating host group-related target zoning information possessed by the storage apparatus.

FIG. 41 shows a zoning information request message, FIG. 41 (a) shows the request, FIG. 41 (b) shows a portion of the entry for FIG. 41(a), FIG. 41(c) shows the response, and FIG. 41(d) shows a portion of the entry for FIG. 41(c).

FIG. 42 is a zoning information response message, FIG. 42(a) shows a request format, and FIG. 42(b) shows a response format.

FIG. 44 is a ladder chart showing a method for the control FCF to distribute zoning information held by the control FCF to the respective FDFs.

DESCRIPTION OF THE EMBODIMENT

The embodiment of the present invention will be explained below based on the drawings. This embodiment, as will be explained hereinbelow, provides a method for migrating a virtual resource for reducing the management load of a virtual resource migration. Furthermore, the configuration shown in FIG. 1 is merely one example of the present invention, and the present invention is not limited to the configuration shown in FIG. 1.

An overview of this embodiment will be explained by referring to FIG. 1. Furthermore, the present invention is not limited to the configuration shown in FIG. 1. FIG. 1 shows a process via which the storage apparatus creates zoning information (more precisely, basic zoning information, which will be explained further below) and registers this zoning information in the FC fabric, and a process via which the FC zoning information is distributed within the FC fabric.

The present invention does not have to comprise all of these processes. A configuration such that the storage apparatus only creates and registers the zoning information in the fabric is also included within the scope of the present invention. A configuration such that the zoning information is distributed from one FDF to another FDF is also included within the scope of the present invention.

Figure 1:
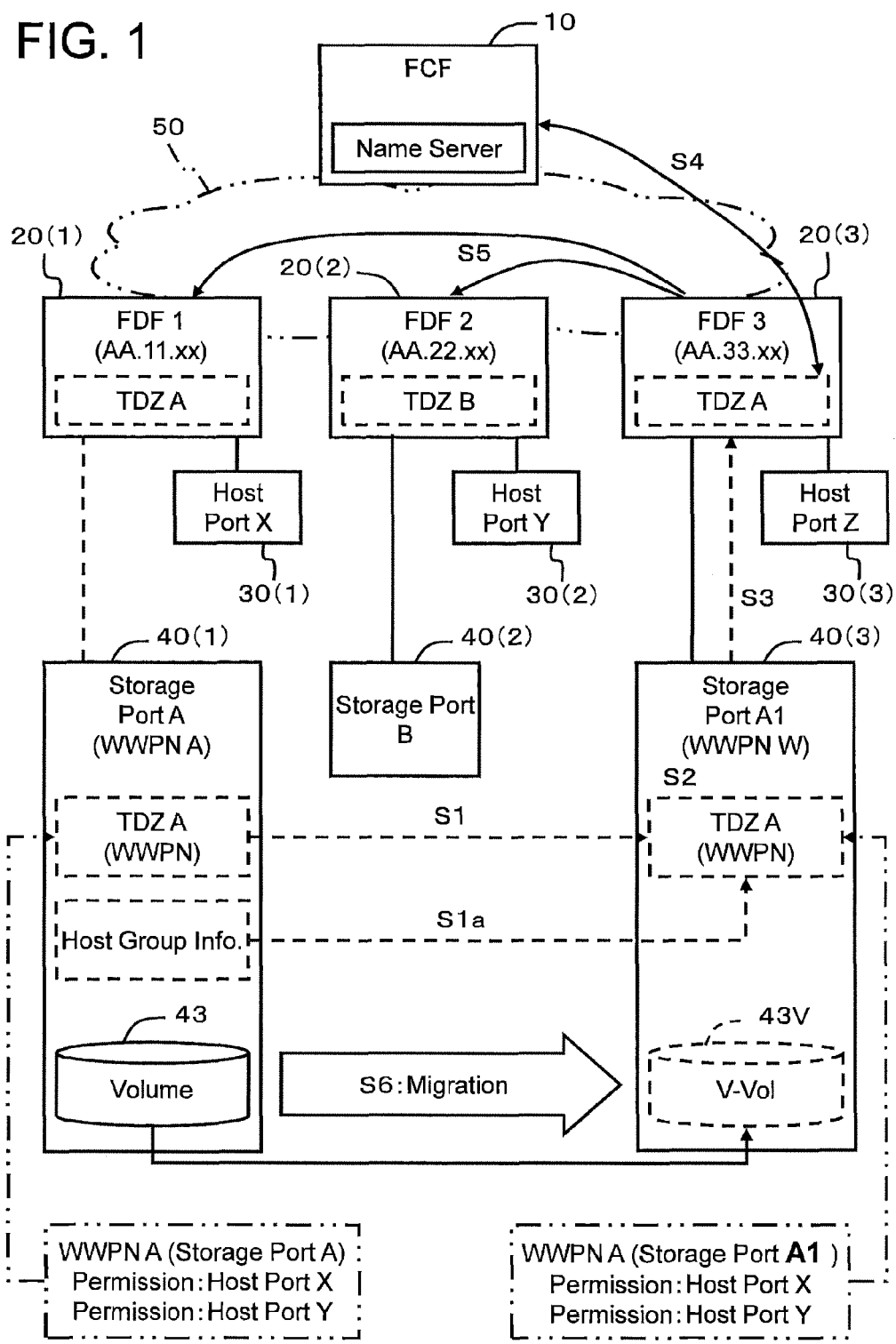
FIG. 1 is a schematic diagram showing an overview of the entire embodiment.

FIG. 1 shows an overview of the entire configuration of the computer system. In the computer system, for example, multiple host computers 30(1), 30(2), 30(3) and multiple storage apparatuses 40(1), 40(2), 40(3) are coupled to enable two-way communication via a fabric 50.

Furthermore, when no particular distinction is made, the host computers 30(1), 30(2), 30(3) will be called the host computer 30, and the storage apparatuses 40(1), 40(2), 40(3) will be called the storage apparatus 40. The same will hold true for the FDF and so forth described further below. The host computer 30 may be called the server 30 in the examples explained below.

The fabric 50 is configured as a FCoE fabric, but may also be configured as a FC fabric 60 as will be explained below. The fabric 50 comprises one FCF 10 and multiple FDFs 20(1), 20(2), 20(3). The FCF 10 comprises a name server, and centrally manages names inside a domain. The respective FDF 20 control the transfer of frames. The respective FDF 20 comprise zoning information.

Although omitted from FIG. 1 for expediency sake, each storage apparatus 40 comprises multiple ports. Each port can be associated with multiple logical volumes 43. In this embodiment, either one or multiple arbitrary volumes from among the multiple volumes associated with a certain port of the storage apparatus 40(1) is/are migrated to the storage apparatus 40(3) and are associated with the port of the storage apparatus 40(3). Host group information is associated with the migration-target volume. The host group information related to this volume is also transferred to the storage apparatus 40(3) in line with migrating a portion of the volumes from the storage apparatus 40(1) to the storage apparatus 40(3). A configuration in which multiple volumes are associated with one port, and a portion of the volumes from thereamong is migrated will be disclosed using FIGS. 17 and 21 described further below.

A case in which a volume 43 is migrated from the storage apparatus 40(1) to the storage apparatus 40(3) as the migration-target resource will be explained. The migration-source storage apparatus 40(1) comprises access control information (TDZ A) for managing the port (host FC port) of the host computer 30 that is allowed to access the storage RC port. Depending on the situation, the host group information may be used instead of this access control information. The host group information is for managing a LUN that can only be seen by the host computer 30. The access control information is equivalent to either "first information" or "first basic zoning information". The host group information is equivalent to the "first information". The host group information denotes the relationship between the storage apparatus host WWPN and the internal LU accessed by the host port.

The migration-destination storage apparatus 40(3) acquires from the migration-source storage apparatus 40(1) target zoning information that has been created in the migration-source storage apparatus 40(1) (S1). Or, the migration-destination storage apparatus 40(3) acquires from the migration-source storage apparatus 40(1) the host group information of the migration-source storage apparatus 40(1) that has been configured beforehand by an administrator (S1a).

As will be explained further below, there are multiple acquisition methods. For example, the migration-destination storage apparatus 40(3) may read the access control information from the migration-source storage apparatus 40(1). The access control information may be sent from the migration-source storage apparatus 40(1) to the migration-destination storage apparatus 40(3). Or, the migration-destination storage apparatus 40(3) may acquire FC fabric zoning information from the fabric 50, and may acquire information denoting which host computer the migration-target volume is communicating with.

Furthermore, the host computer performs a port login (PLOGI) with respect to the port of the storage apparatus. Therefore, the port WWPN of the host computer that is currently in the process of carrying out an access can also be collected from the port login information. Exchanging this port login information between the storage apparatuses also makes it possible to create the zoning information that is to be configured in the FC fabric.

The migration-destination storage apparatus 40(3) creates new access control information based on the information acquired from the migration-source storage apparatus 40(1) (S2). The new access control information is equivalent to either "second information" or "second basic zoning information".

This will be explained by giving access control information (TDZ A) defined using WWPN as an example. The migration-destination storage apparatus 40(3) changes the storage port number (storage port A) included in the information (TDZ A) acquired from the migration-source storage apparatus 40(1) to the storage port number (storage port A1) of its own apparatus.

The migration-destination storage apparatus 40(3) sends the access control information (TDZ A) with the rewritten storage port number to the FDF 20(3) that is directly coupled to the storage port identified by this storage port number (S3). The FDF 20(3) is equivalent to a "coupling-destination second switch".

The FDF 20(3) asks the FCF 10 for a name resolution for the information (TDZ A) received from the migration-destination storage apparatus 40(3) (S4). The FCF 10 uses the name server to convert the WWPN to the N_Port ID, and returns this N_Port ID to the FDF 20(3) (S4). In accordance with this, zoning information that serves as "third information" is completed.

The FDF 20(3), which created the zoning information, sends this zoning information to each of the other FDFs 20(1), 20(2), where it is stored (S5). Specifically, the zoning information is distributed to all the FDFs 20 that are able to receive a frame that is transferred to the migration-destination storage apparatus 40(3). The zoning information is distributed to the other FDFs 20(1), 20(2) from the FDF 20(3) that created this zoning information without going through the FCF 10.

Distributing the zoning information to the other FDFs, for example, signifies sending and registering the zoning information in the other FDFs to either execute zone control or to complete preparations for executing zone control.

Thereafter, the volume 43 is migrated from the migration-source storage apparatus 40(1) to the migration-destination storage apparatus 40(3) (S6). There are multiple methods for migrating a volume.

One method is to create a virtual logical volume (hereinafter, virtual volume) 43V inside the migration-destination storage apparatus 40(3), and to associate this virtual volume 43V with the migration-source logical volume 43.

When the host computer 30 accesses the virtual volume 43V, the migration-destination storage apparatus 40(3) accesses the logical volume 43 inside the migration-source storage apparatus 40(1) and reads the data. In other words, the storage space of the logical volume 43 and the storage space of the virtual volume 43V are associated on a one-to-one basis. The migration-destination storage apparatus 40(3), upon receiving a command from the host computer 30, converts this command to a migration-source storage apparatus 40(1) command and sends this converted command to the migration-source storage apparatus 40(1). The migration-destination storage apparatus 40(3) receives the command processing result from the migration-source storage apparatus 40(1) and responds to the host computer 30.

Another volume migration method is to send the data of the logical volume 43 in the migration-source storage apparatus 40(1) to all the logical volumes created in the migration-destination storage apparatus 40(3). After completing the data migration, the migration-source volume 43 may be deleted or may be kept as-is.

A case in which, during volume 43 movement, the migration-destination storage apparatus 40(3) creates basic zoning information and registers this information in the fabric 50 at volume migration time has been described, but the configuration may also be such that the basic zoning information is registered in the fabric 50 at another time. Furthermore, the migration-target resource is not limited to a single volume 43, but rather may be multiple volumes that have been grouped together, or a storage port.

In this embodiment, which is configured like this, in a case where a resource is to be migrated between storage apparatuses 40, the storage apparatus 40 can automatically modify the basic zoning information for creating the zoning information, and register this basic zoning information in the fabric. Therefore, in this embodiment, management problems can be lessened and usability improved.

When virtual machines or volumes (LU) are frequently migrated, a large number of storage apparatuses must distribute zoning information to the fabric. In the past, transactions were numerous due to the fact that the FCF distributed the zoning information to multiple FDFs. By contrast, in this embodiment, distributing the target zone information received from the storage port from the FDF that received this information to the multiple other FDFs reduces the number of FCF transactions. As a result of this, the size of the virtual domain, which specifies all of the multiple FDFs controlled by the FCF, can be increased. In addition, no control bottlenecks occur in the fabric no matter how frequently a virtual machine or volume is migrated.

EXAMPLE 1

Figure 2:
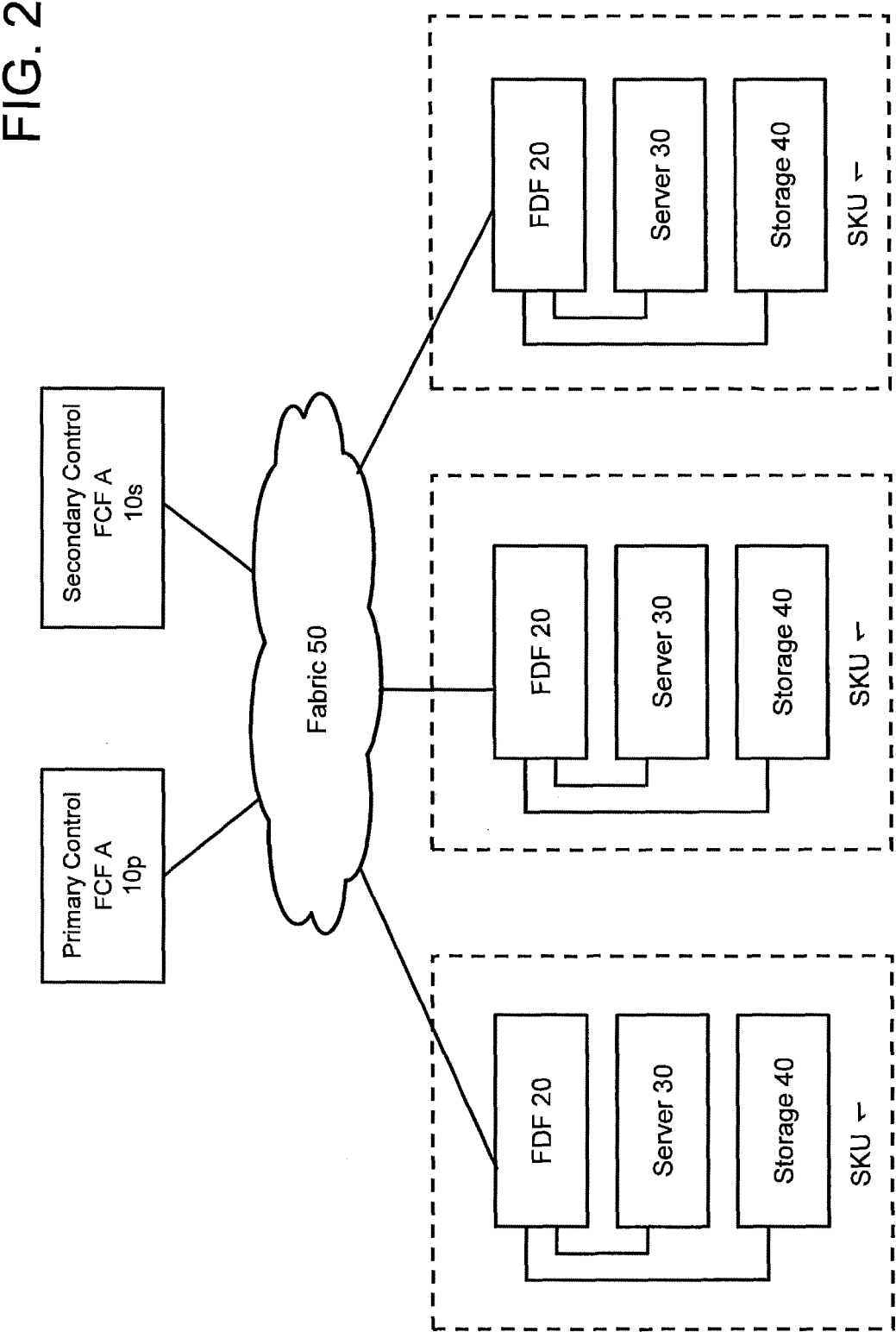
FIG. 2 is a simple overview of a computer system in a case where a FCoE fabric is used.

A first example will be explained by referring to FIGS. 2 through 29. FIG. 2 shows the configuration of the computer system in a case where the FCoE fabric is used.

A SKU (Stock Keeping Unit), for example, is a unit that is configured in 19-inch rack units. The SKU 1 is equipped respectively with a network apparatus 20, a server 30(a host computer 30), and a storage apparatus 40 in accordance with customer system requirements. The SKU is the unit for shipping a tested apparatus from the factory.

The computer system of FIG. 2 comprises a fabric 50 that carries the FCoE protocol. The fabric 50, for example, is configured as an Ethernet fabric (Ethernet is a registered trademark). Two FCFs 10$p$ and 10$s$, which comprise a redundant configuration, are coupled to the fabric 50.

The FCF 10$p$ is the FCF for carrying out primary control. The FCF 10$s$ is a secondary FCF, which is on active standby. The primary FCF 10$p$ sends its own information to the secondary FCF 10$s$ information, and synchronizes this information. Each SKU1 is provided with a FCoE frame routing function-specific FDF 20. The primary FCF controls the respective FDFs. Each FDF transfers frames and carries out access control based on the routing information and the zoning information from the FCF.

Figure 3:
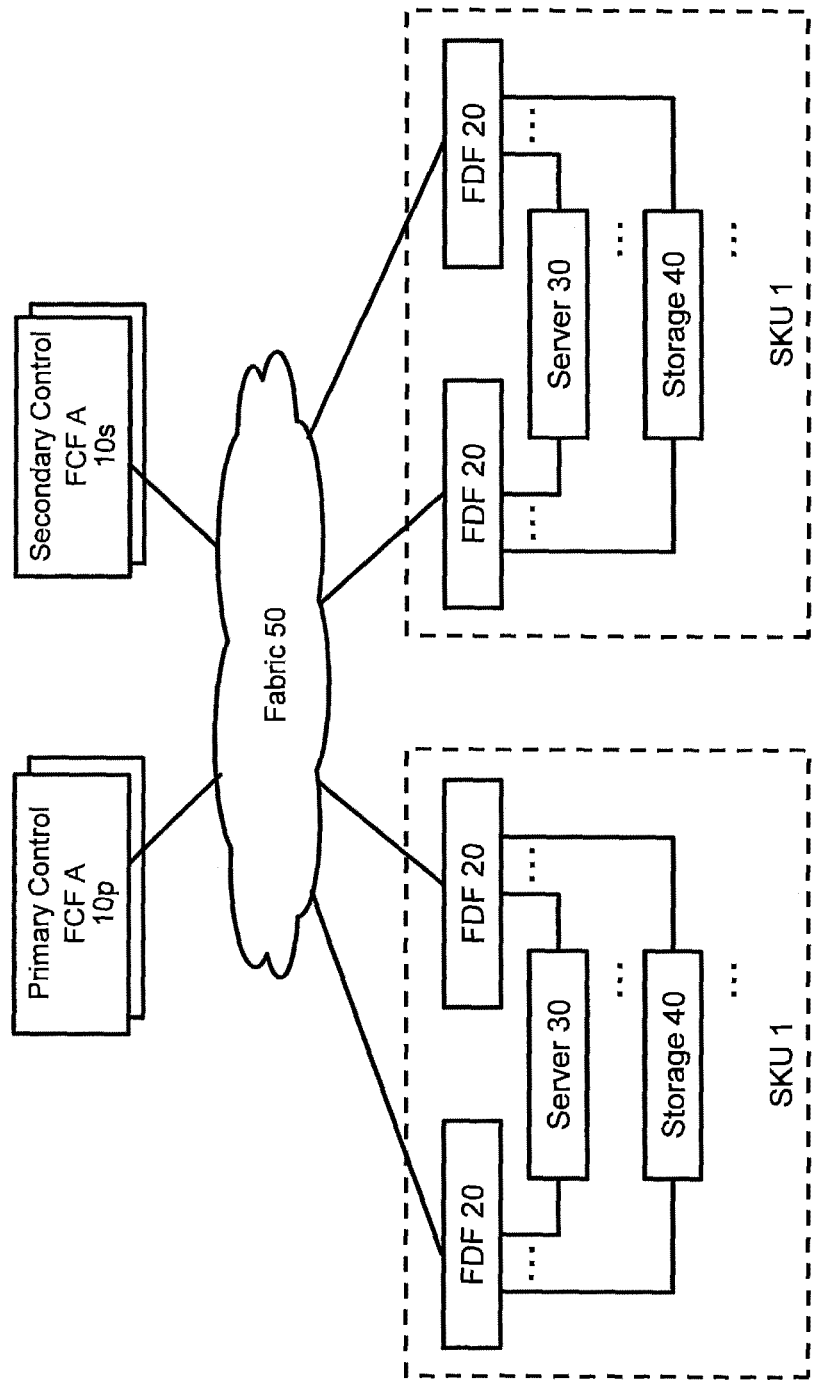
FIG. 3 is a simple overview of the computer system in a case where a redundant configuration of the fabric in FIG. 2 is used.

FIG. 3 shows a simple overview of the computer system in a case where a redundant fabric configuration is used. The fabric 50 is a communication network comprising a configuration having redundancy. Specifically, the fabric 50 comprises dual switches FCF 10$p$, 10$p$, 10$s$, 10$s$. Even if a failure occurs in the one switch, the other switch operates in its place. Therefore, even if a failure should occur, all the SKU1$s$ can access the network. Because of redundancy, multiple FDFs 20 are disposed inside the SKU1.

Figure 4:
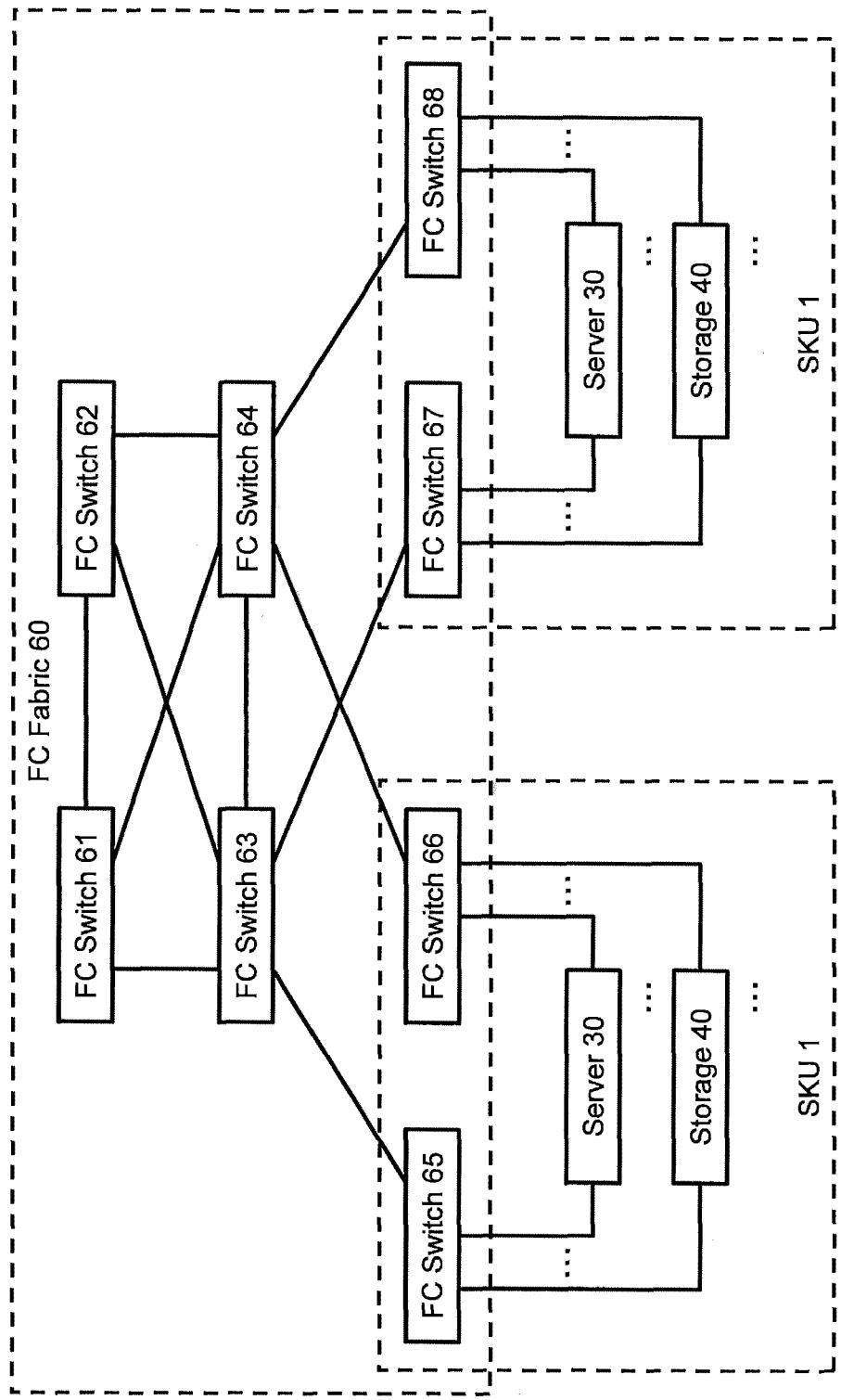
FIG. 4 is a simple overview of the computer system in a case where a FC fabric is used.

FIG. 4 shows a simple overview of the computer system in a case where a FC fabric 60 is used in the configuration of FIG. 3. FIG. 4 separately comprises fabric 50, but this fabric 50 has been omitted from the drawing. In the FC fabric 60, multiple FC switches 61 through 68 are connected in mesh fashion, and even if one of the FC switches should fail, either the server 30 or the storage apparatus inside the SKU1 will be able to communicate with either the server 30 or the storage apparatus 40 inside the other SKU1.

Figure 5:
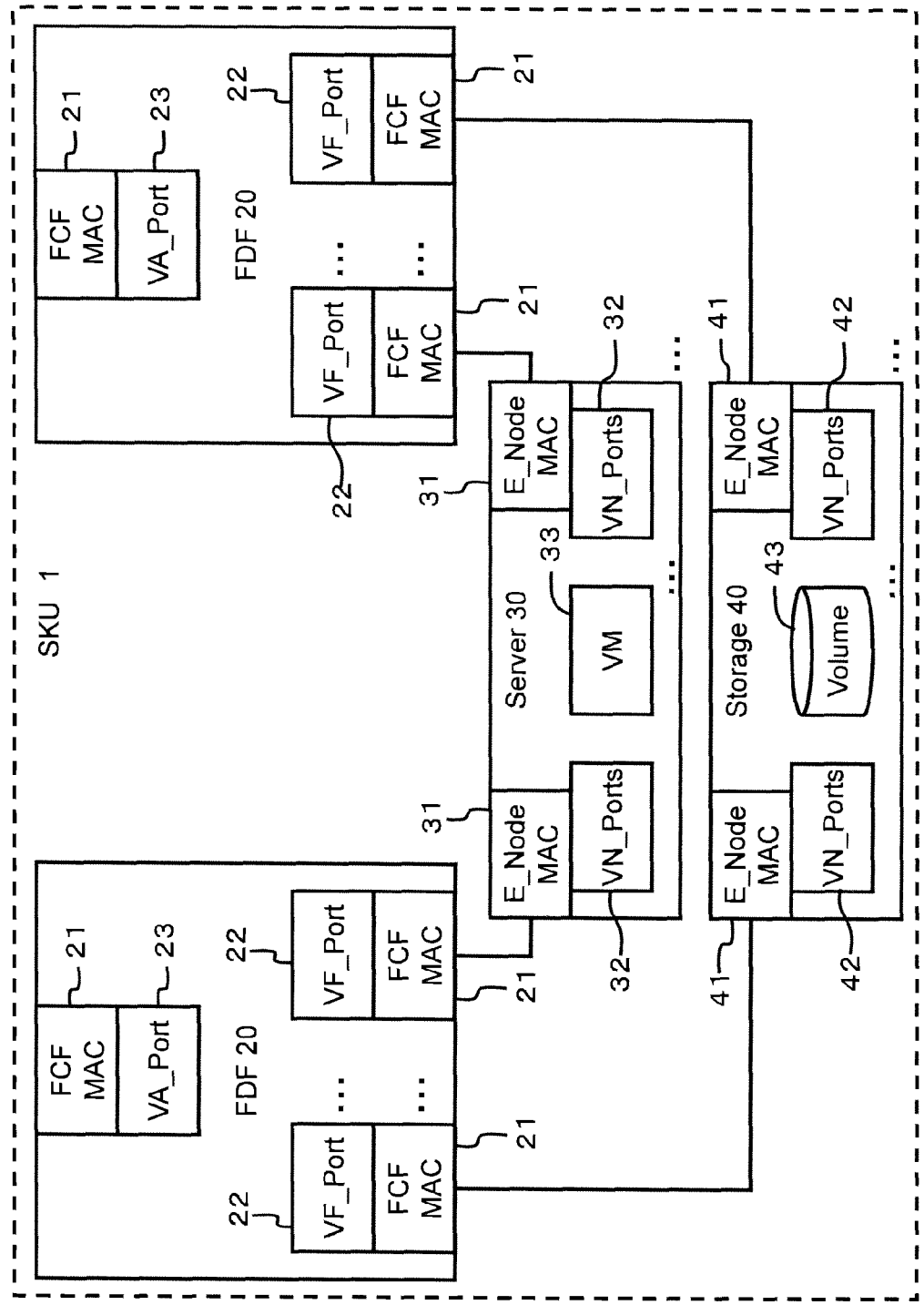
FIG. 5 shows an internal configuration of a SKU (Stock Keeping Unit).

FIG. 5 is an example of the internal configuration of the SKU. In the SKU1, for example, there are disposed a server 30, a storage apparatus 40 and a network apparatus 20. The example of FIG. 5 shows FDFs 20, which support both Ethernet (registered trademark) and FCoE communications, as network apparatuses. Furthermore, the network is shown as comprising a redundant configuration.

Each configuration element of FIG. 5 will be explained. The server 30 serving as the "host computer", for example, has at least one virtual machine (VM) 33 and multiple E_Node MACs 31. The E_Node MAC (FCoE Node Media Access Control) is a lossless Ethernet physical port. The E_Node MAC 31 carries out the login process, which is a procedure for participating in the FC fabric. Furthermore, the server 30 is described here as comprising a virtual machine 33, but the present invention can also be applied to a configuration in which a virtual machine does not exist.

The E_Node MAC 31, upon logging in to the FC Fabric, can create one or more VN_Ports (virtual node port) 32 instances. This instance creation function will be called a FC NPIV (N_Port ID Virtualization).

Each VN_Port 32 and virtual machine 33 may correspond on a one-to-one basis. Allocating a VN_Port 32 for each virtual machine 33 makes it possible to take over and migrate the port identifier (WWPN: World Wide Port Name) of the VN_Port 32 in a case where the virtual machine 33 on the physical server 30 migrates to another physical server.

Taking over the WWPN of the VN_Port 32 makes it possible to migrate the virtual machine 33 to another physical server 33 without changing the zoning, which is the FC fabric ACL (Access Control List). This does away with the need to change the network configuration at the time of virtual machine migration, thereby making it possible to lessen the management load.

The storage apparatus 40 of FIG. 5 has an E-Node MAC 41 the same as the server 30. The E_Node MAC 41, upon having logged in to the FC fabric, creates a VN_Port 42 instance. One or more VN_Port 42 instances are created with respect to one E_Node MAC 41.

The storage apparatus 40 can comprise multiple physical volumes 43 and virtual volumes 43V (refer to FIG. 1). The virtual volume 43V is coupled to a logical volume of the other storage apparatus. The data of the virtual volume 43V is actually stored in this coupling-destination logical volume.

The FDF 20 comprises multiple FCF MACS 21, which are physical ports. The FCF MAC 21 supports two types of ports 22 and 23 corresponding to the coupling destination. A VA_Port 23 is an extension port for extending between the FCF 10 or FDF 20 and the switch. A VF_Port 22 is a fabric coupling port for coupling to the E_Node MAC and creating a VN_Port instance. The FDF 20 will be explained further below.

Figure 6:
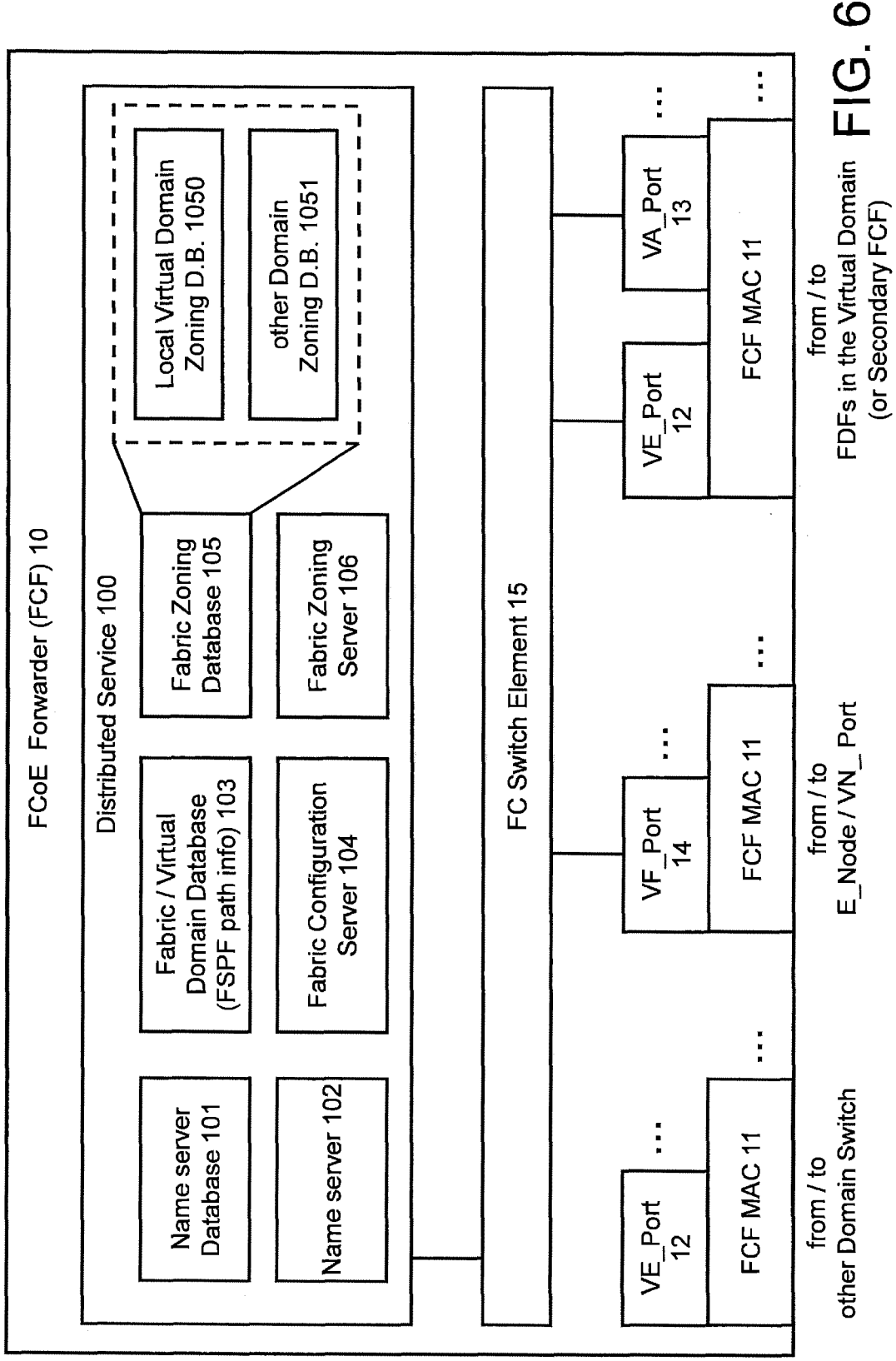
FIG. 6 is a block diagram of a FCoE Forwarder (FCF).

FIG. 6 is the internal configuration of a FCoE forwarder (FCF) that is able to control the FDF. The FCF 10 has a FC switch element 15. The FC switch element 15 is coupled to the respective ports 12, 13, 14, and carries out FC DID (Destination ID) routing.

The FC switch element 15 is coupled to a distributed service 100. The distributed service 100 detects and retains the information of the respective ports 12, 13, 14, topology management of the FC fabric, and device information.

The distributed service 100 is configured from programs 102, 104, 106 and databases 101, 103, 105. The distributed service 100 is realized by the processor inside the FCF 10 executing a program stored in the memory. The same holds true below for the other apparatuses, but the processor and memory have been omitted from the drawings.

The FCF 10 has multiple types of ports. A VE_Port 12 is an extension port for forming a switch-link with the FCF 10, which has been given another domain number. A VF_Port 14 is a port for coupling to the ENode. The VE_Port and VF_Port are not able to reside together inside the same FCF MAC 11.

A VA_Port 13 is a Virtual Adjacent Port for forming a switch-link for coupling the FCF to the FDF that is under the control of the FCF.

The distributed service 100 of the FCF 10 comprises a program and a database for managing the topology of the FC. A name server 102 and a name server database 101 store either the port name identifier (WWPN) or the node name identifier (WWNN) of the node port that is logged in to the fabric.

In addition, the name server 102 comprises a program for allocating a node port identifier (N_Port ID) corresponding to the WWPN when the node port logs in to the fabric.

The name server database 101 comprises a table, which includes a WWPN, a WWNN, and a N_Port ID. As other entries, the database 101 has a symbolic name, a FC4-type, a FC-4 feature, and so forth. For example, when a query is made with respect to the name server 102, an initiator queries a device, which is supporting FCP (Fibre Channel over SCSI Protocol) as the FC-4 type. In accordance with this, the initiator acquires a target port capable of SCSI communication. This name server query method may also be a method for querying a device that has the FC-4 feature target port attribute.

A fabric configuration service (fabric configuration server) 104 and a fabric/virtual domain database 103 manage the topology of the fabric and manage the port link state of each switch.

The switch-link makes it possible to acquire the coupling state of a switch by exchanging messages notifying the link state. The switch-link makes it possible to acquire either information as to whether or not a coupling exists or the coupling state of the partner device that is coupled to each switch by acquiring a list of port states. In accordance with this information, it is possible to detect the topology of the entire fabric.

A fabric zoning service (fabric zoning server) 106 and a fabric zoning database 105 merge the zoning configuration information of the respective switches in the fabric, and retain all the zoning information.

The fabric zoning database 105 here comprises two types of databases 1050 and 1051. One is a zoning database 1050 with respect to a local virtual domain controlled by the FCF 10. The other is a zoning database 1051 with respect to another domain that is under the control of another FCF. Zoning operations will be described further below.

Figure 7:
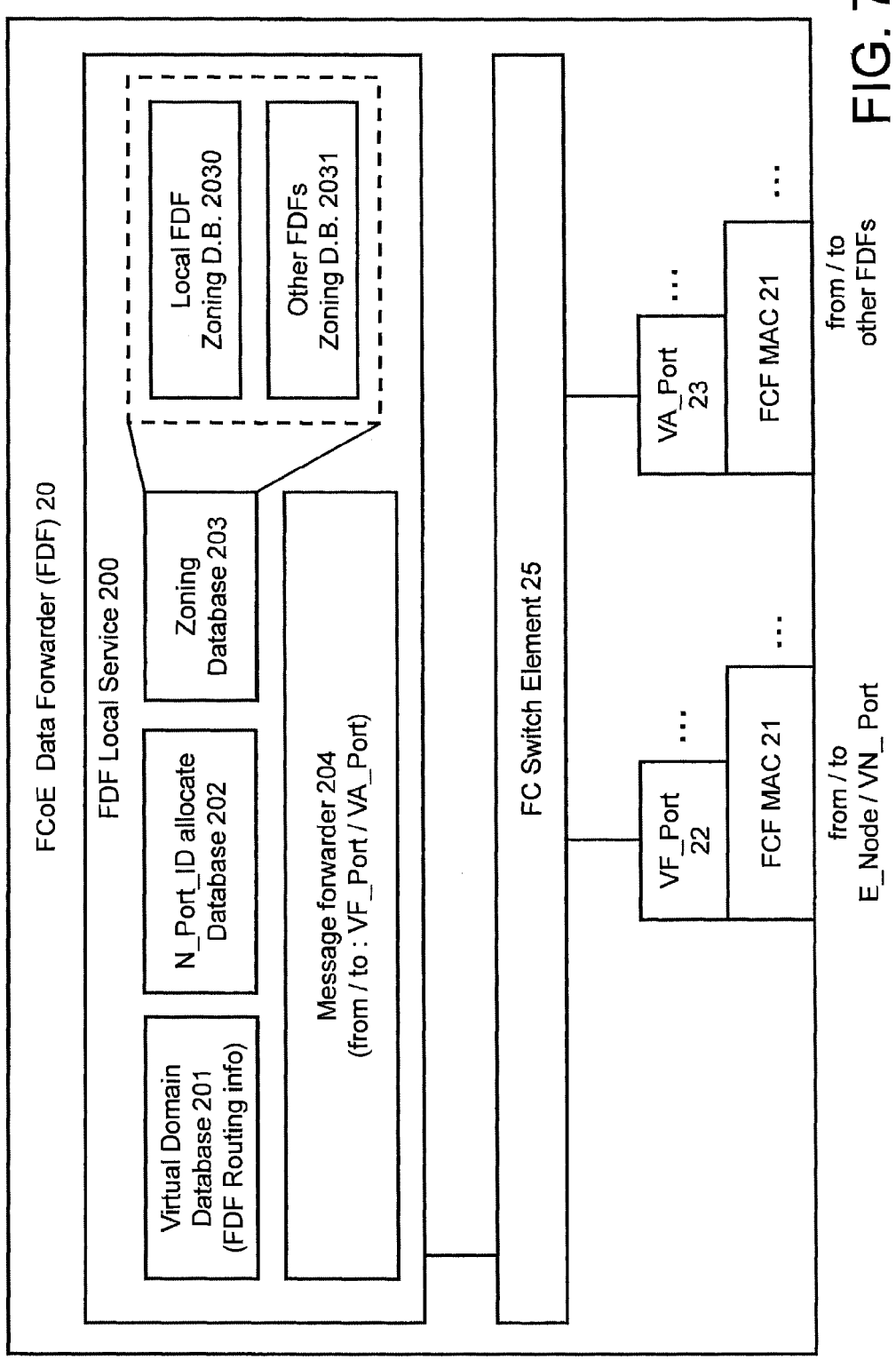
FIG. 7 is a block diagram of a FCoE Data Forwarder (FDF).

FIG. 7 shows the internal configuration of the FDF 20. The FDF 20, for example, comprises a FCF MAC 21, a VF_Port 22, a VA_Port 23, a FC switch element 25, and a FDF local service 200. Explanations that duplicate those of FIG. 6 will be omitted.

The FDF local service 200 is a service for transferring a control message from the VF_Port 22 of the FDF 20 to the FCF 10, and for receiving a control message from the FCF 10 and configuring the FDF 20. The FDF local service 200 is configured from a program 204 and databases 201, 202, and 203. The FDF local service 200 is realized in accordance with the processor inside the FDF 20 executing a program stored in the memory.

The FDF local service 200 will be explained in detail. A control message, which is received from either the VF_Port 14 or the VA_Port 13, is received by a message transfer program 204. The message transfer program 204 converts the received control message to another message as needed, and sends this converted message.

A virtual domain database 201 stores virtual domain internal routing information, which is held in a N_Port ID Range Allocation message received from the FCF 10.

A N_Port ID allocation database 202 stores a correspondence table of N_Port IDs and WWPNs. When the E_Node that is coupled to the VF_Port 22 logs in to the fabric, a N_Port ID is allocated from the FCF 10. That is, the N_Port ID allocation database 202 is a name server database, which corresponds to a VN_Port created when the E_Node coupled to the FDF 20 logs in to the fabric. This database 202 holds only local information, and does not comprise information with respect to another FDF 20 or information with respect to another domain.

A zoning database 203 holds zoning information, which is distributed from the FCF 10, the FDF 20, or the VN_Port of the E_Node. The zoning database 203 is divided into two databases.

One is a local FDF zoning database 2030, which holds zoning information distributed from either the FCF or the E_Node VN_Port. The other is a zoning database 2031, which is distributed from another FDF in the same virtual domain. The use of these databases will be explained further below.

Refer to FIG. 8. FIG. 8 (a) shows the configuration of a FC frame. FIG. 8 (b) shows the configuration of a FCoE frame. In the case of the FC, a D_ID 81 is used to determine the routing destination of the FC frame. In the case of the FCoE, an Ethernet Header part is removed by the VF_Port, the VE_Port, or the VA_Port, and the FC frame is selected. Then, the FC switch element performs routing using the DID 81 inside the received FC frame.

Either the FCF or FDF VF_Port, VE_Port, or VA_Port has a FCF MAC comprising a unique MAC Address. For this reason, a DA 83 and a SA 84 are changed each time a frame passes through either the FCF or FDF, and the frame is routed through the fabric 50 in accordance with the MAC Address.

Refer to FIGS. 9 and 10. FIG. 9 (a) shows a LUN field structure of a FCP_CMND. FIG. 9 (b) shows a LUN device address format. FIG. 9(c) shows a LUN flat space format. FIG. 9(d) shows a logical unit addressing format. FIG. 10(e) shows an extended LUN addressing format. FIG. 10(f) shows an extended flat space format. FIG. 10(g) shows a Well Known LUN format. FIG. 10(h) shows a W-LUN type code.

FIG. 9(a) is the structure of a FCP_CMND LUN field. An information unit, such as FCP_CMND and FCP_DATA is stored in the FC Data field of the FC Frame. The FCP_CMND format has an 8-byte LUN field for specifying a SCSI logical unit number. A number of formats are defined in the LUN in accordance with the address method field.

FIG. 9 (b) shows the LUN device address format. This format can specify a 1-byte Target/LUN. FIG. 9(c) shows a LUN flat space format. This format can specify a 14-bit flat LUN.

FIG. 9(d) shows a logical unit addressing format. This format is capable of specifying both a SCSI bus Target/BUS number and a LUN. This is a configuration in which multiple initiator ports (bus number fields) are disposed under a certain SCSI device target port, these initiator ports comprise multiple target ports (Target fields), and multiple LU (LUN fields) are disposed under these target ports.

FIG. 10(e) shows an extended LUN addressing format. The role of this format will change in accordance with the extended address method field, and this format will be classified into either the format of FIG. 10(f) or FIG. 10(g).

FIG. 10(f) is an extended flat space format. This format extends the configuration of FIG. 9(c). The extended flat space LUN stores a value obtained by combining a storage apparatus management number, a storage apparatus target port number, a LUN and so forth as information related to a volume migration between storage apparatuses. This makes it possible to use a management server 70(Refer to FIG. 15) to check to determine which storage apparatus created the volume to be migrated between storage apparatuses. This configuration will be explained further below using FIGS. 11 and 12.

FIG. 10(g) shows a Well Known LUN format. FIG. 10(h) shows a table of W-LUN type codes. A case in which the W-LUN code is 0x01 denotes a special logical unit that responds to REPORT LUNS. For example, having a REPORT LUNS W-LUN makes it possible to migrate a logical unit with LUN number 0 to another storage apparatus. In addition, for example, as will be explained further using FIG. 17, it is also possible to extend this function to configure a W-LUN 86 for managing target port zoning for acquiring zoning information between storage apparatuses. FIGS. 11 and 12 are tables showing the status of an internal LUN of each storage apparatus managed in accordance with the management server. These tables are management information used for tracing a volume migration between storage apparatuses.

The table T10 shown in FIG. 11 shows the state prior to migrating the volume between the storage apparatuses. FIG. 12 is the state subsequent to migrating the volume between the storage apparatuses as indicated by the three LUNS L21, L22 and L23, which are shown in L10 of FIG. 11.

Each table T10 and T20, for example, comprises a storage name column C10, a storage ID column C11, a total number of LUs column C12, and a list of LUNs column C13. The name of a storage apparatus is configured in the storage name column C10. Information for identifying each storage apparatus is configured in the storage ID column C11. A total value of the number of LUs of the storage apparatus is configured in the total number of LUs column C12. The LUNs of the storage apparatus are configured in the form of a list in the list of LUNS column C13.

Using the extended LUN format makes it possible to manage which storage apparatus created a LUN. Specifically, for example, storing a storage ID 92 in the first byte of the extended LUN makes it possible to determine that the LUN of storage apparatus A has been migrated.

For example, volume (00 00) of storage apparatus A shown in L10 of FIG. 11 is migrated to storage apparatus B as indicated by L21 of FIG. 12. An extended LUN (D2 0A 00 00) is configured with respect to the post-migration volume. 0A denotes that the volume has been migrated from storage apparatus A.

FIG. 13 is SCSI VPD (Vital Product Data) formats showing a LUN name identifier taken over in line with the migration of a storage apparatus volume. FIG. 13(a) shows a device ID VPD information format. FIG. 13(b) shows designator information stored in the device ID information. FIG. 13(c) shows a classification table of designator information type information. FIG. 13(d) shows a logical unit manufacturing number (Unit Serial Number VPD) format.

The volume name identifier (also called the World Wide LU Name) must be taken over when a volume is migrated between storages. This is because, in order to determine that the same volume is accessed from multiple paths, path switching software and the like for managing multiple paths use the volume name identifier to determine that the volume is the same volume. Therefore, even though the port name identifier of the storage apparatus may differ, in a case where the name identifier of the accessible volume ahead is the same, the path switching software recognizes that multiple paths are able to access the same volume. The path switching software recognizes the volumes having the same name identifier as a single volume capable of being accessed via multiple paths.

The volume name identifier can be created by combining the designator (for example, includes the ASCII code of the name of the vendor) of FIG. 13(a) and the apparatus serial number of FIG. 13(d). This makes it possible to create an identifier that is unique world wide. Therefore, this identifier is used as the volume name identifier. The management terminal for managing multiple storage apparatuses can also assign a unique volume name identifier virtually. The volume name identifier may also be created by a stand-alone storage apparatus using the apparatus manufacturing number.

When migrating a volume between storage apparatuses, the volume name identifier is added as the volume name identifier of the virtual volume of the other storage apparatus. Therefore, a volume having the volume name identifier is created once again by the source storage apparatus, and managed so that the volume name identifier is not duplicated. Accordingly, the same volume name identifier as that of the migrated volume is managed in accordance with the management information T20 of FIG. 12 until deleted.

Figure 14:
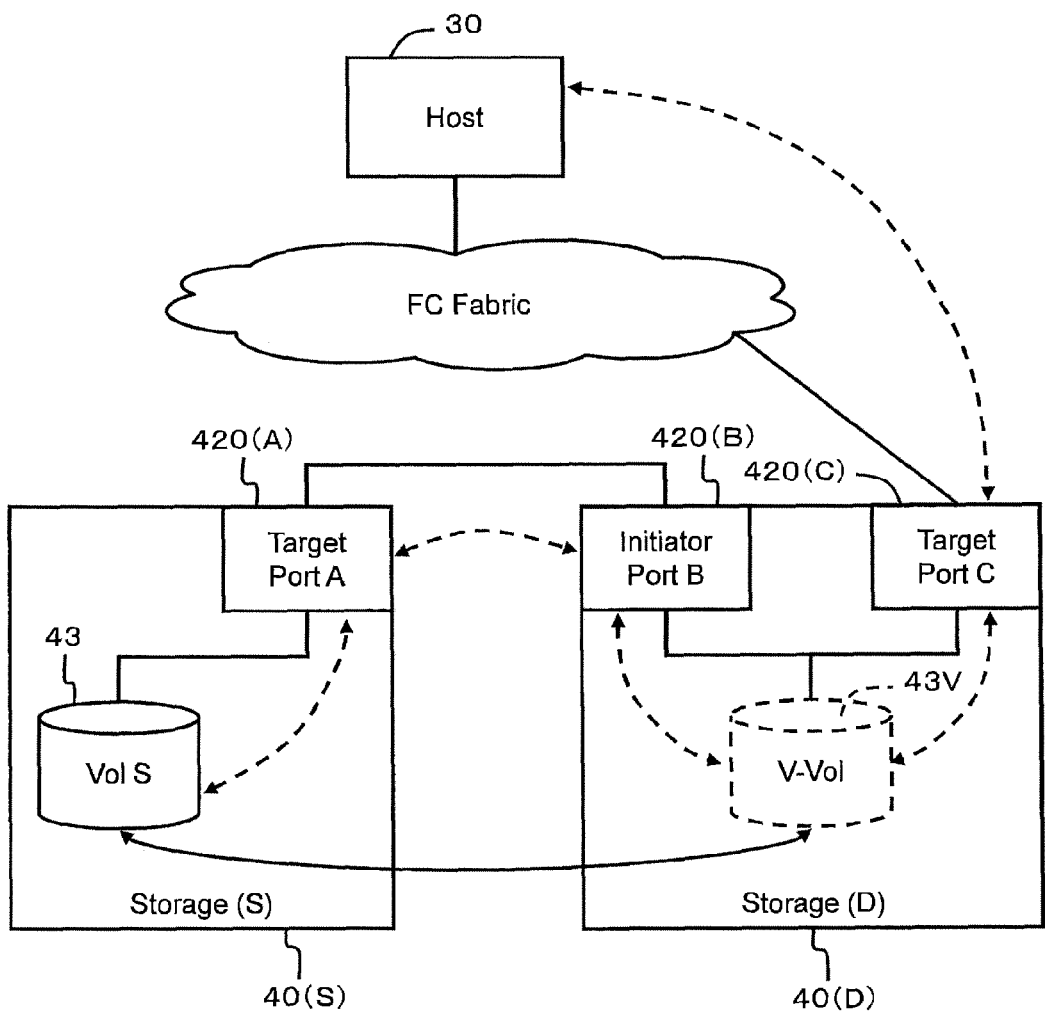
FIG. 14 schematically shows a storage apparatus virtualization technique.

FIG. 14 schematically shows a storage apparatus virtualization technique. The one storage apparatus 40(D) is the migration-destination storage apparatus. The other storage apparatus 40(S) is the migration-source storage apparatus.

An initiator port 420(B) of the migration-destination storage apparatus 40(D) is coupled to a target port 420(A) of the migration-source storage apparatus 40(S). A target port 420 (C) of the migration-destination storage apparatus 40(D) is coupled to a port of the host computer 30 via the fabric.

The migration-source storage apparatus 40(S) is coupled subordinate to the migration-destination storage apparatus 40(D) like this. The physical volume 43 of the migration-source storage apparatus 40(S) is associated with the virtual volume (V-VOL) 43V disposed in the migration-destination storage apparatus 40(D).

The migration-destination storage apparatus 40(D), upon receiving a command from the host computer 30 targeted at the virtual volume 43V, creates a command with respect to the volume 43 of the migration-source storage apparatus 40(S).

The migration-destination storage apparatus 40(D) sends this command to the migration-source storage apparatus 40(S), and writes/reads data to/from the volume 43. The migration-destination storage apparatus 40(D) sends the result of command processing to the host computer 30. This makes it possible for the host computer 30 to transparently access the volume 43 of the other storage apparatus 40(S) subordinate to the migration-destination storage apparatus 40(D). Furthermore, in the following explanation, the host computer may be abbreviated as host.

Figure 15:
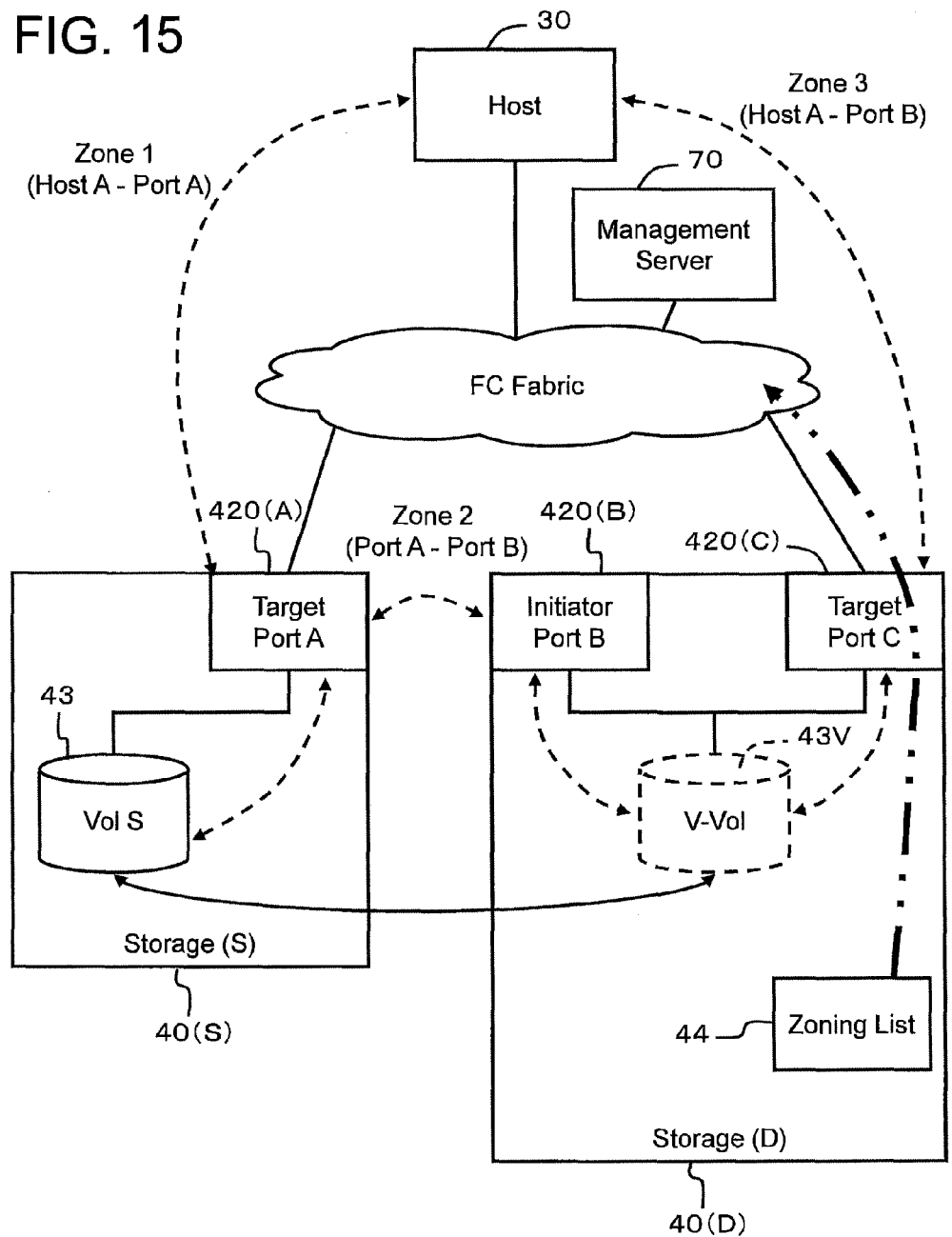
FIG. 15 is a simple overview of a computer system related to a first example.

FIG. 15 shows a storage apparatus virtualization technique specific to this embodiment. The host 30 can communicate directly with each storage apparatus, and can carry out access via a virtual volume. An overview of the processing will be explained hereinbelow. The processing will be explained in detail further below using FIGS. 25 through 29.

A case in which an actual volume 43 of the migration-source storage apparatus 40(S) is mounted to a virtual volume 43V of the migration-destination storage apparatus 40(D) will be explained. The host 30 accesses the volume 43 by way of the target port 420(A) of the migration-source storage apparatus 40(S).

Zoning is applied to the FC fabric. Zoning (Zone 1) is configured using a pair comprising the port name identifier (hereinafter WWPN) of the host 30 initiator port and the WWPN of the target port 420(A) of the storage apparatus 40(S).

A number of configurations are required before mounting the volume 43 of the migration-source storage apparatus 40(S) to the virtual volume 43V of the migration-destination storage apparatus 40(D).

First, zoning (Zone 2) must be configured using the WWPN of the initiator port 420(B) of the migration-destination storage apparatus 40(D) and the WWPN of the target port 420(A) of the migration-source storage apparatus 40(S). This is to enable the exchange of data between the migration-source storage apparatus 40(S) and the migration-destination storage apparatus 40(D).

Second, zoning (Zone 3) must be configured using the WWPN of the target port 420(C) of the migration-destination storage apparatus 40(D) and the WWPN of the initiator port of the host 30. In accordance with this, dual zoning (Zone 2 and Zone 3) must be configured for the host 30 to access the actual volume 43 via the virtual volume 43V.

A management server 70 is used to configure the zoning with respect to the communication path between the storage apparatuses. The management server 70 manages multiple storage apparatuses in the computer system. The configuration may also be such that the storage apparatus registers zoning information in the fabric without using the management server 70.

As will be described further below, the configuration may be such that a zoning list, which is a list of host ports that the relevant target port accesses from the target port, is disposed in either the initiator port 420(B) of the migration-destination storage apparatus 40(D) or the target port 420(A) of the migration-source storage apparatus 40(S), and the storage apparatus registers the zoning information in the fabric.

In the prior art, the FC fabric administrator has to cooperate with the storage administrator to change the fabric zoning. In this example, the storage apparatus 40(D) configures a zone in the fabric so as to enable the host 30 to access the virtual volume 43V via the target port 420(C). As will be described further below, there are multiple methods via which the storage apparatus acquires information (creation-source information) as to which host is accessing a volume, which is necessary for creating a target zone that is configured in the target port.

In FIG. 15, in a case where a volume has been migrated from the storage apparatus 40(S) to the storage apparatus 40(D) (that is, a case in which the virtual volume 43V and the actual volume 43 have been coupled), the host 30 path is switched. The communication path between the host 30 and the migration-source storage apparatus 40(S) is made passive. The communication path between the host 30 and the migration-destination storage apparatus 40(D) is made active. The timing of the communication path switchover is not limited to the above steps. As long as there is a mechanism for maintaining the consistency of the data between the two storage apparatuses, the above-mentioned two paths may be active simultaneously.

Furthermore, the method for migrating the volume between the storage apparatuses is not limited to the method that uses a virtual volume. For example, the method may be such that an unused volume is prepared in the migration-destination storage apparatus 40(D), and the data of the migration-source storage apparatus 40(S) volume is copied to this unused volume. Various methods for switching the host 30 paths are also known, but will not be mentioned in particular.

Figure 16:
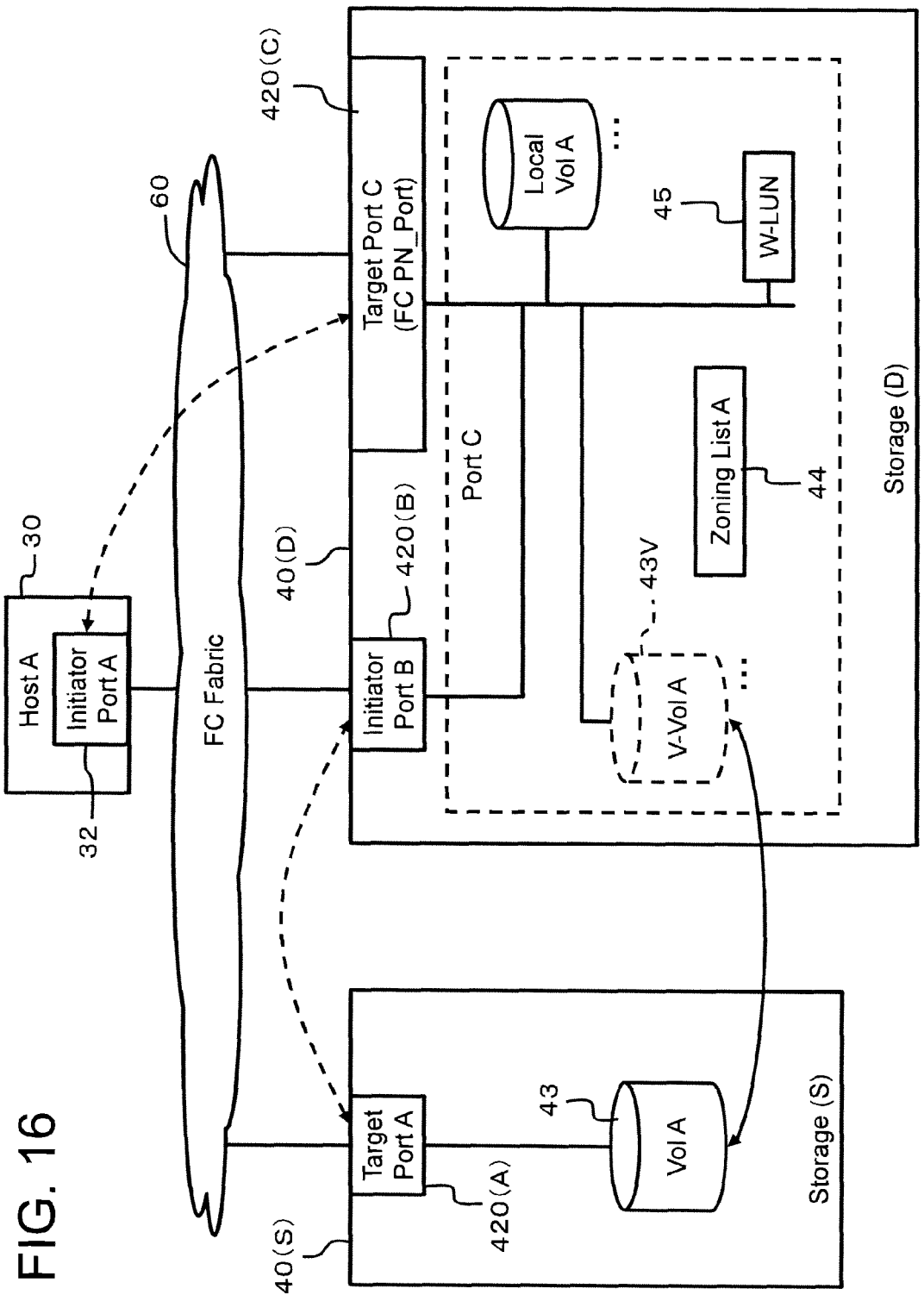
FIG. 16 is a simple overview of a computer system related to a first variation of the first example.

FIG. 16 shows a first variation. The first variation also enables the host 30 to transparently access the volume 43 of the migration-source storage apparatus 40(S) via the virtual volume 43V of the migration-destination storage apparatus 40 (D).

In the first variation, zoning information is allocated to the target port 420(C), which is the physical port of the storage apparatus 40(D). In this example, a single zone is used for access control with respect to all the volumes belonging to the target port 420(C).

A zone is applied using the initiator port 32 of the host 30 and the target port 420(C) of the migration-destination storage apparatus 40(D). Therefore, the target port 420(C) describes the WWPN of the host 30 initiator port 32 in the zoning list 44 configured in the FC fabric. The zoning list 44 is equivalent to either the "first information" or the "first basic zoning information".

Configuring the target port 420(C) zoning information (zoning list 44) in the fabric makes it possible for the initiator port 32 of the host 30 to access a local volume and the virtual volume 43V in the migration-destination storage apparatus 40(D).

The W-LUN 45 shown in FIG. 16 is the Well Known LUN, which was explained in accordance with FIG. 10($g$) and FIG. 10($h$). For example, preparing the REPORT LUNS W-LUN makes it possible to migrate LUN number 0 as well.

LUN number 0 is a special LUN, which responds with a list of all the LUN numbers belonging to the target port in accordance with the SCSI REPORT LUNS command. For this reason, in a case where the LUN number 0 does not exist, the existence of the other LUNs is not known.

Accordingly, in FIG. 16, providing W-LUN 45 makes it possible to respond to the REPORT LUNS. In accordance with this, the host 30 is able to normally acquire a list of LUNs of LUN1 and later even without LUN0 in a case where only LUN0 has been migrated and no longer exists but the other LUN numbers (#1 and later) do exist (a case in which the #0 does not exist and there is a gap in the LUN numbers).

Figure 17:
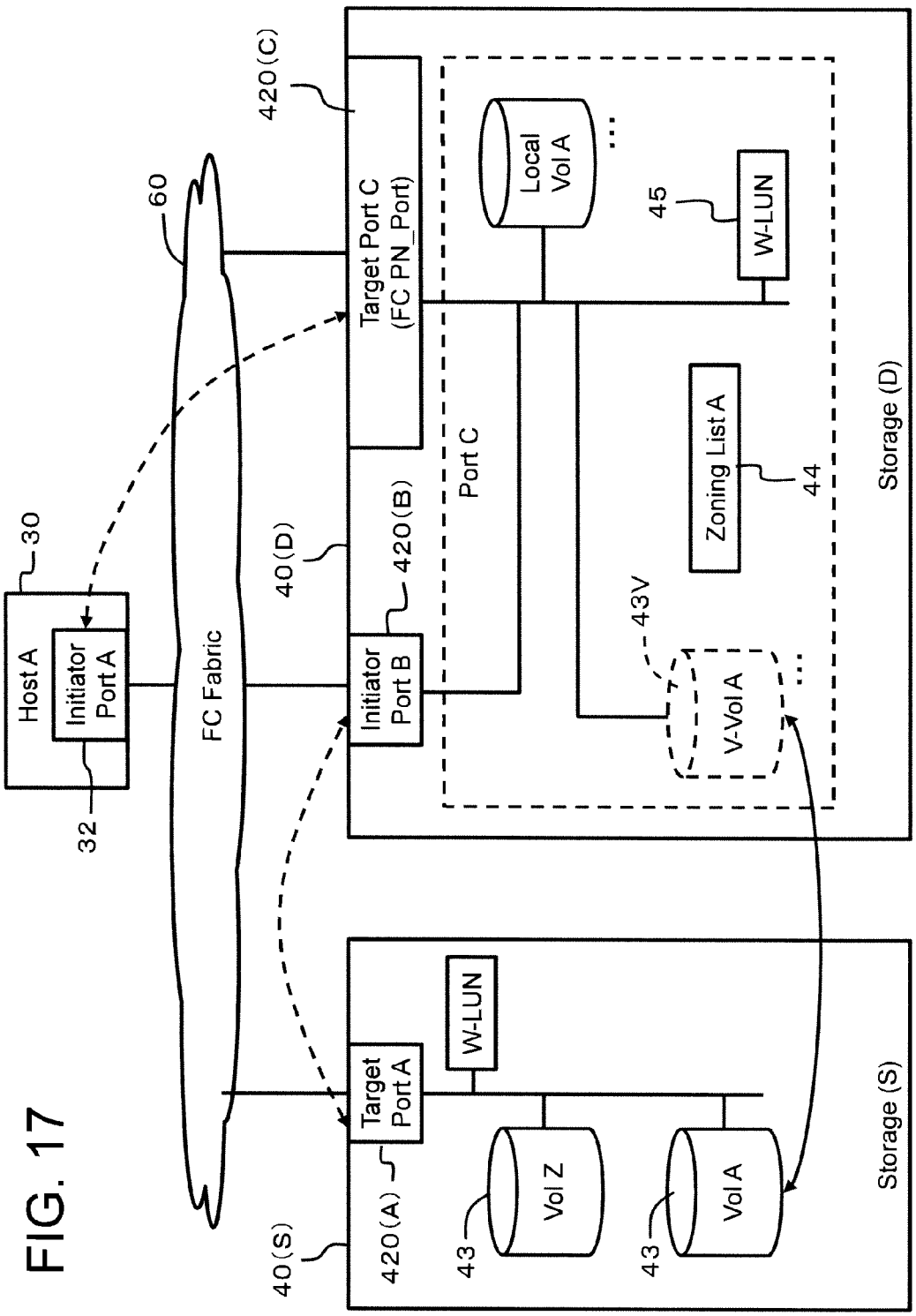
FIG. 17 shows how to migrate a portion of the volumes from multiple volumes associated with a single port.

FIG. 17 is an example clarifying the configuration of FIG. 16. In FIG. 17, multiple volumes (Vol A) and (Vol Z) are associated with the port 420(A) of the storage apparatus 40(S). FIG. 17 shows how one of these volumes (Vol A) is migrated to the storage apparatus 40(D). In this example, it is possible to migrate only a portion of the ports like this without migrating all of the volumes linked to the port.

Different examples with respect to the retention method and applicable scope of the zoning information (Zoning List: accessible list enumerating initiator WWPNs), which the target port configures in the fabric, will be explained below using FIGS. 18 through 25. Consequently, duplicate explanations will be omitted.

Figure 18:
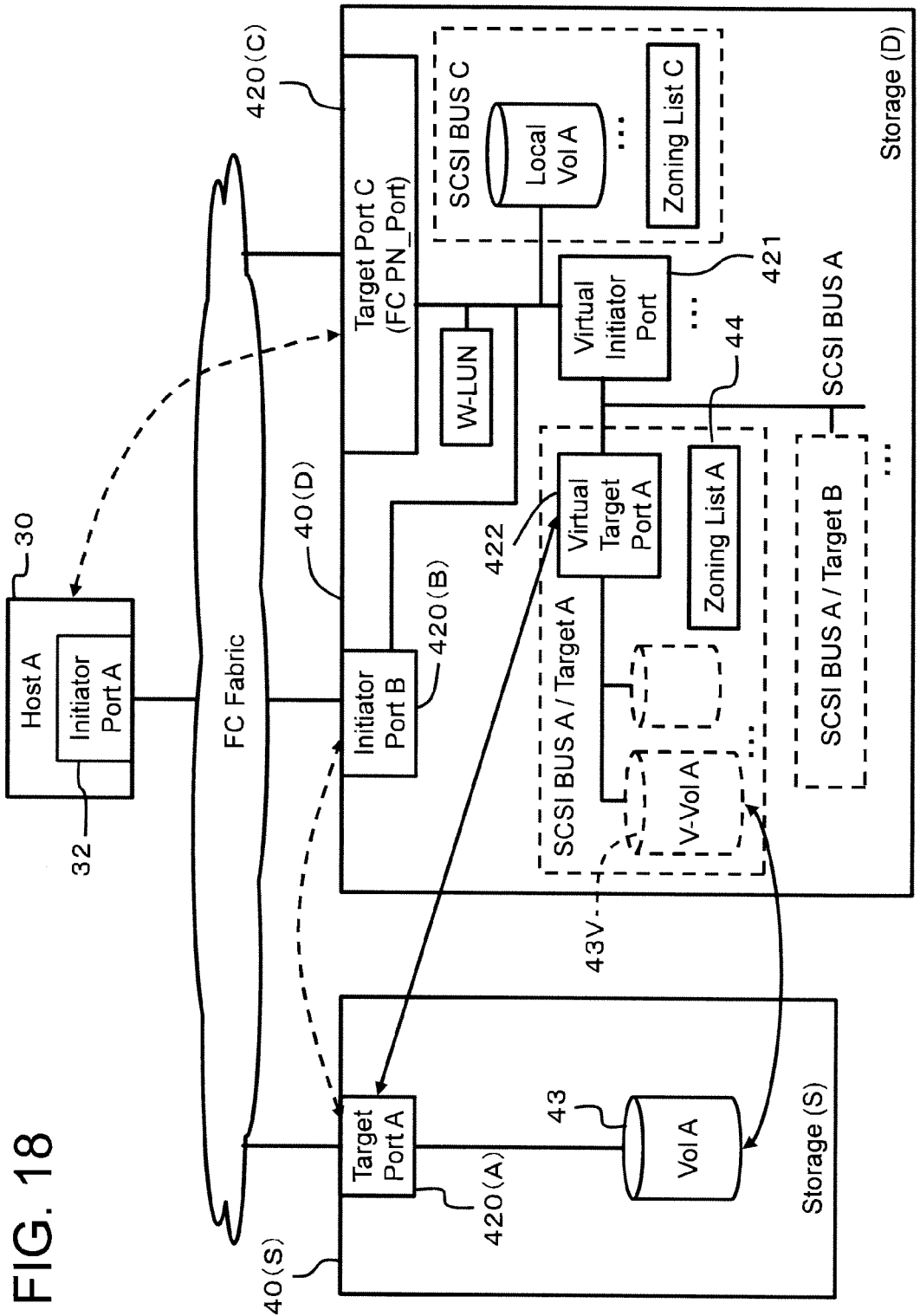
FIG. 18 is a simple overview of a computer system related to a second variation of the first example.

FIG. 18 shows a second variation. In this example, too, the host 30 transparently accesses the volume 43 of the migration-source storage apparatus 40(S) via the virtual volume 43V of the migration-destination storage apparatus 40(D).

In the second variation, the zoning information 44 is allocated in units of virtual target ports of virtual SCSI BUS numbers of the storage apparatus. A virtual initiator port 421 is provided within the migration-destination storage apparatus 40(D).

The SCSI BUS C comprises a bus number 0. The SCSI BUS C corresponds to the local volume of the migration-destination storage apparatus 40(D). Multiple virtual initiator ports 421 can be disposed in the migration-destination storage apparatus 40(D). Under the virtual initiator port 421, access is carried out in accordance with the bus number of the SCSI BUS A.

Multiple virtual target ports 422 are disposed under the SCSI BUS A. A target number is used to specify a virtual target port 422. Target A of SCSI BUS A can have multiple virtual volumes 43V. A virtual volume 43V is specified using a logical unit number.

These bus numbers, target numbers, and logical unit numbers are equivalent to the respective fields of the LUN definition format of either FIG. 9 (c) or FIG. 9 (d). For example, the migration-source storage apparatus 40(S) is allocated within the range of either the virtual target port or the virtual initiator port. This enables the target port 420(A) and the volume 43 of the migration-source storage apparatus 40(S) to be virtually associated as-is in the migration-destination storage apparatus 40(D).

Figure 19:
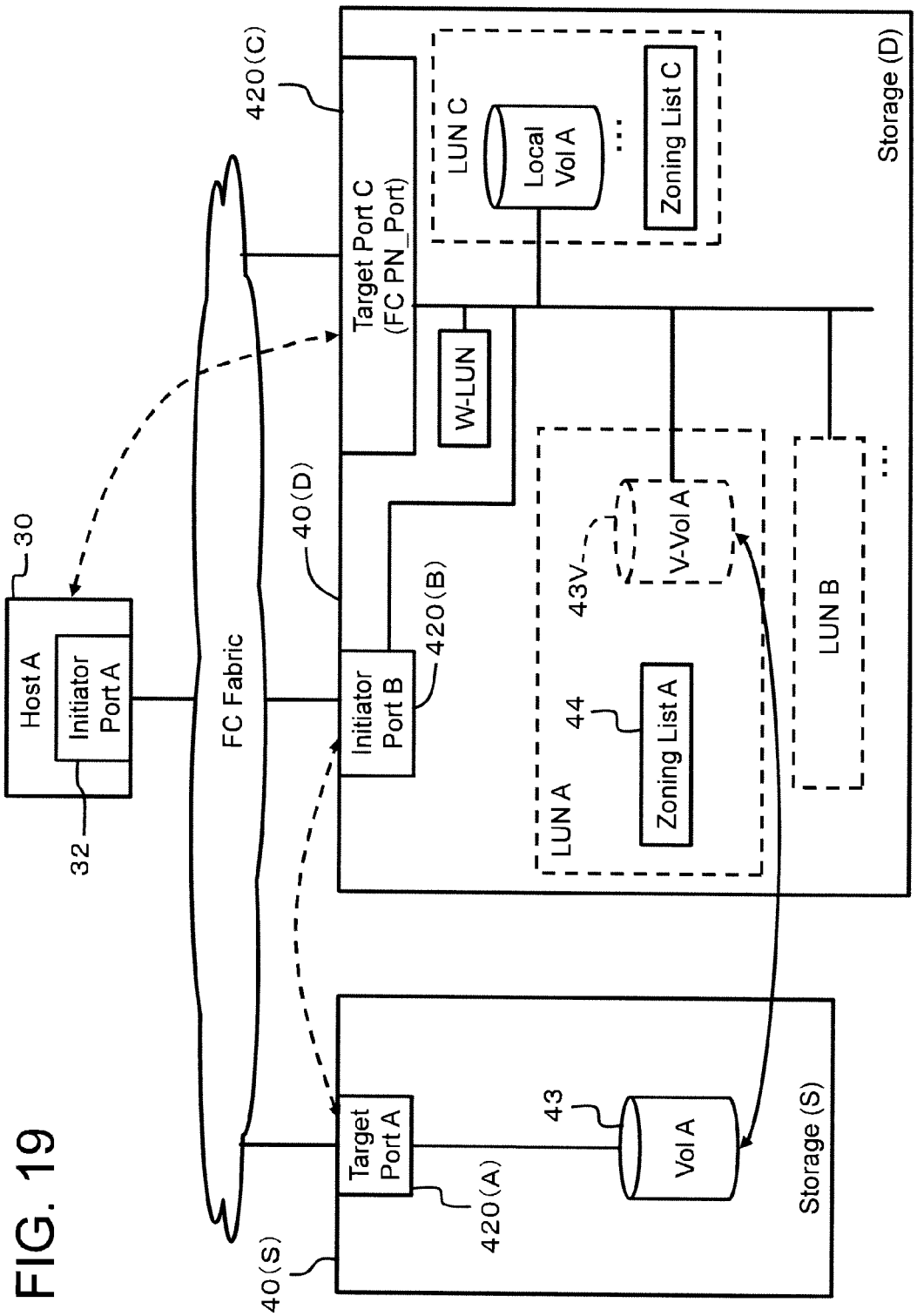
FIG. 19 is a simple overview of a computer system related to a third variation of the first example.

FIG. 19 shows a third variation. In this example, too, the host 30 transparently accesses the volume 43 of the migration-source storage apparatus 40(S) via the virtual volume 43V of the migration-destination storage apparatus 40(D).

The zoning information 44 is allocated in storage apparatus LUN units. In the pre-migration state, as shown in the right side of FIG. 19, the zoning information C of the LUN C, which is the local volume, is configured in the fabric.

When the volume 43 is migrated from the migration-source storage apparatus 40(S) to the migration-destination storage device 40(D), the zoning information 44 of LUN A for controlling access to the virtual volume 43V is stored in the storage apparatus 40(D).

For this reason, the target port 420(C) registers information that combines the zoning information 44 and the zoning information C in the fabric. This makes it possible for the host 30 to access both the local volume A and the virtual volume 43V.

Figure 20:
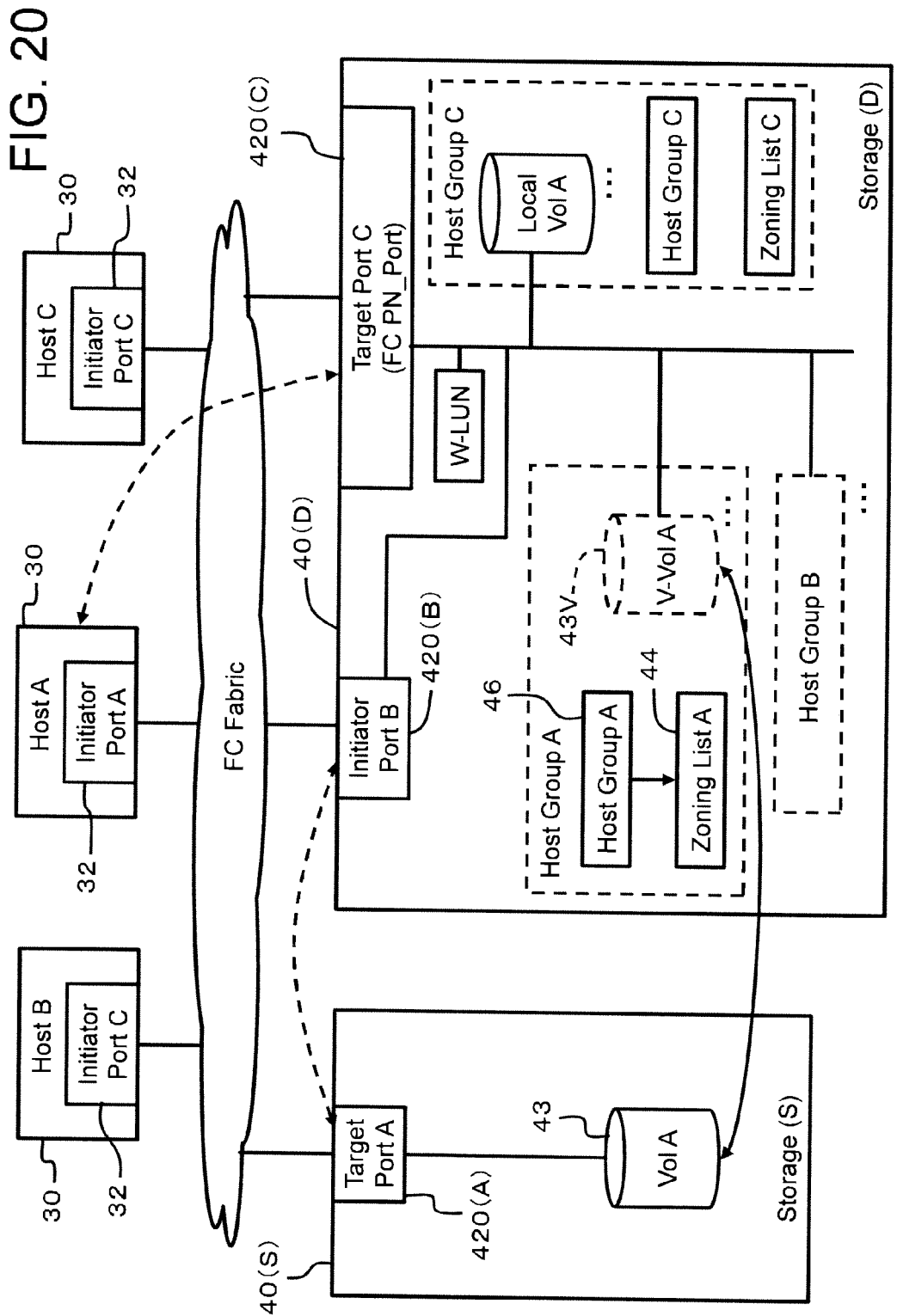
FIG. 20 is a simple overview of a computer system related to a fourth variation of the first example.

FIG. 20 shows a fourth variation. In this example, too, the zoning information 44 is configured in units of virtual ports. This variation is equivalent to a configuration that expands the configuration explained using FIG. 16 in proportion to the number of virtual ports.

In a case where there are multiple hosts 30, it may be desirable to specify a volume that can be seen by each of the hosts and a host LUN (H-LUN). Consequently, a storage apparatus function called a host group is used.

The host group is a function for mapping an internal LUN to the H-LUN in host units. An accessible volume and a LUN number (H-LUN) for letting the host see this volume are associated with respect to the initiator port name identifier (WWPN) of a specific host in host group information 46.

The WWPN of the initiator port of the host, which must access this volume, is listed in the host group information 46. Therefore, the host group information 46 can be used to create the zoning information 44. The information of the host group information 46 and the zoning information (zoning list) 44 will be explained further below using FIG. 26.

Figure 21:
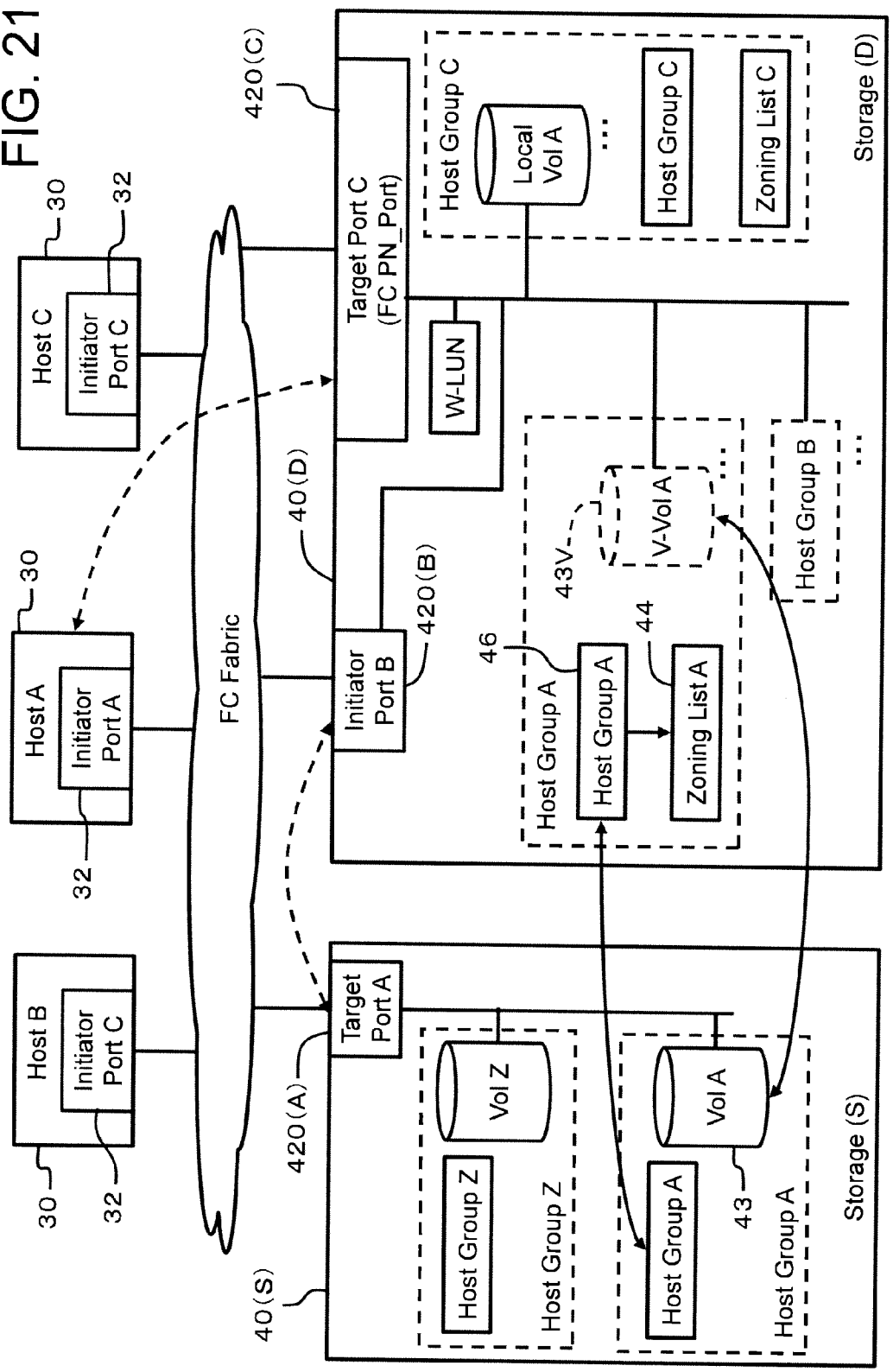
FIG. 21 shows how to migrate a portion of the volumes from multiple volumes associated with a single port together with host group information.

FIG. 21 is an example clarifying the configuration of FIG. 20. In FIG. 21, multiple volumes (Vol A) and (Vol Z) are associated with a single port 430(A). Only one of these volumes (Vol A) is migrated from the storage apparatus 40(S) to the storage apparatus 40(D). The host group information related to this volume (Vol A) is taken over by the storage apparatus 40(D) in line with the migration of the volume (Vol A).

Figure 22:
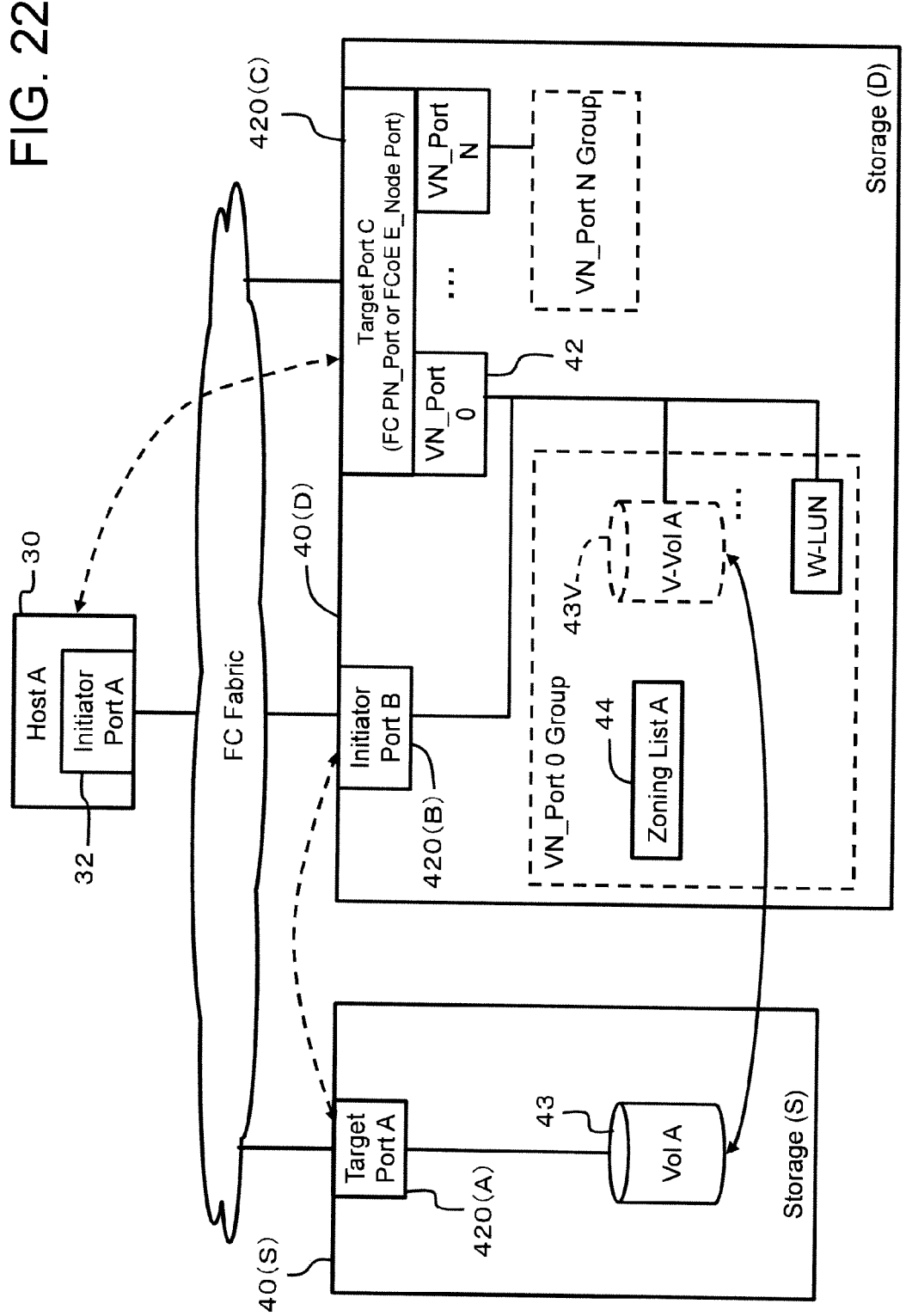
FIG. 22 is a simple overview of a computer system related to a fifth variation of the first example.

FIG. 22 shows a fifth variation. In this example, too, the host 30 transparently accesses the volume 43 of the migration-source storage apparatus 40(S) via the virtual volume 43V of the migration-destination storage apparatus 40(D).

The zoning information 44 is allocated in storage apparatus virtual port units. The storage apparatus can create either one or multiple virtual port instances (VN_Port X) in either the physical FC port (FC PN_Port) of the target port or the NPIV under the FCoE Node (E_Node). Consequently, the zoning information 44 is allocated in virtual port units.

Figure 23:
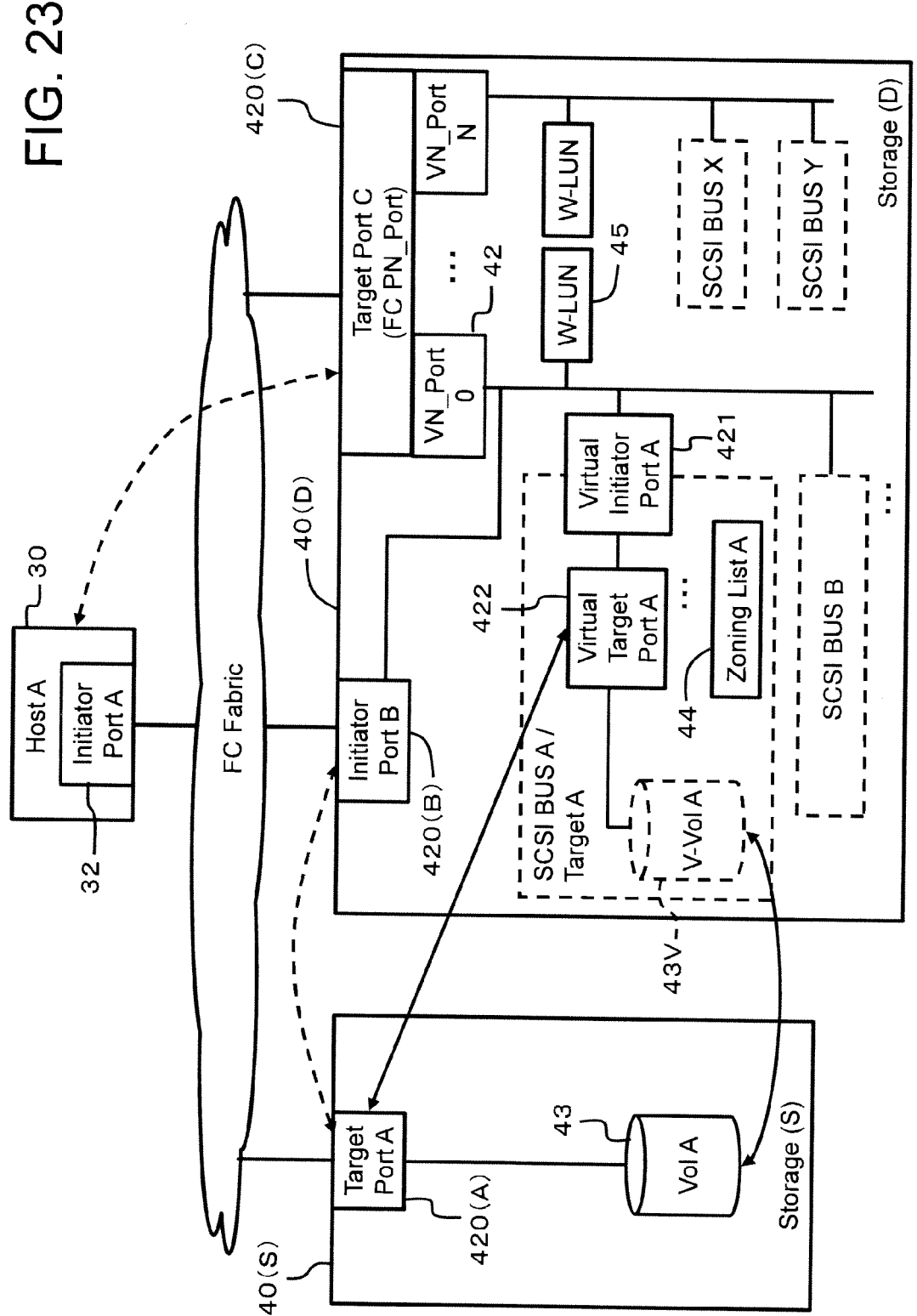
FIG. 23 is a simple overview of a computer system related to a sixth variation of the first example.

FIG. 23 shows a sixth variation. This variation is equivalent to a configuration that expands the configuration explained using FIG. 18 in proportion to the number of virtual ports.

In this variation, multiple virtual initiator ports 421 are associated with the storage apparatus virtual port 42. Multiple virtual target ports 422 are created in the virtual initiator port 421. The zoning information 44 is allocated in virtual target port units.

Figure 24:
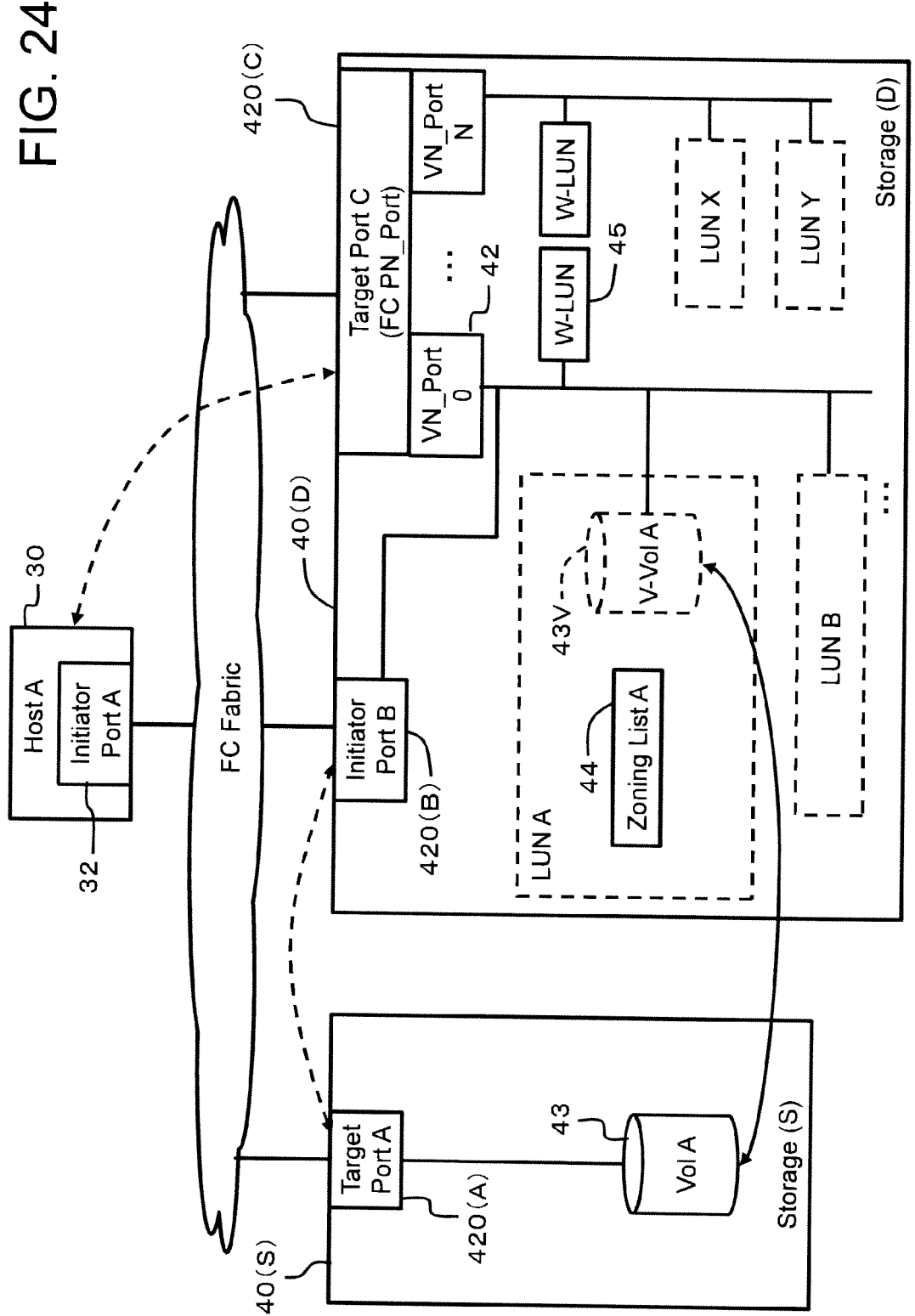
FIG. 24 is a simple overview of a computer system related to a seventh variation of the first example.

FIG. 24 shows a seventh variation. This variation is equivalent to a configuration that expands the configuration explained using FIG. 19 in proportion to the number of virtual ports. In this variation, the zoning information 44 is allocated in units of the volumes allocated to the virtual port 42 of the storage apparatus.

Figure 25:
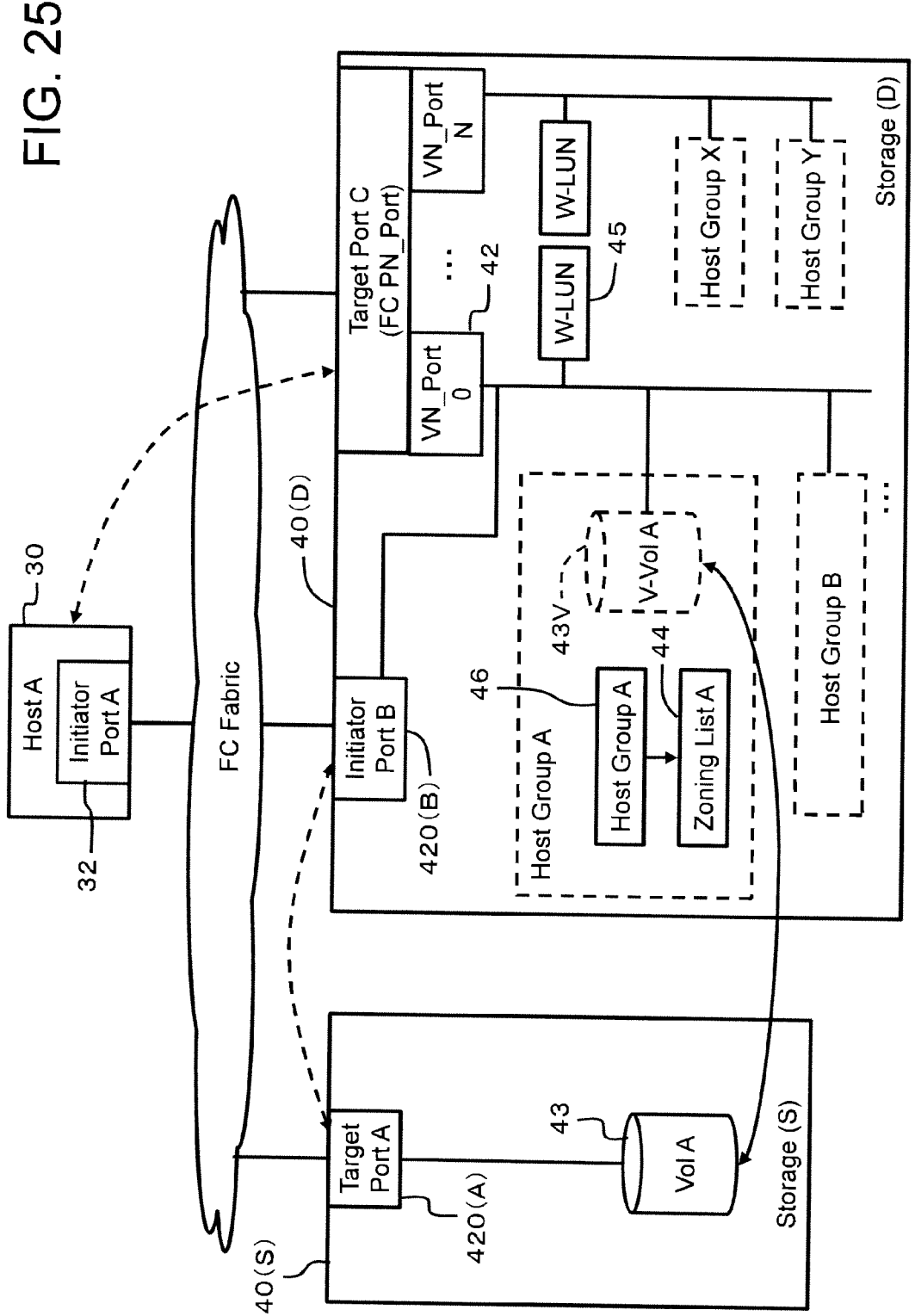
FIG. 25 is a simple overview of a computer system related to an eighth variation of the first example.

FIG. 25 shows an eighth variation. This variation is equivalent to a configuration that expands the configuration explained using FIG. 20 in proportion to the number of virtual ports. The host group is configured by grouping together the volumes that have been allocated to the virtual port 42 of the storage apparatus. In this variation, the zoning information 44 is allocated in units of this host group.

In the explanations given using FIGS. 17 through 25, a virtual volume 43V is also provided in addition to a local volume in the migration-destination storage apparatus in line with the migration of a volume. The LUN number must be extended due to repeated volume migrations like this among the large number of storage apparatuses included in the computer system.

Consequently, a LUN is identified in accordance with the extended flat space LUN format explained using FIGS. 10(e) and 10(f). This makes it possible to store the LUNs of virtual volumes migrated from multiple storage apparatuses inside a single storage apparatus.

Furthermore, it is also possible to change the virtual volume 43V to the local volume inside the migration-destination storage apparatus 40(D) by copying the data of the migration-target volume 43 of the migration-source storage apparatus 40(S) to the virtual volume 43V.

FIG. 26 is control information for associating target zoning information with a host group of a storage apparatus. FIG. 26(a) is a host group table T30. The table T30 is an example of the host group information 46. FIG. 26 (b) is a target zoning information table T40. The table T40 is an example of the zoning information 44.

The host group information T30, for example, correspondingly manages a host group number C30, a storage WWPN list C31, a host WWPN list C32, an internal LUN number C33, a host LUN number C34, and a target zone group number C35.

The host group number C30 is information for identifying each host group. The storage WWPN list C31 shows the port (WWPN) of a storage apparatus that is accessible as a host group. The host WWPN list C32 is a list of ports (initiator port WWPN) of identified hosts.

The internal LUN number C33 is information for identifying a volume (including both a physical volume and a virtual volume) in an accessible storage apparatus. The host LUN number C34 is a LUN number (H-LUN) in a case where a host is allowed to see a volume. The target zone group C35 is the number of a target zone group for associating with the target zoning information (FIG. 26 (b)).

As described hereinabove, the initiator port WWPN (C31) of the host that requires access is listed in the host group information T30. Therefore, the host group information can be used to create the zoning information T40 shown in FIG. 26(b).

Furthermore, the configuration may be such that a pair comprising a target port and host initiator port in the migration-source storage apparatus is acquired from the FC fabric. In accordance with this, zoning information (FIG. 26(b)) suited to the migration-destination storage apparatus 40(D) can be created in the migration-destination storage apparatus 40(D). This will be explained further below using FIGS. 29 through 31.

FIG. 26(b) is the table T40 of target zoning information. The target zoning table T40, for example, correspondingly manages a target zone group number C40, a storage WWPN list C41, and a host WWPN list C42.

The target zone group number C40 corresponds to C35 of FIG. 26(a), and associates the host group information T30 with a target zone group. The storage WWPN list C41 is a list of port name identifiers (WWPN) of the storage apparatus. Furthermore, since the migration port is the initiator port, both the initiator port and the target port can be stored in the C41. The host WWPN list C42 is a list of accessible host port name identifiers (WWPN).

The steps for registering the zoning information in the fabric will be described further below using FIGS. 32 through 40. The message for the storage apparatus port to configure a zone in the fabric will be described further below using FIGS. 41 and 42.

The configuration for associating the target zoning information T40 with the host group information T30 in FIG. 26 will be explained. The configuration described in FIG. 26 can be used with the configurations of FIG. 20 and FIG. 25.

For example, in a case where either a portion of the entries are cut from the table T30 of FIG. 26(a), or a new entry like the SCSI BUS ID is added to the table T30, the configuration of FIG. 26 can be used with another configuration besides those of FIGS. 20 and 25. Explanations of these variations will be omitted since they can be easily inferred from the contents described in FIG. 26(a).

The host (server) port here is logged in to the target port of the storage apparatus. The migration-source storage apparatus is able to store port login information (PLOGI). The target zoning information for accessing the migration-destination storage apparatus volume may be created from the port login information (PLOGI) possessed by each port of the migration-source storage apparatus.

The host issues a SCSI command INQUIRY to the volume. Or, the host specifies a LUN, which has been allocated to the volume, and issues a read I/O, write I/O, or other SCSI command. The LUN number can be determined in accordance with the LUN field of the FCP CMND CDB (SCSI Command Descriptor Block).

Consequently, storing the PLOGI information from the host and the volume SCSI command access status in the storage apparatus makes it possible to acquire corresponding relationship information as to which host ports are accessing which volumes. This information can also be used to create the target zoning information needed for accessing the migration-destination volume of the migration-destination storage apparatus.

Furthermore, host port and storage port security authentication information, which is typified by a FC-SP (Fibre Channel Security Protocol), can also be used. The port name identifier of the host accessing the volume is clear even in a case where this port name identifier has been configured in either the target port or volume of the migration-source storage apparatus. Therefore, the target zoning information, which is registered in the fabric from the target port of the storage apparatus, may be created using the FC-SP authentication information.

Figure 27:
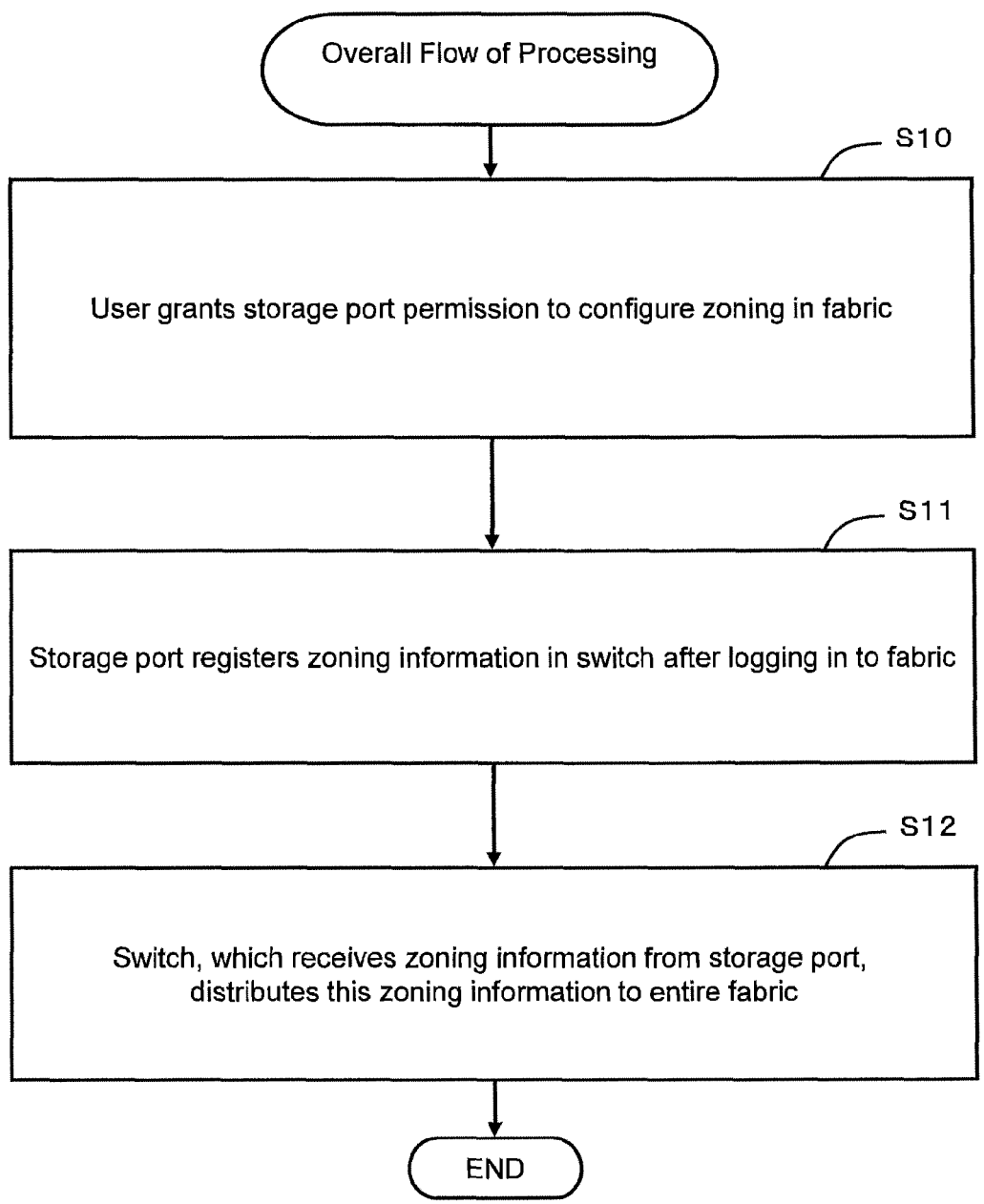
FIG. 27 is a flowchart showing a first operation of the computer system.

FIG. 27 is a flowchart showing an entire first operation for the storage apparatus port to configure the zoning information in the fabric. A step will be abbreviated as S in the drawing.

As the initial configuration, either the storage administrator or the FC fabric administrator grants the storage apparatus port permission to control target zoning (S10). S10 can be executed using multiple methods. One is a method in which the storage administrator configures the security code, which allows access to the fabric, in the storage apparatus port. The other is a method in which the FC fabric administrator registers the WWPN of the storage apparatus that is able to configure the target zoning in a switch.

The storage apparatus port, subsequent to logging in to the fabric, configures the zoning information in the fabric (S11). As described hereinabove, the zoning information is a list, which describes the port WWPN of the host that is able to access a volume belonging to the storage apparatus port.

A message format, which is exchanged with the fabric, conforms to the formats shown in FIGS. 41 and 42. The exchange of messages when registering the zoning information in the fabric will be described in detail further below. The configurations and creation method of the zoning information sent by the storage apparatus are as described in FIG. 26(a) and FIG. 26(b).

Next, of the multiple switches (FDF 20) in the fabric, the switch that received the zoning information changes the WWPN included in this zoning information to the N_Port ID, and distributes the post-change zoning information throughout the entire fabric (S12). Each of the other switches, which have received the zoning information, uses this zoning information to configure a zone. This makes it possible to carry out access control based on the ID_ID-S_ID pair, which was explained using FIG. 8(a) and FIG. 8 (b) (S12).

Figure 28:
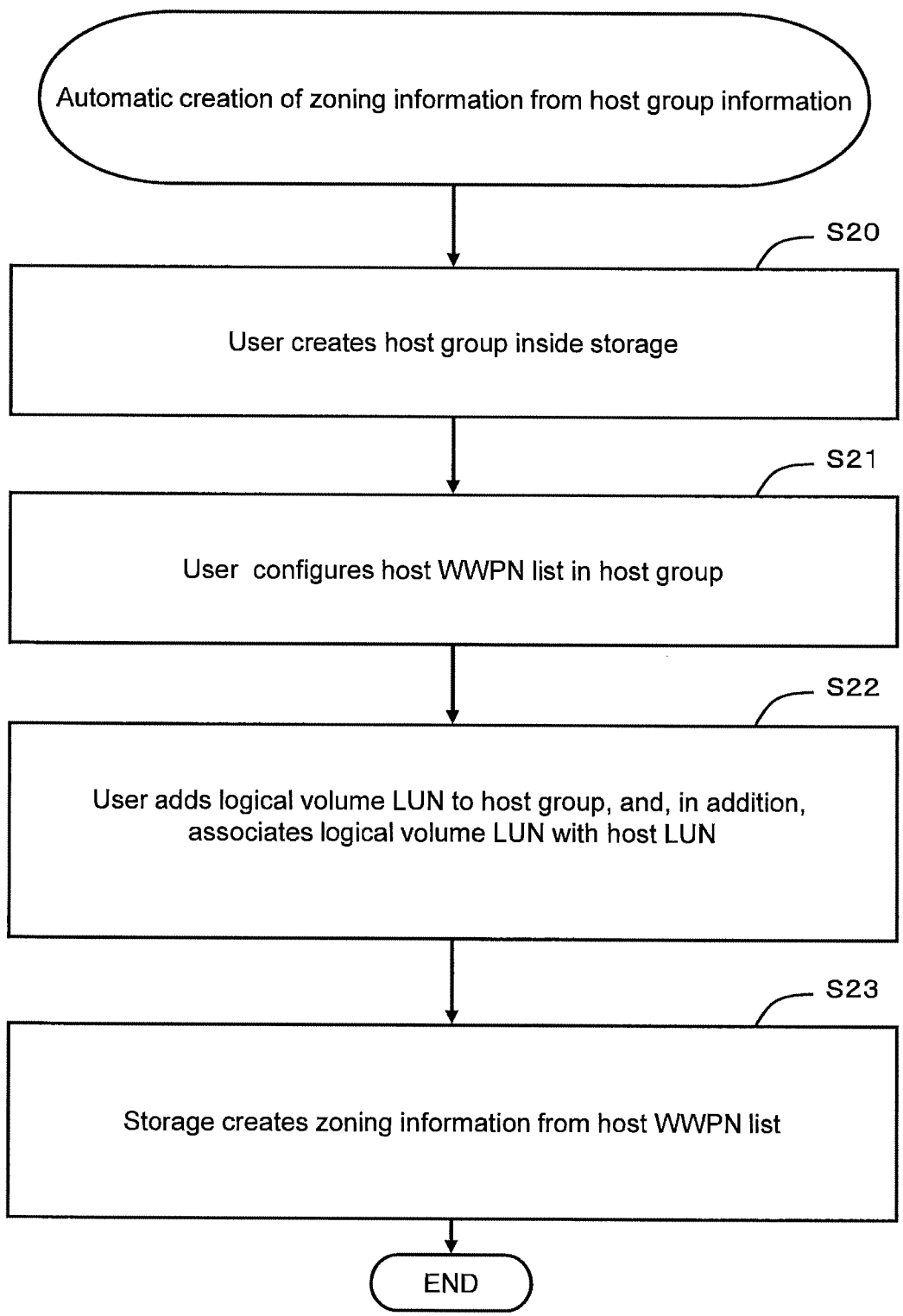
FIG. 28 is a flowchart showing a second operation of the computer system.

FIG. 28 is a flowchart showing an entire second operation. In the processing of FIG. 28, when a host group is created by the administrator, the storage apparatus creates the zoning information based on this host group. In this process, the zoning information is configured in the target port when the administrator configures the host group information.

The administrator creates a host group in the storage apparatus (S20). The administrator configures in the entry C32 of the host group information T30 a list of WWPNs of initiator ports that are allowed to access the volume (S21). This initiator port is the initiator port of the host 30 that is allowed to access the volume.

The administrator configures the LUN number of the volume in the entry C33 of the host group information T30, and, in addition, configures the LUN number for when the host is allowed to see the volume in the entry C34, and associates the two LUN numbers (S22).

When the administrator completes the configuring from S20 through S22, the storage apparatus creates the zoning information T40 based on the host group information T30 (S23). That is, the storage apparatus associates the storage apparatus target port with the WWPN list of hosts that are allowed access, and creates basic information capable of being used in fabric zone control.

When the storage apparatus port (target port) logs in to the fabric, S11 and S12, which were explained using FIG. 27, are carried out. In accordance with this, the zoning information is distributed throughout the fabric. Since zone control is executed by the fabric after distribution has been completed, the host can only access an allowed volume of an allowed storage port based on the fabric zoning information and the storage host group information.

In the processing up to this point, the only step that must be configured by the fabric administrator is the one that grants the storage apparatus port permission to configure the zoning described in S10 of FIG. 27.

This S10 is a process that is only required when the storage apparatus port is introduced, and is a step that is carried out before creating the volume. Therefore, there is no need for the fabric administrator and the storage administrator to cooperate with one another. Access permission in a unit comprising the host port, the network, the storage port, and the volume can be carried out in batch fashion by configuring only the storages. Therefore, the fabric administrator and the storage administrator need not carry out cooperative management, thereby enabling the management burden on the computer system to be reduced.

Figure 29:
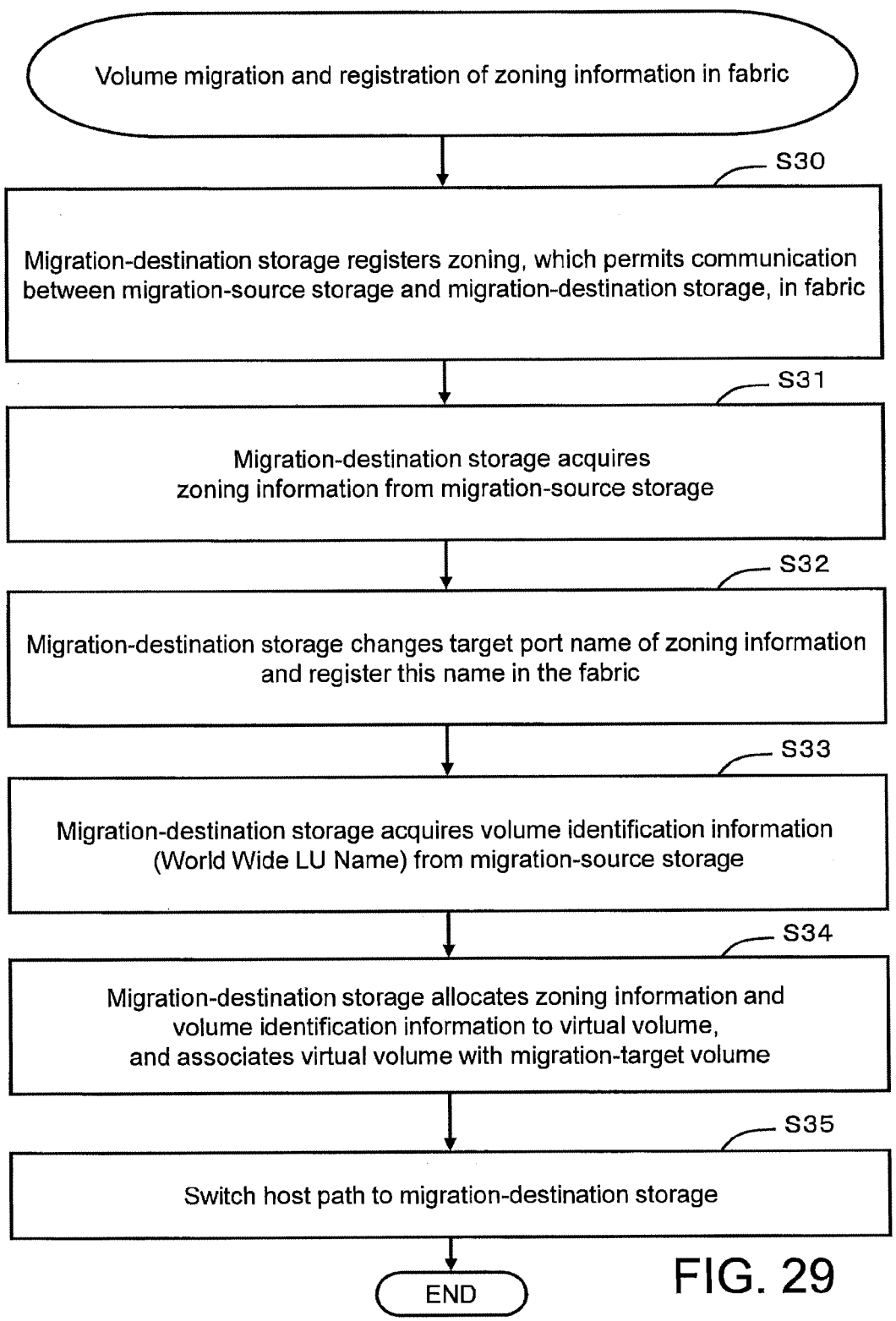
FIG. 29 is a flowchart showing a third operation of the computer system.

FIG. 29 is a flowchart showing an entire third operation. In this process, when the volume is migrated between the storage apparatuses, the migration-destination storage apparatus acquires the zoning information in the migration-source storage apparatus, and creates new zoning information.

Either the administrator or the management program of the management server 70 issues an instruction for the migration of the volume between the storage apparatuses. The management program monitors and manages each storage apparatus in the computer system. The explanation will focus on a case where the instruction is issued by the management program.

The management program instructs the migration-destination storage apparatus as to the number of the migration-source storage apparatus volume (migration-target volume) and the number of the port that can be used by the migration-source storage apparatus for migration. Various methods for instructing the migration of the volume are conceivable, and any method may be used as long as the method does not impede the operation of this embodiment.

The initiator port of the migration-destination storage apparatus must communicate with the target port of the migration-source storage apparatus. Consequently, the migration-destination storage apparatus creates zoning information, which associates the WWPN of the migration-destination storage apparatus initiator port with the WWPN of the migration-source storage apparatus target port. This zoning information is volume migration zoning information. The initiator port of the migration-destination storage apparatus registers the volume migration zoning information in the FC fabric (S30). In accordance with this, a communication path is established for the exchange of data between the migration-target volume 43 of the migration-source storage apparatus and the virtual volume 43V of the migration-destination storage apparatus.

The migration-destination storage apparatus acquires zoning information related to the migration-target volume 43 from the migration-source storage apparatus (S31). This zoning information defines a pair comprising the host port that is allowed access to the migration-target volume, and the port of the migration-source storage apparatus.

For ease of understanding, the zoning information in the migration-source storage apparatus may be called the migration-source zoning information. The zoning information created in the migration-destination storage apparatus may be called the migration-destination zoning information.

There are at least two methods for the migration-destination storage apparatus to acquire the migration-source zoning information of the migration-source storage apparatus: a fabric acquisition method and a migration-source storage apparatus acquisition method.

In the former method, the migration-destination storage apparatus reads other zoning information that has been configured in the fabric. However, it is supposed that any port is allowed to read the other zoning information from the fabric. In the latter method, the migration-destination storage apparatus takes over the migration-source zoning information associated with the migration-target volume of the migration-source storage apparatus. Either method may be used.

Next, the initiator port of the migration-destination storage apparatus, which is used as the data communication path, acquires and takes over volume identification information (World Wide LU Name) of the migration-target volume via the migration-source storage apparatus target port (S32).

The volume identification information is a concatenation of the designator information of FIG. 13(a) (example: an ASCII character string informing the manufacturer name) and the logic unit serial number (ASCII character string) uniquely assigned to each physical volume of FIG. 13(d).

The migration-destination storage apparatus allocates the host group information, the zoning information, and the volume identification information that must be taken over to the virtual volume related to the migration-target volume (S33). In addition, the migration-destination storage apparatus associates the virtual volume with the migration-target volume (S33).

The migration-destination storage apparatus overwrites the target port number described in the migration-source zoning information with the target port number of the migration-destination storage apparatus, creates the migration-destination zoning information, and registers this migration-destination zoning information in the fabric (S34).

The host path is switched from the migration-target volume of the migration-source storage apparatus to the virtual volume of the migration-destination storage apparatus (S35). Multiple host path switching methods are conceivable. One method issues instructions so that the migration-destination storage apparatus notifies the management server 70 of the completion of the volume migration, and the management server 70 switches the access destination to the host. The other method is a method in which either the migration-destination storage apparatus or the migration-source storage apparatus notifies the host to the effect that the volume migration is complete and causes the host access destination to be switched.

For example, even a method that uses SCSI ALUA (Asynchronous Logical Unit Access) to send an Active Port-Standby Port switchover message to the host port from the storage apparatus is okay. The path switchover instruction may be carried out by any of the management server, the migration-source storage apparatus, or the migration-destination storage apparatus.

The association of the virtual volume and the migration-target volume (S33) will be explained further. For example, in one method, an I/O request to the virtual volume received from the host is transferred to the migration-target volume by way of the migration-destination storage initiator port and the zone provided for migration. In another method, either the migration-source storage apparatus or the migration-destination storage apparatus copies the data of the migration-target volume to the virtual volume. In yet another method, the configuration may be such that the migration-destination storage apparatus mounts the migration-target volume to the virtual volume. Another method may also be used.

When preparations for migrating the volume are complete, the path over which the I/O request from the host is to be sent is switched from the migration-source storage apparatus to the migration-destination storage apparatus in conjunction with the host path switchover (S35).

In accordance with the steps explained using FIG. 29, the migration-destination storage apparatus updates the fabric zone configuration at the time of a volume migration between storage apparatuses.

However, there may be cases in which the zone configured between the migration-source storage apparatus and the host becomes unnecessary after the volume migration has been completed. In this case, using the same thinking employed in the steps by which the migration-destination storage apparatus creates the zoning information and registers this zoning information in the fabric, the migration-source storage apparatus is able to update the migration-source zoning information and register this updated zoning information in the fabric. That is, the migration-source storage apparatus updates the migration-source zoning information by deleting the information of the unnecessary host, and registers the updated migration-source zoning information in the fabric. This makes it possible to nullify the zone between the deleted host and the target port of the migration-source storage apparatus.

As described hereinabove, both the zone configuration related to the port of the migration-destination storage apparatus, and the zone configuration related to the port of the migration-source storage apparatus can be all carried out on the storage side. The fabric administrator does not have to change the configuration of the fabric when a volume is created or a volume is migrated.

Figure 30:
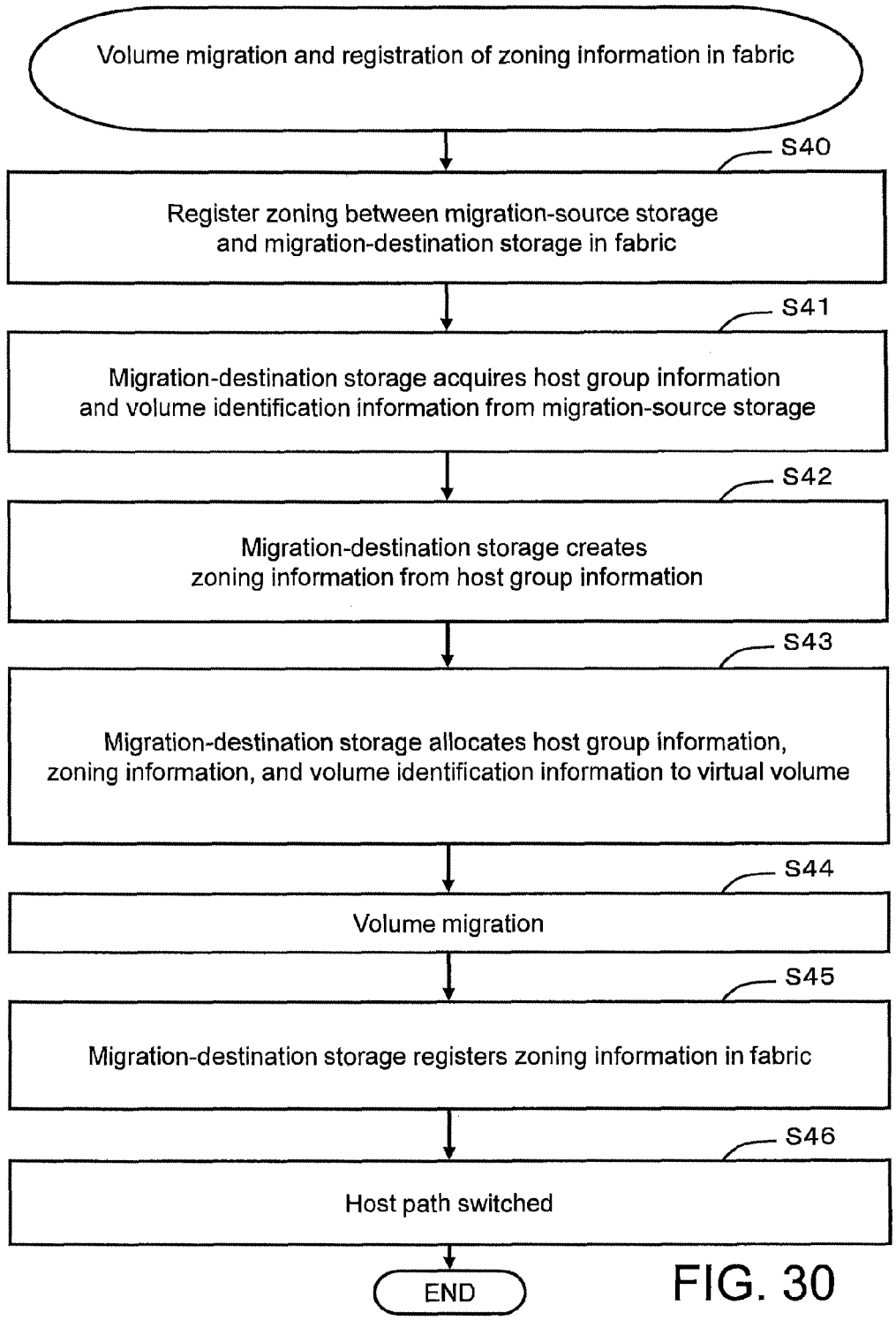
FIG. 30 is a flowchart showing a fourth operation of the computer system.

FIG. 30 is a flowchart showing an entire fourth operation. In this process, the migration-destination storage apparatus acquires the host group information of the migration-source storage apparatus, and migrates the volume after creating zoning information from this host group information.

Figure 31:
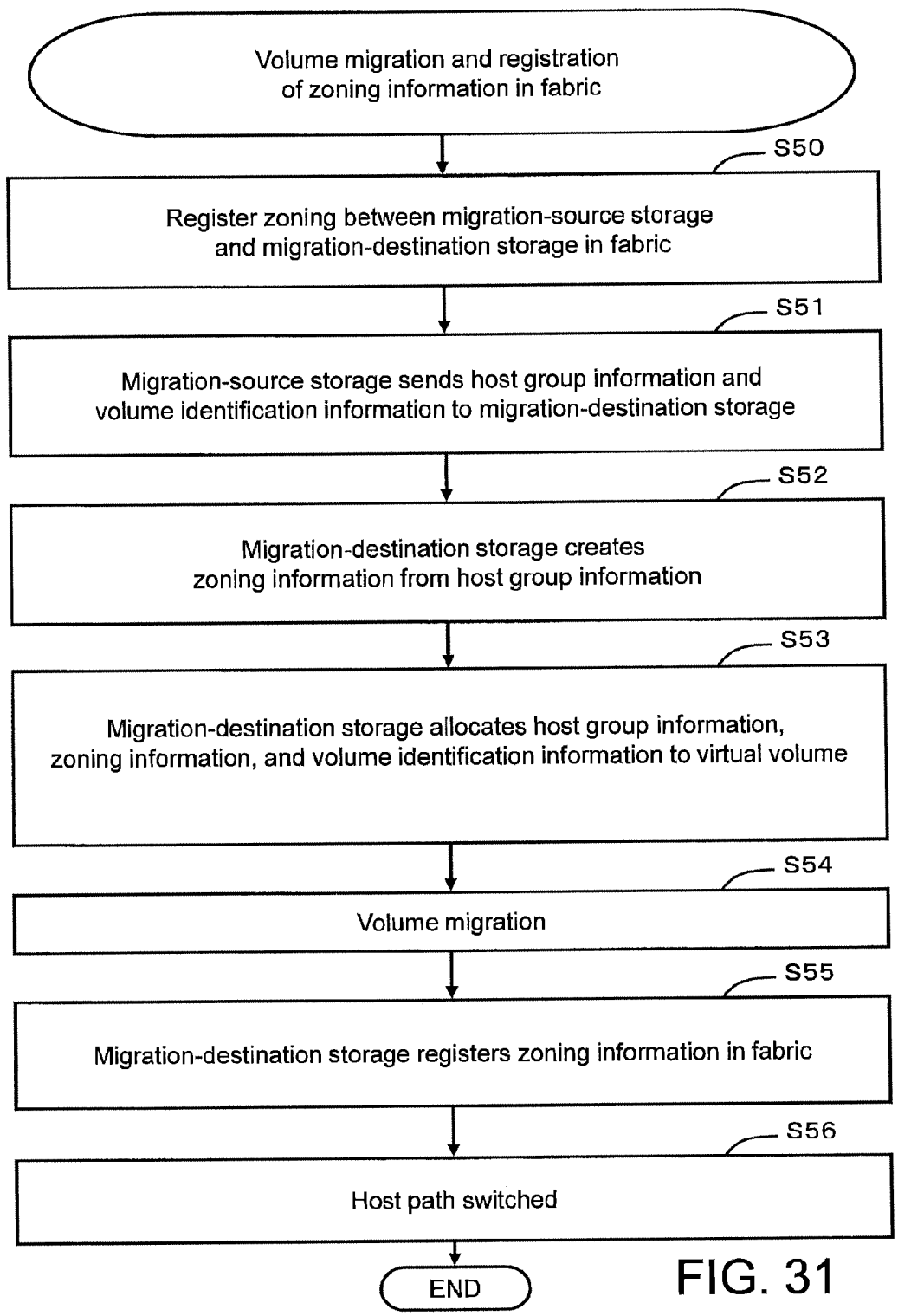
FIG. 31 is a flowchart showing a fifth operation of the computer system.

FIG. 31 shows an entire fifth operation. In this process, the migration-source storage apparatus sends the host group information to the migration-destination storage apparatus. The migration-destination storage apparatus creates target zoning information from the host group information and migrates the volume. FIGS. 30 and 31 will be explained by focusing on the parts that differ from the explanation of FIG. 28.

Refer to FIG. 30. The part of this process related to the creation of the zoning information differs from the process shown in FIG. 29.

A zone for data communications between storages is configured between the migration-source storage apparatus and the migration-destination storage apparatus (S40). The migration-destination storage apparatus acquires the host group information and the volume identification information from the migration-source storage apparatus (S41).

The migration-destination storage apparatus creates zoning information for use in the migration-destination storage apparatus based on the host group information to which the migration-target volume belongs (S42).

Thereafter, the processing is the same as the processing of FIG. 29. The migration-destination storage apparatus allocates the host group information and the volume identification information to the virtual volume (S43) and migrates the volume (S44). The migration-destination storage apparatus registers the zoning information (migration-destination zoning information) created in S42 in the fabric (S45). The host path is switched from the migration-source storage apparatus to the migration-destination storage apparatus (S46).

Refer to FIG. 31. The part of this process related to the creation of the zoning information also differs from the process shown in FIG. 29. Since S50 and S52 through S56 are the same as S40 and S42 through S46 shown in FIG. 30, explanations thereof will be omitted.

In this process, the migration-source storage apparatus sends the host group information to which the migration-target volume of the migration-source storage belongs to the migration-destination storage apparatus (S51). Furthermore, instead of this, the configuration may also be such that the migration-source storage apparatus creates the zoning information (the list of initiator port WWPNs of the host that requires access permission), and sends this zoning information to the migration-destination storage apparatus.

EXAMPLE 2

A second example will be explained by referring to FIGS. 32 through 38. In this example, the operation of the fabric, which has received zoning information from a storage apparatus port, will be explained. The explanation will focus on the differences with the first example.

Figure 32:
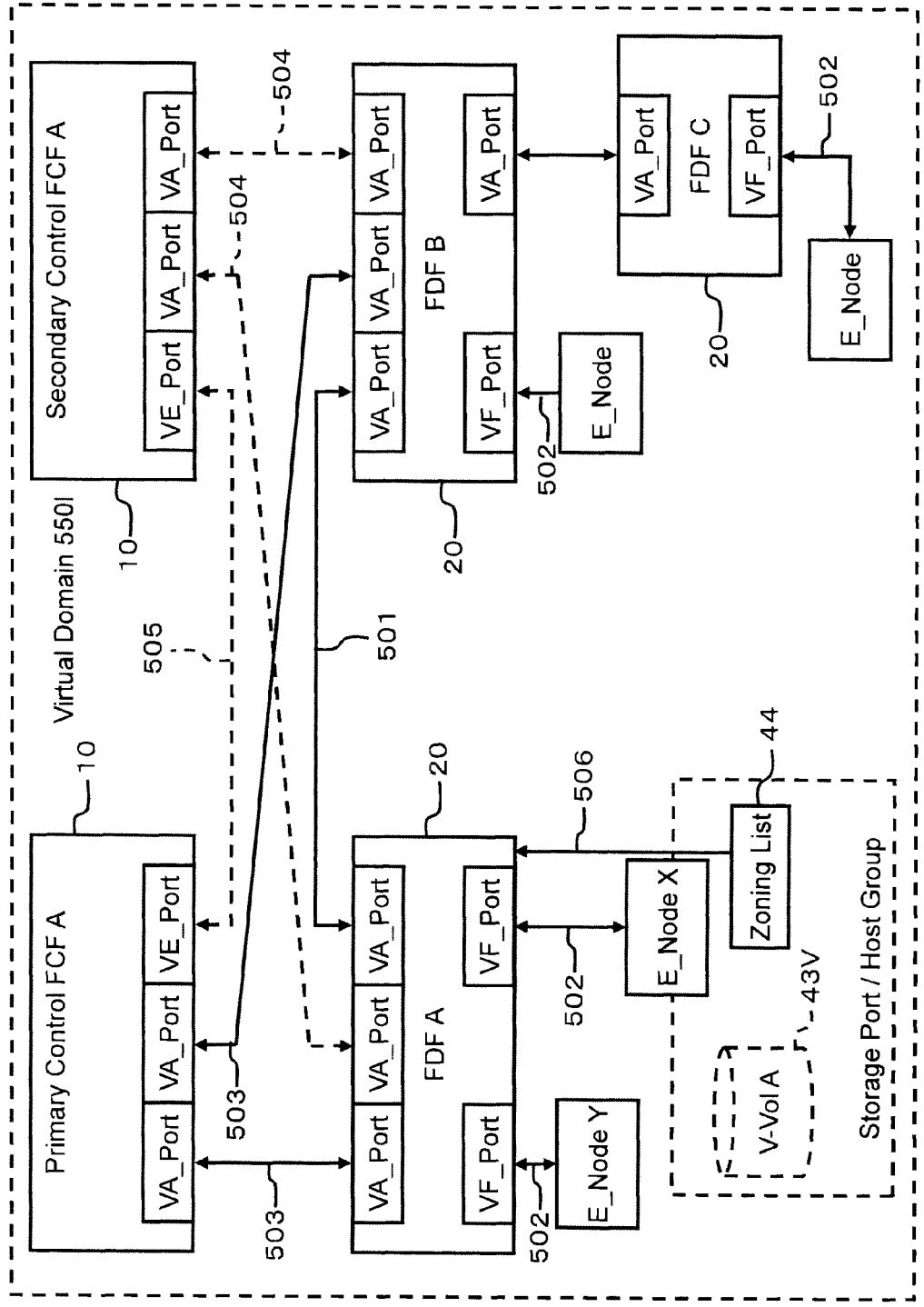
FIG. 32 shows an example of the configuration of a virtual domain in the FCoE fabric related to a second example.

FIG. 32 is an example of the configuration of a virtual domain 550 in a FCoE fabric. This configuration is a specific example of the abstract network topology shown in FIG. 3.

The arrows, which couple the respective ports of FIG. 32, denote FCoE virtual links rather than physical connections. The physical connections have been omitted from the description. The physical connections are between FCF MAC (physical Ethernet ports) disposed in either the FCF or the FDF.

In FIG. 32, a total of four switches, two FCFs 10 and two FDFs 20, form virtual links with one another. A FCF MAC of the primary FCF A, a FCF MAC of the secondary FCF A, a FCF MAC of a FDF A, and a FCF MAC of a FDF B are coupled to the same network. The FDF B and a FDF C are coupled to a network that differs from the network described above. For this reason, the FCF A can access the FCF C via the FCF B.

Virtual links 503 and 504 are for controlling the primary FCF A and the secondary FCF A, and the FDF A and the FDF B. The virtual link 503 respectively couples the primary FCF A to the FDF A and the FDF B. The virtual link 504 respectively couples the secondary FCF A to the FDF A and the FDF B.

The virtual links 503 and 504, specifically, are paths used when transferring login information from the respective E_Nodes to the FCF. In addition, the virtual links 503 and 504 are paths used by the FCF to allocate a virtual domain number to a FDF, to distribute routing information, and to distribute zoning information. The FCF and a FDF, or a FDF and a FDF are coupled by a VA_Port.

A virtual link 505 is a redundant path that is used for synchronizing the information of the primary FCF A with the secondary FCF A. The primary FCF A information and the secondary FCF A information are synchronized for making the control with respect to the virtual domain 550, which is the range of FCF control, redundant.

A virtual link 501 is a path used for communicating data between FDFs and for communicating control information without going through the FCF. A virtual link 502 is a path for either allowing communications between the E_Node and the FDF, or allowing communications between a VN_Port and a VF_Port, which have been instantiated by the E_Node.

A control message 506 represents a message request for the storage apparatus port to register zoning information in the FDF. Furthermore, in FIG. 32, the configurations of the storage apparatus, the host, and the VN_Port have been either simplified or omitted.

Figure 33:
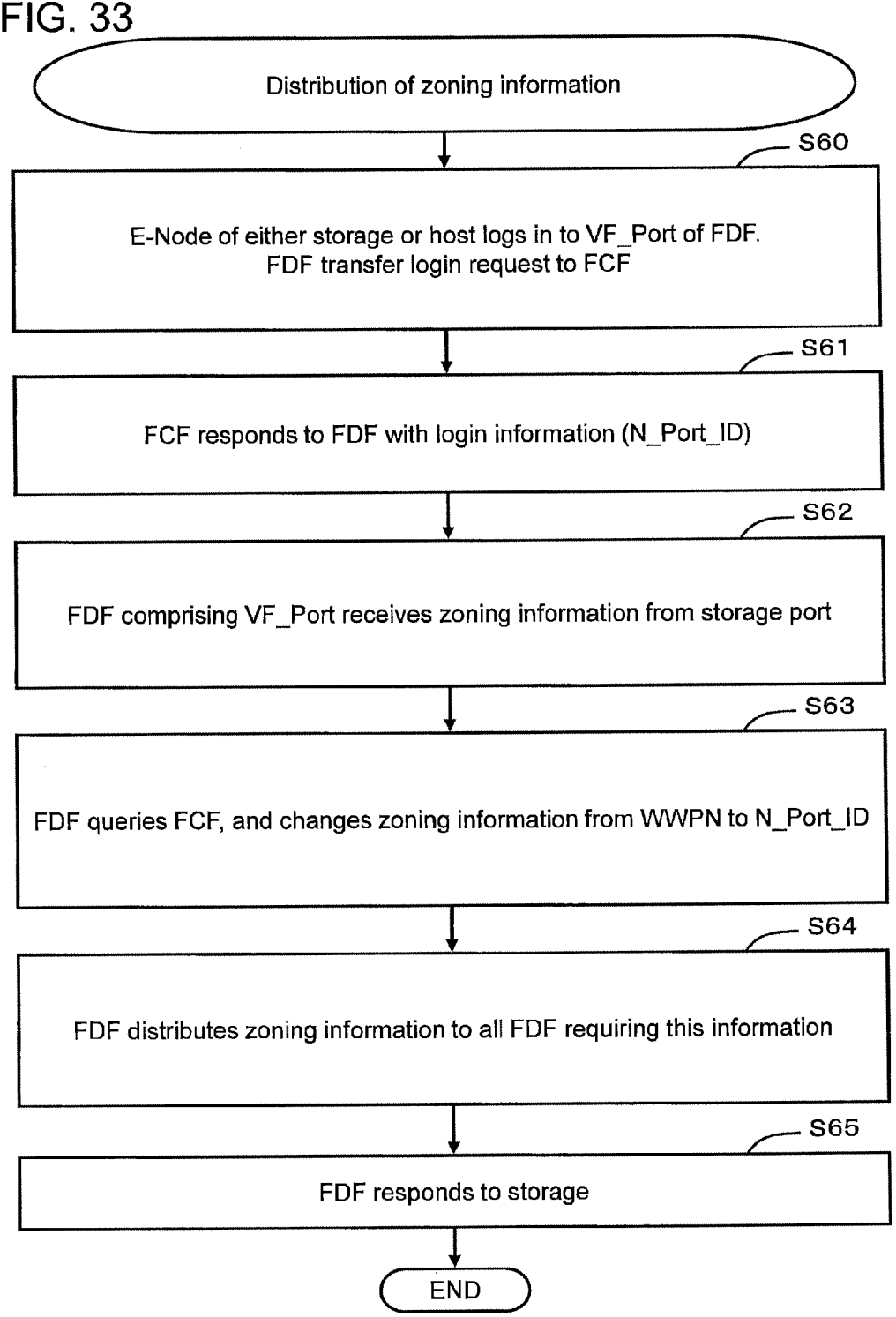
FIG. 33 is a flowchart showing the processing via which the FDF distributes zoning information to other FDFs.

A flowchart of FIG. 33 shows a process for distributing by FDF target zoning information (hereinafter, zoning information) received from the storage apparatus to the other FDFs after the names have been resolved by the FCF. Simply stated, name resolution is a process for converting a WWPN in the zoning information to a N_Port ID.

The virtual domain 550, to which the FDF that receives the zoning information from the storage apparatus belongs, is controlled by a primary control FCF—secondary control FCF pair. The primary control FCF of this pair comprises control owner rights. Consequently, the primary control FCF that controls the FDFs will be described as the "same virtual domain FCF" hereinbelow, and an explanation thereof will be omitted.

The flow of processing up until the FCF and FDF form the virtual domain 550 will be explained preliminarily. This description is the procedure required for initialization between the FCF and FDF switches. FIG. 33 is a flowchart related to a node-switch initialization procedure and zone distribution, and as such, does not provide a description related to the switch initialization procedure.

The FCF fabric configuration server 104 searches the respective FDFs and allocates the same virtual domain number to each FDF. The virtual domain 550 shown in FIG. 32 is formed in accordance with this.

Each FDF registers the virtual domain number in the virtual domain database 201 through the message transfer program 204. Pairs comprising the FCF and multiple FDFs are formed in the virtual domain in accordance with this.

Next, the FCF fabric configuration server 104 allocates a range of assignable N_Port IDs (N_Port ID Range: referred to as the subnet mask in IP) to each FDF, and registers the allocated information in the database 103.

Each FDF stores the N_Port ID range allocated to the other FDF in the virtual domain database 201, and, in addition, registers the rule for each FDF VA_Port to the other FDF.

In the procedure described above, each piece of information held by the primary control FCF is sent to the secondary control FCF via a virtual link 287, and the information is synchronized between the respective FCFs. Therefore, even when a failure occurs in the primary control FCF, the secondary control FCF assumes control, and the scope of a failure's impact is minimized.

The flowchart of FIG. 33 will be explained. Either the host E_Node or the storage apparatus E_Node logs in to the VF_Port of the FDF, which is a switch comprising the FCoE fabric (S60). The FDF transfers the login information received from the E_Node to the same virtual domain FCF (S60).

The FCF processes the login request from the E_Node received from the FDF (561). When the E_Node logs in to the VF_Port of the FDF, the FCF name server 102 allows the creation of a VN_Port instance corresponding to the ENode-requested WWPN.

The name server 102 assigns the N_Port ID used in the FC Frame D_ID/S_ID shown in FIG. 8 (a) to the VN_Port. The FCF name server 102 registers a pair comprising the WWPN and the allocated N_Port ID in the name server database 101. The FCF returns the login request transferred from the FDF to the transfer-source FDF. The N_Port ID allocated to the WWPN is also included in the return (login response).

The FDF, upon receiving the login response, respectively registers the information of the WWPN related to the E_Node under the FDF and the N_Port ID allocated by the FCF to the N_Port allocation database 201. The FDF VF_Port returns the login response to the request-source E_Node.

The FDF VF_Port 22 receives zoning information from the storage apparatus port (S62). Specifically, the FDF VF_Port 22 receives a message called a Register Peer Device based Port Name (RPD_PN). This message is exchanged in accordance with the FC Common Service CT_IU payload. The formats of the RPD_PN request and response will be described further below using FIG. 41.

The FDF queries the FCF name server 102 for converting the zoning information received from the storage apparatus from the WWPN to the N_Port ID (S63). For example, the FDF sends the list of WWPNs in the Register Peer Device based Port Name (RPD_PN) to the FCF. The FDF receives the N_Port ID corresponding to the WWPN from the FCF.

The FCF must propagate the zoning information to the FCF and FDF inside a different domain to which another domain number has been assigned. For this reason, the FCF registers this zoning information in the database 1050 as virtual domain local zoning information distributed via the FDF.

The FDF is in receipt of the RPD_PN request from the VN_Port that is logged in to the FDF VF_Port 22, and as such, registers this RPD_PN request in the FDF local database 2030 as the FDF local zoning information (S63).

The FDF selects the zoning information to be registered in the other FDF from the N_Port ID information of the RPD_PN from among the information registered in the local database 2030 of the zone database 203, and the N_Port ID range of the other FDF being stored in the virtual domain database 202. The FDF distributes the selected zoning information to the other FDF (S64). The FDF returns a RPD_PN response to the VN_Port.

Figure 34:
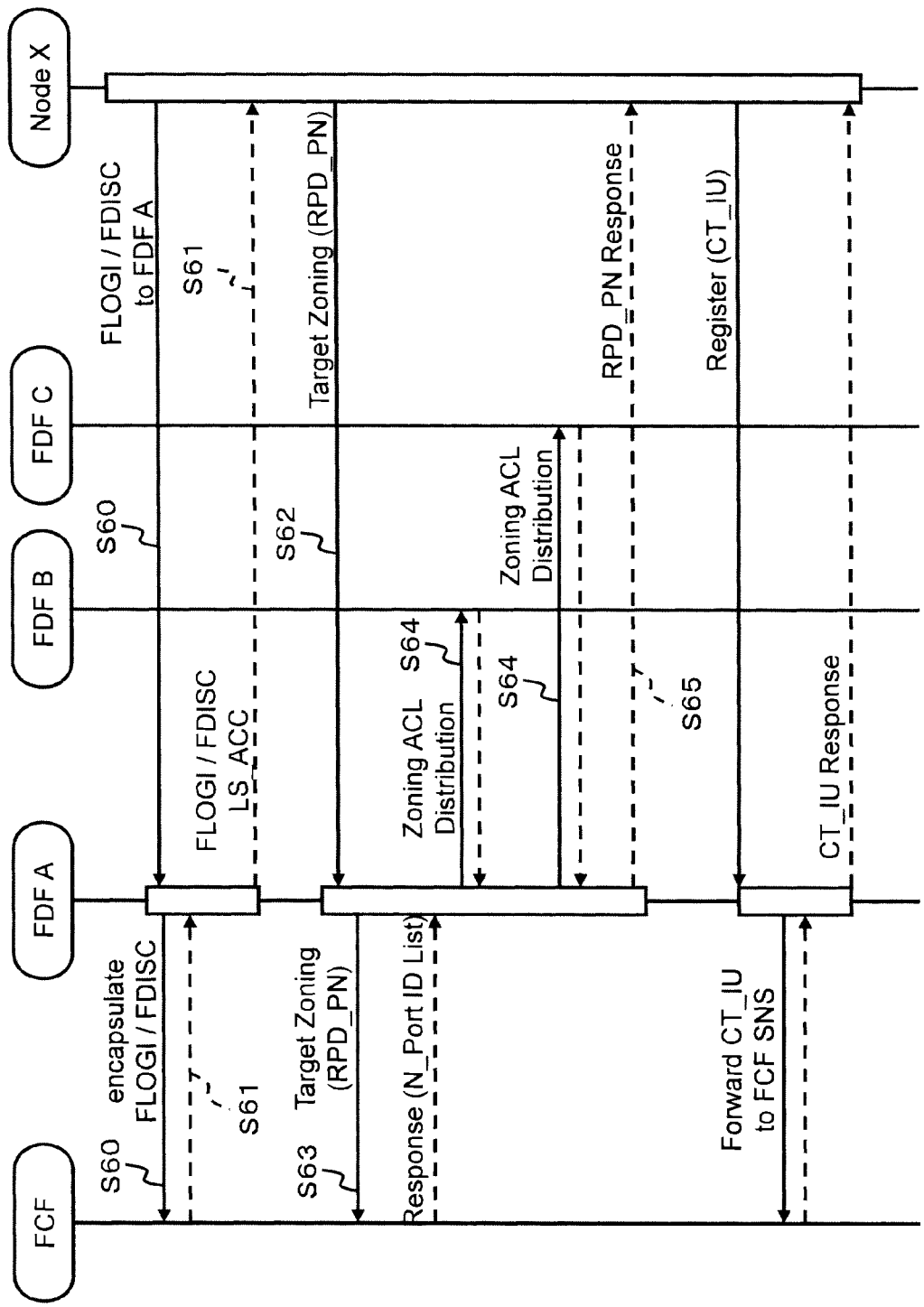
FIG. 34 is a ladder chart corresponding to the processing of FIG. 33.

FIG. 34 is a ladder chart denoting the exchange of messages in the flowchart of FIG. 33. The respective step numbers of FIG. 33 match with the step numbers described in the ladder chart of FIG. 34. Therefore, no further explanation will be given.

As described above, since the FDF distributes the zoning information to the other FDF, the FCF need not distribute the zoning information to subordinate FDFs.

A large number of volumes 43 are associated with the storage apparatus port, and the respective virtual servers 33 and volumes 43 are associated in accordance with the host group of the storage apparatus. Therefore, a large number of hosts are associated with the zoning information registered in the target port of one storage apparatus.

In addition, the physical server 30 where the virtual machine resides and the physical storage apparatus 40 of the volume migration destination are dispersed inside the fabric in line with either the migration of a virtual machine or a volume migration between storage apparatuses. Therefore, the virtual server and the storage apparatus communicate via multiple switches.

For this reason, when the storage apparatus registers the zoning information in the switch (FDF), the zoning information must be distributed to substantially all the FDFs in line with the migration of the virtual machine.

In a case where the distribution of the zoning information is entrusted to the FCF, transactions will increase in accordance with the number of FDF switches, the number of virtual servers, the number of physical ports in the storage, the number of virtual ports in the storage, and the number of virtual volumes. By contrast, in this example, the FDF, which received the zoning information from the storage apparatus, distributes this zoning information to the other FDFs, thereby reducing the transactions for zoning distribution.

Furthermore, to simplify the explanation, the description stated that the FDF distributes the zoning information received from the storage apparatus to the other FDFs. However, in actuality, the FDF creates information for zone control based on the zoning information received from the storage apparatus, and distributes this zone control information to the other FDFs.

Figure 35:
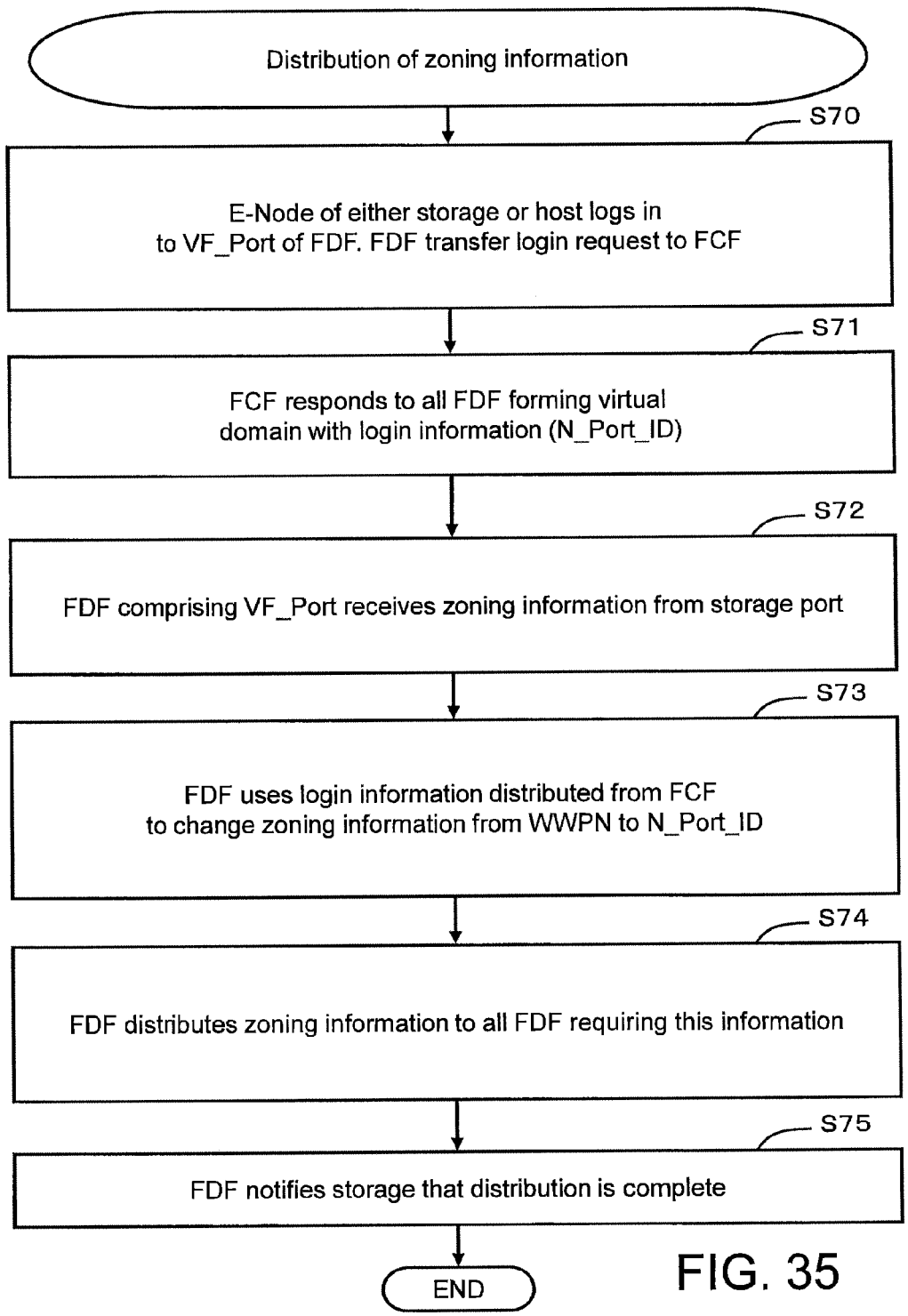
FIG. 35 is a flowchart showing other processing via which the FDF distributes zoning information to other FDFs.

The flowchart of FIG. 35 shows another process for distributing the zoning information to the FDFs. In this process, login information of the FCF is distributed in advance to the FDF in the virtual domain, and the zoning information received from the storage apparatus undergoes name resolution in the FDF and is distributed to the other FDFs. Since the explanation of this process duplicates the explanation of FIG. 31, the differences will be explained.

When the E_Node logs in to the FDF VN_Port, the FDF transfers the login request to the FCF the same as in S60 (S70).

The FCF assigns a N_Port ID to the login request received from the FDF. The FCF notifies all the FDFs belonging to the virtual domain that the N_Port ID has been allocated to the login request (S71). The differences with S61 of FIG. 33 are that the WWPN and N_Port ID information is distributed to all the FDFs rather than just to the FDF, which transferred the login request, and the information of the respective FDFs is synchronized. In accordance with this, each FDF has a name server database 101 related to the name server for the entire virtual domain. Therefore, each FDF can respectively execute the name resolution from the WWPN to the N_Port ID, making queries to the FCF unnecessary.

In S72, the zoning information is received from the storage apparatus port the same as in S62 of FIG. 33.

As described above, each FDF also stores information about the other nodes in the virtual domain. Therefore, the FDF that receives the zoning information from the storage apparatus converts the WWPN list included in this zoning information (RPD_PN) from the WWPNs to the N_Port IDs (S73).

In addition, because the FDF, which rewrites the WWPN list as the N_Port ID list, also comprises the N_Port ID range information of the other FDFs in the virtual domain, this FDF distributes the rewritten zoning information to the other FDFs (S74).

The difference between this process and the process shown in FIG. 33 is that after receiving the zoning information from the storage apparatus port, the FDF does not have to query the FCF until the distribution of the zoning information to the FDFs is complete. Subsequent to zone configuration completion, a state change notification is sent to the node (S75) and the completion of zone configuration is conveyed.

Figure 36:
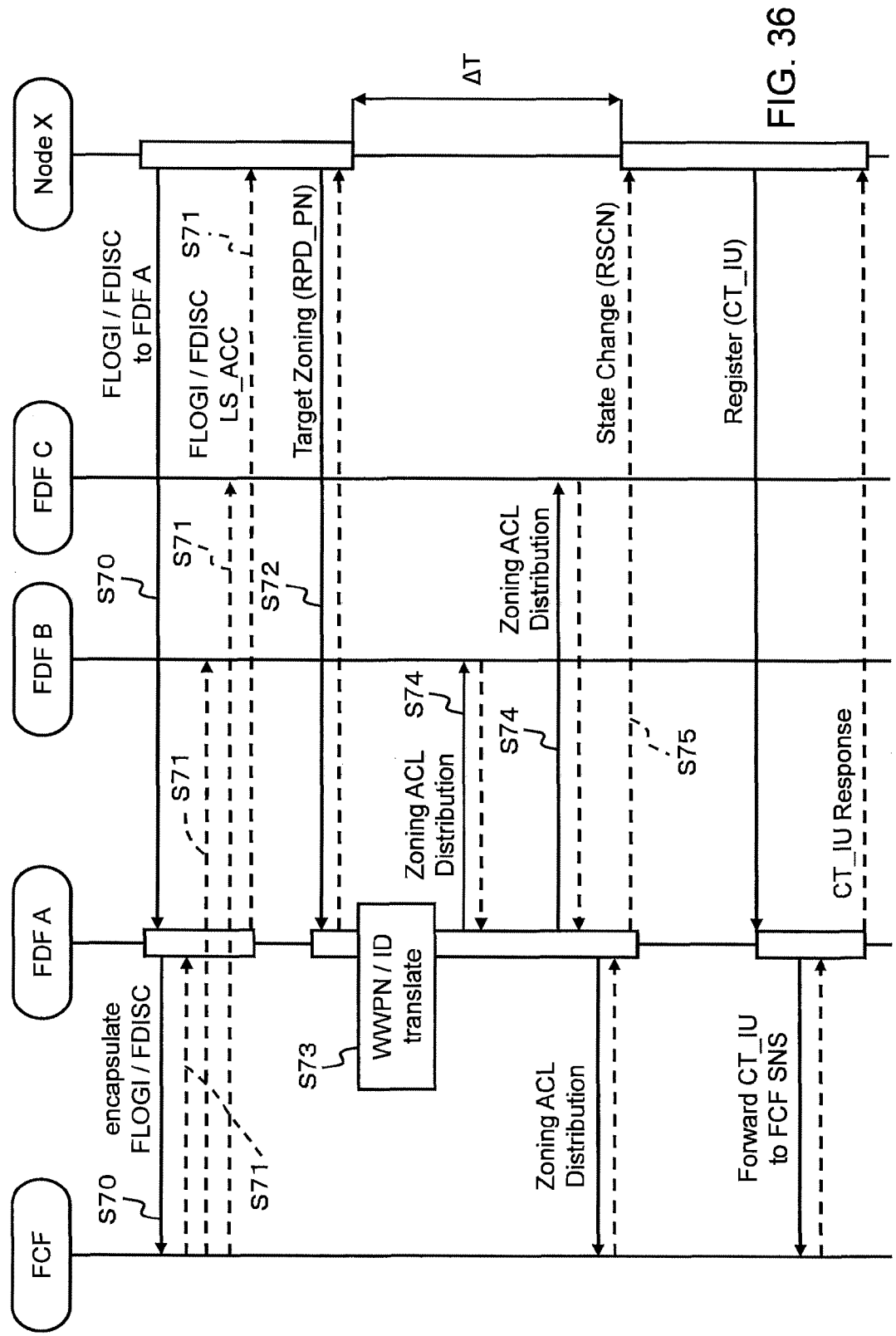
FIG. 36 is a ladder chart corresponding to the processing of FIG. 35.

FIG. 36 is a ladder chart denoting the exchange of messages in the flowchart of FIG. 35. The respective step numbers of FIG. 36 match with the step numbers cited in the message ladder chart of FIG. 35. For this reason, further explanations will be omitted. Comparing the node processing parts of the ladder chart of FIG. 34 with the node processing parts of the ladder chart of FIG. 36 reveals that node wait time is shortened delta T. The wait time is the time that the node spends waiting for the completion of the zone distribution to the FCF and FDFs.

After sending the zone distribution (RPD_PN) request of S72, the FDF immediately returns a response to the node as indicated by the dashed-line arrow. By contrast, in FIG. 34, the response with respect to the request of S62 is returned to the node from the FDF in S65.

Since wait time is shortened, the node can execute another process. In addition, because wait time is shortened, there is less likelihood of a timeout error occurring in the node, thereby improving usability.

In a case where a virtual resource (a volume or virtual machine) is frequently migrated within the computer system, it becomes necessary to respectively carry out a process for logging out of the fabric, a process for propagating zone nullification to the FDFs, a process for logging in to the fabric at the migration destination, and a process for configuring a new zone. Therefore, the reliance on the FCF for name resolution concentrated the control load in the FCF.

Alternatively, because each FDF can function as a name server in this example, it is possible to prevent the concentration of traffic related to zone configuration and the distribution of zoning information in the FCF. In addition, as was described hereinabove, since the node wait time can be reduced, the RPD_PN response can reduce the likelihood of a timeout. Therefore, a computer system comprising a relatively large fabric and a relatively large number of virtual resources can be operated stably.

Figure 37:
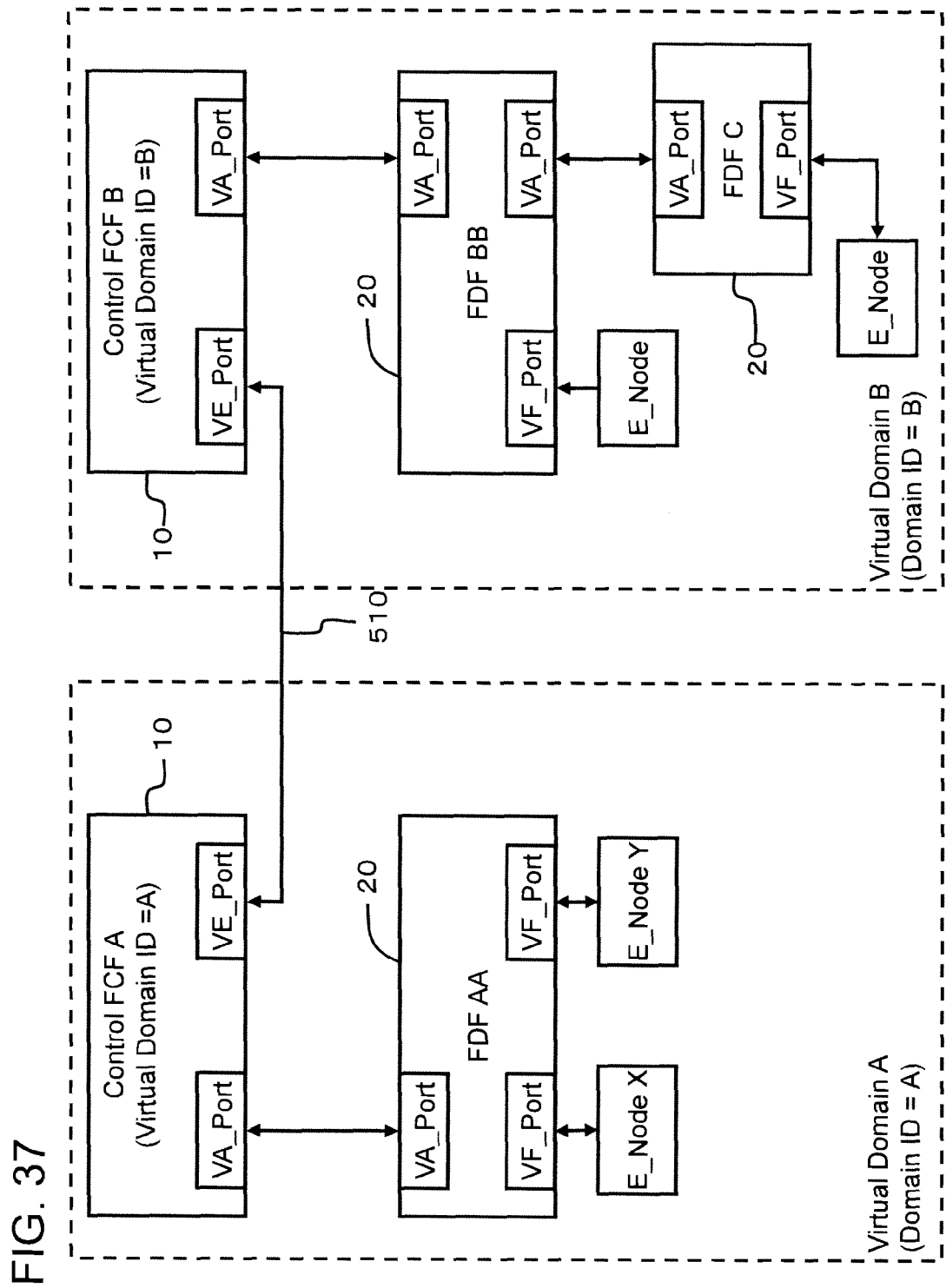
FIG. 37 shows an example of a case in which there are multiple virtual domains in the fabric configuration of FIG. 32.

FIG. 37 is an example of the configuration of the fabric in FIG. 32 when multiple virtual domains exist. The differences with FIG. 32 are that there are two control FCFs, each of which having a different virtual domain. A virtual link 510 couples the FCF A VE_Port to the FCF B VE_Port. The virtual link 510 is a ISL (Inter Switch Link) for coupling different domains.

Figure 38:
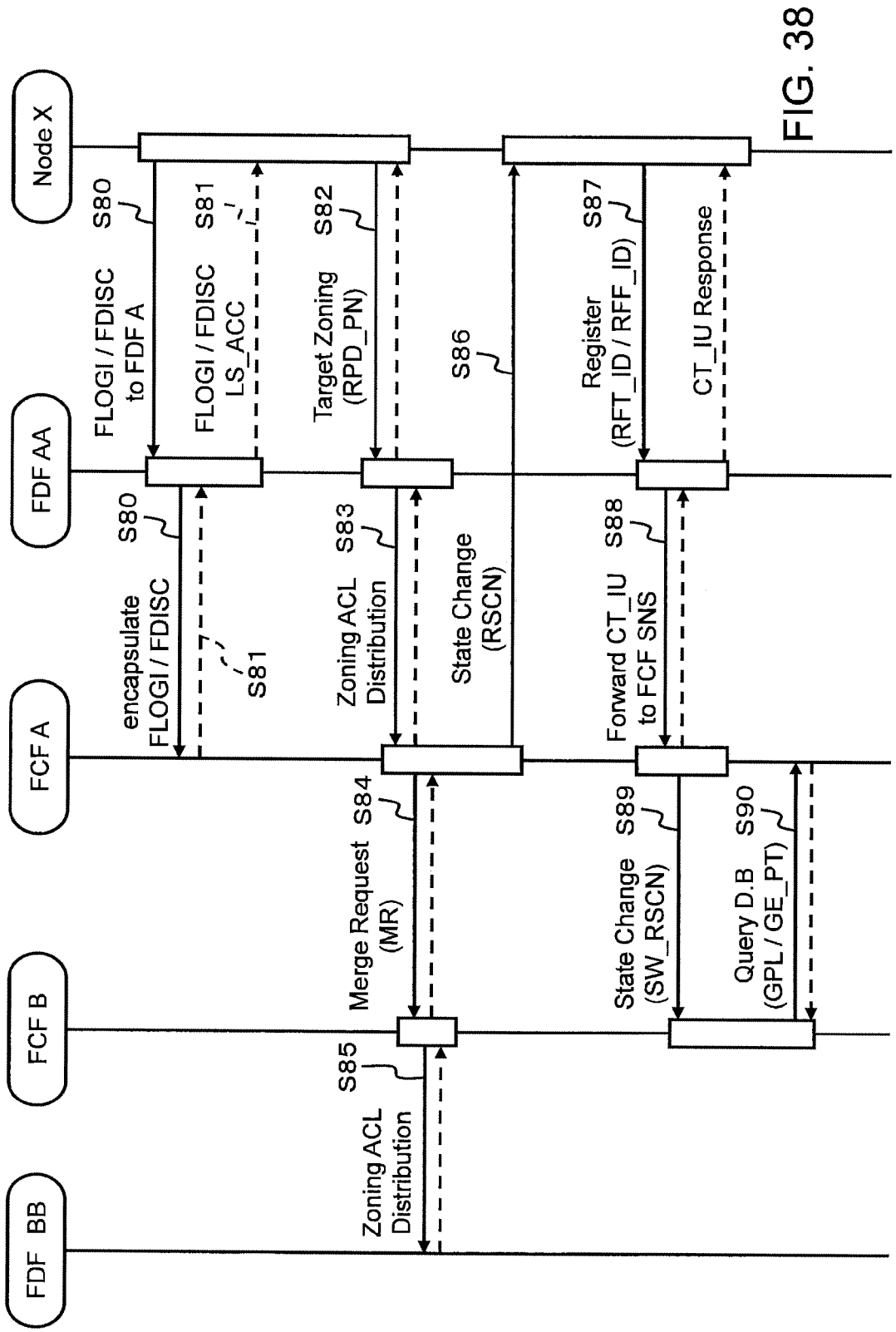
FIG. 38 is a flowchart showing the processing via which the FDF distributes zoning information received from the storage apparatus to other FDFs and the FCF in the configuration of FIG. 37.

FIG. 38 is a ladder chart for a FDF to distribute zoning information received from the storage apparatus to the FCF and FDFs in the fabric having multiple virtual domains shown in FIG. 37. The explanation will focus on the differences between FIG. 33 and FIG. 35.

When the node belonging to the one virtual domain A logs in to the VF_Port of the FDF AA (S80), the login request is sent to the FCF A that manages the virtual domain A (S81). The FCF A returns the N_Port ID to be allocated to the node (S81).

When the node sends the zoning information to the FDF A (S82), this FDF A distributes the zoning information to the other FDFs (not shown in the drawing) in the virtual domain after converting the WWPN to the N_Port ID. The zoning information is also distributed to the FCF A (S83).

When the distribution of the zoning information within the virtual domain A is complete, the FCF A exchanges a request (MR: Merge Request) for merging the zoning information with the other virtual domain B via the inter switch link 510 (S84).

The FCF B distributes the zoning information received from the FCF A to the FDFs in the virtual domain B (S85). The FCF A notifies the node of the state change (S86).

After the node registers the FC-4 type and so forthwith respect to the name service (S87, S88), the FCF A notifies the other domain as to the state change (S89). The FCF B, which manages the notified domain, queries the name server database and the fabric configuration server database (S90).

Specifically, the FCF B acquires a list of port states using a GPL (Get Port List), and acquires a list of port names of the VN_Port, for which the FC-4 type is the SCSI FCP protocol, in accordance with a GE PT (Get Entry based Port Type) (S90).

The problem of domain numbers being used up the more resources there are in the fabric as a whole is known, but the consumption of the number of domains can be reduced by increasing the size of the virtual domain to a certain extent. In this example, the time required to merge the zoning information between the domains can be reduced.

EXAMPLE 3

Figure 39:
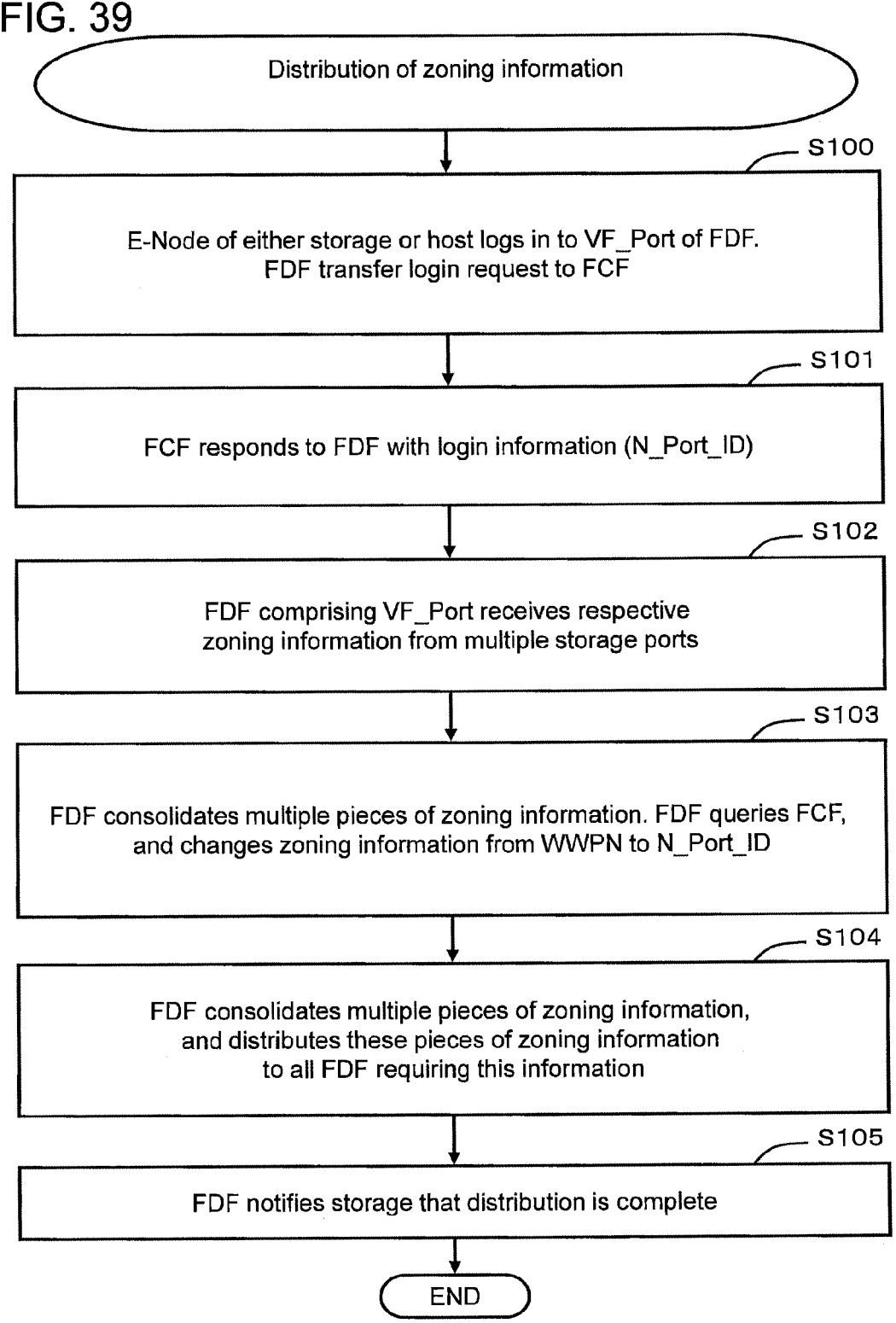
FIG. 39 is a flowchart showing processing related to a third example via which the FDF consolidates and distributes multiple pieces of zoning information.

A third example will be explained by referring to FIGS. 39 through 42. FIG. 39 is a flowchart showing a process for collectively distributing zoning information in a case where the FDF receives login requests from multiple FCoE nodes (E-Nodes). Since this process is equivalent to a variation of the process shown in FIG. 33, the explanation will focus on the differences with FIG. 33.

S100 is the same as S60 of FIG. 33. However, in S100, a case in which a login request is simultaneously generated from another node is also taken into account. Furthermore, S101 is the same as S61 of FIG. 33.

S102 is the same as S62 of FIG. 33. However, in S102, login requests are received from each of multiple nodes.

Next, the FDF merges the zoning information received from multiple nodes, and collectively queries the FCF about the collected zoning information (S103). This query has the same content as that explained in S63 of FIG. 33.

The FDF merges the multiple pieces of zoning information and distributes this information to the other FDFs that are in need thereof the same as in S64 of FIG. 33 (S104). Lastly, the FDF notifies the node (storage apparatus) to the effect that the distribution of the zoning information has been completed the same as in S65 of FIG. 33 (S105).

Figure 40:
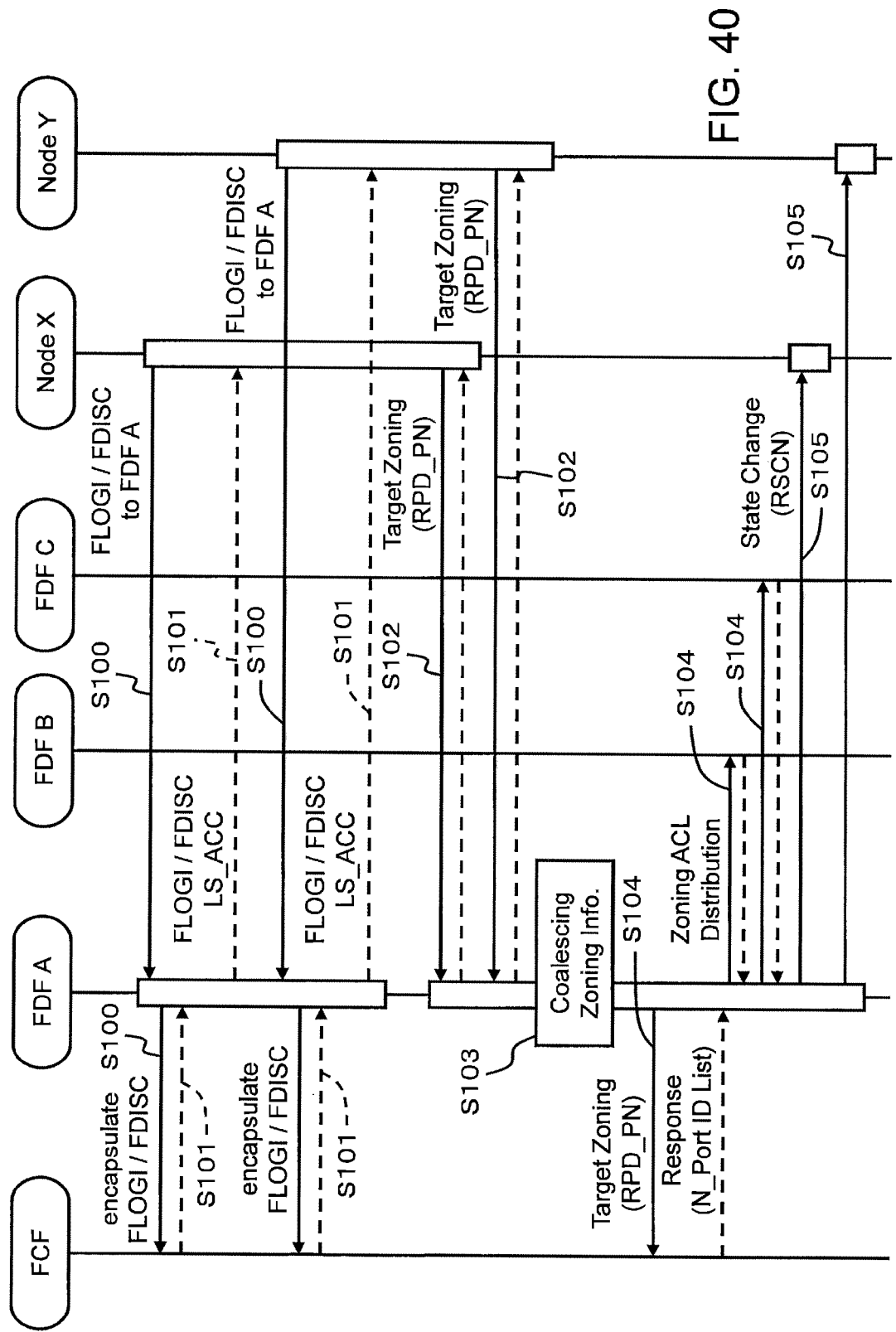
FIG. 40 is a ladder chart corresponding to the processing of FIG. 37.

FIG. 40 is a ladder chart denoting the exchange of messages in the flowchart of FIG. 39. The respective step numbers of FIG. 39 match the step numbers listed in the messages of the ladder chart of FIG. 40. For this reason, no further explanation will be given.

In this example, the FDF merges multiple query requests to collectively query the FCF (S103 and S104), thereby further lessening the load on the FCF.

In addition, in this example, it is possible to collectively distribute by the FDF the zoning information received from each of multiple nodes when distributing the zoning information to the other FDFs. Therefore, the transactions for distributing the zoning information among the FDFs can be reduced.

FIG. 41 shows a Register Peer Device based Port Name (RPD_PN) format, which is a zoning information request message.

FIG. 41(a) is a request format. FIG. 41(b) is a portion of the entry of FIG. 41(a). The RPD_PN is exchanged in accordance with the FC Common Service CT_IU payload.

In a case where the switch authentication explained using the flowchart of FIG. 27 is necessary, a common header, which is called the first 4DW (Double Word) CT_IU Preamble, can be replaced with an extension header, and an authentication code can be added. This inhibits a malicious port from changing the zoning of the fabric on its own and generating an unauthorized access.

The format of FIG. 41(a) has a number of WWPN entries, a flag for identifying whether a requestor is an initiator or a target, and a list 87. The list 87 stores the list shown in FIG. 41(b). The format shown in FIG. 41(b) has a WWPN field, which grants the requestor port permission to communicate.

FIG. 41(c) is the format for the RPD_PN response. FIG. 41(d) is a portion of the entry of FIG. 41(c). The format of FIG. 41(c) has a number of list entries, and a list 88. The list 88 stores the list shown in FIG. 41(d).

The format of FIG. 41(d) has a WWPN field, which grants the requestor port permission to communicate, a N_Port ID field for the name resolution from the WWPN in a case where this fabric has logged in, and a flag showing that login is complete.

In the case of an embodiment (control method of FIG. 35) in which name resolution is not required, the number of list entries and the list 88 are not needed in the RPD_PN response format.

FIG. 42 shows the formats of Get Peer Name based Port Name request and response formats for acquiring zoning information from the fabric. FIG. 42(a) shows the request format. FIG. 42(b) shows the response format.

The RPD_PN is exchanged in accordance with the FC Common Service CT_IU payload. The WWPN 89 of the originator (another port) is stored in the format of FIG. 42(a) to acquire zoning information configured by another port from this other port.

The zoning information registered in accordance with the originator WWPN of FIG. 42(a) with respect to the request of FIG. 42(a) is returned using the format of FIG. 42(b). The format of FIG. 42(b) has a number of permission WWPN list entries registered with respect to the originator WWPN, and a field for a permission WWPN list 90 with respect to the originator WWPN. Multiple entries of the format explained using FIG. 41(b) are stored in the permission WWPN list 90.

The messages shown in FIG. 42 are used when acquiring zoning information from the fabric as explained using FIG. 29. In addition, a message format for collectively acquiring the configurations of the zoning information for the fabric as a whole is also conceivable. Since this kind of format can easily be inferred from FIG. 42, an explanation of this format will be omitted.

Figure 43:
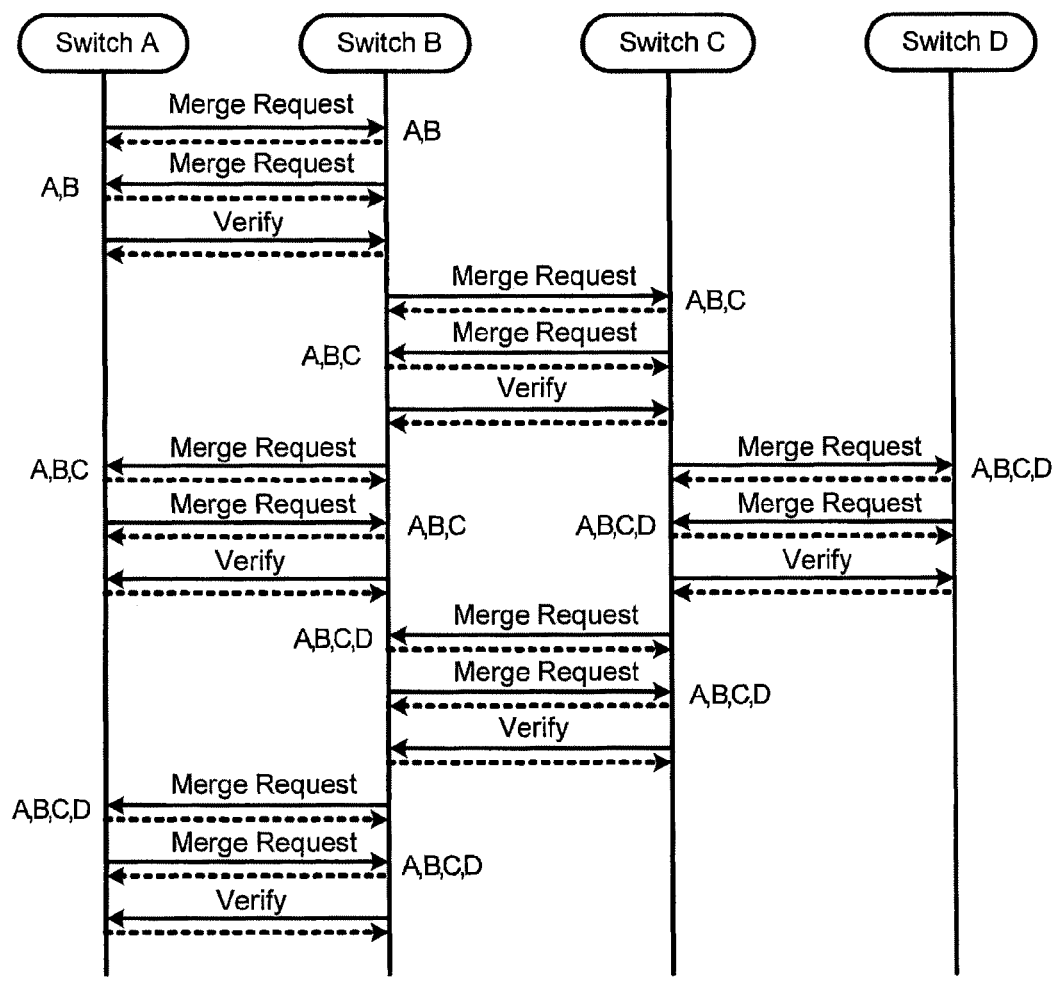
FIG. 43 is a ladder chart showing a method for distributing zoning information between multiple fabric switches belonging to a domain.

The effects shared in common by the first example through the third example will be explained further. FIG. 43 is a ladder chart showing how to distribute zoning information sequentially among the fabric switches. In the prior art, the FC fabric administrator manually registered the zoning information between the host and the storage apparatus in the fabric one at a time.

For this reason, either the FCF or the FC domain switch stores the zoning information. To distribute zones to all the domain switches that comprise the fabric, MRs (Merge Requests) must be exchanged between adjacent switches as shown in FIG. 43. The exchange of MRs generates traffic corresponding to the square of the number of domain switches.

This makes it difficult to increase the number of domain switches. Alternatively, in the embodiment explained using FIGS. 32 through 42, it is possible reduce the number of domain switches (FCF). Therefore, MR control traffic can be reduced, and, in addition, the downtime accompanying the re-changing of zones in the fabric as a whole can be shortened.

FIG. 44 is a ladder chart of a case in which the control FCF distributes the zoning information held by the control FCF to the respective FDFs.

The fabric administrator configures a zone in the FCF beforehand (S200). When a node logs in to the FDF A (S201), the FDF A transfers the login request to the FCF (S202).

The FCF, which controls the virtual domain, distributes the zone to all the FDFs based on the name server database (S203 through S205). Lastly, the FCF returns a login response to the node after zone configuration has been completed (S206).

As shown in FIG. 44, merging is not possible in a case where multiple nodes issue login requests when the zones are being centrally managed by the FCF. In addition, there is also the possibility of a login request timeout occurring in the node due to the login response being returned after zone distribution has been completed (S206).

In addition, when a duplicate login is carried out, there is the likelihood of a Resource Allocation Timeout (R A Toy) occurring, resulting in a 10 second wait. Therefore, there will be cases in which the migration of a virtual resource over a short period of time will fail, making stable system operation difficult.

Alternatively, in this embodiment, multiple login requests can be merged and sent to the FCF, making it possible to reduce control traffic. In addition, it is also possible to prevent the occurrence of timeouts during the login request process.

Furthermore, the present invention is not limited to the above-described embodiment. A person with ordinary skill in the art will be able to make a variety of additions and changes without departing from the scope of the present invention. For example, the present invention can be understood as a switch. This switch, for example, can be expressed as follows:

"(First Aspect) A fabric comprising multiple coupled switches,
wherein the above-mentioned multiple switches comprise a first switch, and multiple second switches, which are managed by the above-mentioned first switch,
of the above-mentioned multiple second switches, a prescribed second switch, which receives from a first node (for example, a storage apparatus) access control information related to a second node (for example, a host computer) capable of accessing the above-mentioned first node, sends and registers the above-mentioned access control information in each of the other second switches of the above-mentioned multiple second switches.
(Second Aspect) A fabric according to the first aspect, wherein the above-mentioned prescribed second switch requests that the above-mentioned first switch rewrite a portion of the above-mentioned access control information, and sends and registers the rewritten access control information in each of the above-mentioned other second switches.
(Third Aspect) A fabric according to the second aspect, wherein, in a case where access control information has been received from each of multiple first nodes, the above-mentioned prescribed second switch sends this access control information to the above-mentioned first switch and requests that each piece of the above-mentioned access control information be rewritten.
(Fourth Aspect) The above-mentioned prescribed second switch comprises a name server function, rewrites the WWPN inside the above-mentioned access control information received from the above-mentioned first node to a N_Port ID, and sends and registers the rewritten access control information in each of the above-mentioned other second switches.
(Fifth Aspect) An information management method for a fabric, which comprises multiple coupled switches,
wherein the above-mentioned multiple switches comprise a first switch, and multiple second switches, which are managed by the above-mentioned first switch,
the above-mentioned fabric information management method comprising the steps of:
the above-mentioned first switch managing information that is to be managed centrally inside the fabric; and
the above-mentioned each second switch respectively managing other information besides the above-mentioned centrally managed information.
(Sixth Aspect) A fabric information management method according to the fifth aspect, wherein the above-mentioned each second switch, in a case where the above-mentioned other information managed by its own apparatus is changed, sends this changed above-mentioned other information to each of the other second switches other than its own apparatus, and updates the above-mentioned other information stored in the above-mentioned each other second switch."

In addition, the present invention can also be understood as a storage apparatus. This storage apparatus, for example, can be expressed as follows:

(First Aspect) A storage apparatus, which is coupled to a host computer via a FC (Fibre Channel) fabric, comprising:
a storage port, which is coupled to a host port of the above-mentioned host computer,
wherein, based on a first information associated with access control for controlling access to the relevant storage apparatus by the above-mentioned host computer, creates a second information, which defines the above-mentioned host computer that is able to access the relevant storage apparatus, and
registers the created above-mentioned second information in the above-mentioned fabric.
(Second Aspect) A storage apparatus according to the first aspect, wherein it is possible to receive a portion of logical volumes from among multiple logical volumes associated with a certain storage port inside another storage apparatus.

REFERENCE SIGNS LIST

10 FCF (first switch)
20 FDF (second switch)
30 Host computer
40 Storage apparatus

The invention claimed is:

1. A computer system comprising:
at least one host computer having a node port; and
a plurality of storage apparatuses, each of the storage apparatuses having a node port, the at least one host computer and the plurality of storage apparatuses coupled via a fabric,
wherein the plurality of storage apparatuses comprise a first storage apparatus and a second storage apparatus, and
wherein, prior to changing an access target from the first storage apparatus to the second storage apparatus for sending an I/O request to a logical volume, the second storage apparatus is configured to:
acquire, directly or indirectly from the first storage apparatus, a host group information, which denotes a relationship between at least one port identifier of the at least one host computer and a logical unit identifier of the logical volume inside the first storage apparatus;
create, based on the host group information in the first storage apparatus, zone information for defining one of the at least one port identifier of the at least one host computer that is able to access a port identifier of the second storage apparatus; and
register the created zone information in the fabric.

2. The computer system according to claim 1, wherein when the logical volume is migrated from the first storage apparatus to the second storage apparatus, or when the I/O request to the logical volume inside the first storage apparatus is controlled by the second storage apparatus, the at least one host computer is configured to change the access target from the first storage apparatus to the second storage apparatus for sending the I/O request to the logical volume.

3. The computer system according to claim 1, wherein, in the first storage apparatus, multiple logical volumes are associated with the node port, and a portion of the logical volumes from among these multiple logical volumes can be migrated to the second storage apparatus, and
the second storage apparatus is configured to acquire the host group first information related to the portion of the logical volumes from the first storage apparatus.

4. The computer system according to claim 1,
wherein the first storage apparatus constitutes a migration source of a migration-target resource, and the second storage apparatus constitutes a migration destination of the migration-target resource, and
wherein the migration-target resource is a storage port, and is configured to migrate a port identifier of the first storage apparatus to a storage port of the second storage apparatus.

5. The computer system according to claim 1,
wherein the first storage apparatus constitutes a migration source of a migration-target resource, and the second storage apparatus constitutes a migration destination of the migration-target resource, and
wherein the migration-target resource is the logical volume, and is configured to migrate a logical unit name identifier of the first storage apparatus to a virtual logical unit name identifier of the second storage apparatus.

6. The computer system according to claim 1, wherein the second storage apparatus is configured to correspondingly manage a storage space of a migration-source logical volume of the first storage apparatus, and a storage space of a migration-destination logical volume of the second storage apparatus, and
carry out processing by converting an access, from the at least one host computer to the migration-destination logical volume, to an access from the second storage apparatus to the migration-source logical volume.

7. The computer system according to claim 1,
wherein the first storage apparatus constitutes a migration source of a migration-target resource, and the second storage apparatus constitutes a migration destination of the migration-target resource, and
wherein the migration-target resource is at least one of a storage port or the logical volume.

8. The computer system according to claim 1, wherein the fabric comprises a first switch and multiple second switches, which are managed by the first switch,
the second storage apparatus is configured to send the zone information to a coupling-destination second switch to which the second storage apparatus is directly coupled, from among the respective second switches,
the coupling-destination second switch is configured to request the first switch to convert identification information for identifying the host computer included in the zone information,
create, based on the identification information converted by the first switch, another information for defining a host computer of the at least one host computer that is able to access the storage apparatus, and
transfer and register the created zone information in prescribed second switches of the respective second switches.

9. The computer system according to claim 1, wherein the node port comprises a FC (Fibre Channel) node port, and the fabric comprises a FC fabric.

10. The computer system according to claim 1,
wherein when the logical volume is migrated from the first storage apparatus to the second storage apparatus, the second storage apparatus is configured to acquire the host group information associated with the logical volume, and
wherein the host group information associated with the logical volume identifies a relationship between a host computer of the at least one host computer and the logical volume.

11. The computer system according to claim 10, wherein the host group information associated with the logical volume identifies the relationship between the host computer and the logical volume being migrated by using a host group function which maps an internal logical unit number to a host logical unit number associated with the host computer.

12. The computer system according to claim 1, wherein the host group information is first basic zoning information for defining, from among the at least one host computer, a host computer that is able to access the first storage apparatus,
the zone information is second basic zoning information for defining, from among the at least one host computer, a host computer that is able to access the second storage apparatus, and
the second storage apparatus is configured to create the second basic zoning information by changing, from among the information included in the first basic zoning information, information denoting a migration-source storage port of the first storage apparatus to information denoting a migration-destination storage port of the second storage apparatus.

13. The computer system according to claim 12, wherein the second storage apparatus is configured to read the host group information from the first storage apparatus.

14. The computer system according to claim 12, wherein the second storage apparatus is configured to acquire the host group information from the fabric.

15. The computer system according to claim 12, wherein the first storage apparatus is configured to send the host group information to the second storage apparatus.

16. A method for managing a computer system, in which at least one host computer and a plurality of storage apparatuses are coupled via a fabric, wherein the plurality of storage apparatuses comprise a migration-source storage apparatus which constitutes a migration source of a migration-target resource, and a migration-destination storage apparatus which constitutes a migration destination of the migration-target resource, the method comprising the steps of:
acquiring, prior to migrating the migration-target resource, by the migration-destination storage apparatus, first information related to access control for controlling access to the migration-source storage apparatus by the at least one host computer, wherein the first information is created, in the migration-source storage apparatus, as host group information which denotes a relationship between a port identifier of the at least one host computer and a logical unit inside the migration-source storage apparatus and which defines a logical unit identifier of the logical unit accessible to the port identifier of the at least one host computer;
creating, prior to migrating the migration-target resource, by the migration-destination storage apparatus, second information for defining one of the at least one host computer that is able to access the migration-destination storage apparatus by migrating the host group information, which denotes the relationship between the port identifier of the at least one host computer and the logical unit inside the migration-source storage apparatus, from the migration-source storage apparatus to the migration-destination storage apparatus and updating information associated with a migration-destination storage port of the migration-destination storage apparatus to allow access by the one of at least one host computer to the migration-destination storage port of the migration-destination storage apparatus; and registering, prior to migrating the migration-target resource, by the migration-destination storage apparatus, the created the second information in the fabric.

\* \* \* \* \*